United States Patent
Fujita et al.

(10) Patent No.: US 6,347,268 B1
(45) Date of Patent: *Feb. 12, 2002

(54) ACTIVATION CONTROL APPARATUS FOR PASSIVE VEHICLE OCCUPANT RESTRAINT AND METHOD OF CONTROLLING ACTIVATION OF PASSIVE VEHICLE OCCUPANT RESTRAINT

(75) Inventors: Koichi Fujita, Toyota; Takao Akatsuka, Aichi-ken; Motomi Iyoda, Seto; Koichi Sugiyama, Nagoya; Hiromichi Fujishima, Toyota; Tomokazu Sakaguchi, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,546

(22) Filed: Mar. 31, 2000

Related U.S. Application Data

(63) Continuation of application No. 08/962,386, filed on Oct. 31, 1997, now Pat. No. 6,170,864.

(30) Foreign Application Priority Data

Nov. 20, 1996 (JP) .............................................. 8-326180

(51) Int. Cl.$^7$ .............................. G06F 17/00; G06F 7/00
(52) U.S. Cl. ............................. 701/45; 701/47; 280/735
(58) Field of Search ............................. 701/45, 46, 47; 208/734, 735; 180/232, 268, 271, 282; 340/436, 439

(56) References Cited

U.S. PATENT DOCUMENTS

| | | | |
|---|---|---|---|
| 5,014,810 A | * 5/1991 | Mattes et al. | ............... 280/735 |
| 5,407,228 A | 4/1995 | Shibata et al. | ............... 280/735 |
| 5,496,979 A | * 3/1996 | Behr | ............... 200/61.45 M |
| 5,559,697 A | * 9/1996 | Wang | ............... 701/45 |
| 5,668,720 A | * 9/1997 | Takahashi et al. | ............... 701/46 |

(List continued on next page.)

FOREIGN PATENT DOCUMENTS

| | | |
|---|---|---|
| JP | 04-072060 | 6/1992 |
| JP | 05-213150 | 8/1993 |
| JP | 05-213513 | 8/1993 |
| JP | 05-305855 | 11/1993 |
| JP | 06-321051 | 11/1994 |

(List continued on next page.)

OTHER PUBLICATIONS

Abstract of JP 5–65706, Aug. 31, 1993, Suzuki Motor Corp.

*Primary Examiner*—Gertrude Arthur
(74) *Attorney, Agent, or Firm*—Kenyon & Kenyon

(57) ABSTRACT

A structure and method for enabling a passive vehicle occupant restraint to be activated at the earliest possible timing, irrespective of a type of a collision. A floor sensor measures a deceleration G applied to the length of a vehicle and outputs the deceleration as the measurement G. An arithmetic unit carries out a predetermined arithmetic operation on the measurement G output from the floor sensor, so as to determine a function f(G). A conditional activation unit has a variation pattern of a threshold value T that varies with a variation in velocity v of a non-stationary object. The conditional activation unit reads a threshold value T corresponding to an input velocity v from the variation pattern and compares the threshold value T with the value of the function f(G). In case that the value of the function f(G) exceeds the threshold value T, an activation signal A is input to a driving circuit. A satellite sensor outputs an ON signal when a deceleration of not less than a predetermined reference value is applied to the vehicle. A threshold variation pattern selection unit changes the variation pattern of the threshold value T against the velocity v used in the conditional activation unit to another variation pattern, in response to the ON signal output from the satellite sensor.

92 Claims, 30 Drawing Sheets

U.S. PATENT DOCUMENTS

| | | | |
|---|---|---|---|
| 5,732,374 A | * 3/1998 | Ohm | 701/45 |
| 5,740,041 A | * 4/1998 | Iyoda | 701/45 |
| 5,785,347 A | 7/1998 | Adolph et al. | 280/735 |
| 5,815,393 A | 9/1998 | Chae | 364/424.056 |
| 5,914,653 A | * 6/1999 | Takeuchi et al. | 340/436 |
| 5,936,518 A | 8/1999 | Fukui et al. | 340/436 |
| 5,961,562 A | * 10/1999 | Iyoda | 701/45 |
| 5,967,548 A | 10/1999 | Kozyreff | 280/735 |
| 5,969,599 A | 10/1999 | Wessels et al. | 340/436 |
| 5,978,722 A | 11/1999 | Takasuka et al. | 701/45 |
| 5,995,892 A | * 11/1999 | Kiribayahi et al. | 701/45 |
| 6,023,664 A | * 2/2000 | Bennet | 702/141 |
| 6,170,684 B1 | * 1/2001 | Fujita et al. | 280/735 |
| 6,236,922 B1 | * 5/2001 | Andres | 701/45 |

FOREIGN PATENT DOCUMENTS

| | | |
|---|---|---|
| JP | 06-340244 | 12/1994 |
| JP | 07-309197 | 11/1995 |
| JP | 10-152014 | 6/1998 |

* cited by examiner

*PRIOR ART*

ACTIVATION CONTROL APPARATUS FOR PASSIVE VEHICLE OCCUPANT RESTRAINT AND METHOD OF CONTROLLING ACTIVATION OF PASSIVE VEHICLE OCCUPANT RESTRAINT

This application is a continuation of U.S. application Ser. No. 08/962,386, filed Oct. 31, 1997, now U.S. Pat. No. 6,170,864, the entire disclosure of which is herein incorporated by reference.

BACKGROUND OF THE INVENTION

1. Field of the Invention

The present invention relates to a passive vehicle occupant restraint, such as an air bag, for restraining a vehicle occupant in the event of an impact on a vehicle, and more specifically to a technique for controlling activation of such a passive vehicle occupant restraint.

2. Description of the Prior Art

An apparatus for controlling squib ignition in an air bag is one of known activation control apparatuses for controlling activation of passive vehicle occupant restraints. In the air bag, a squib ignites a gas-generating agent in an inflator on impact, and a gas accordingly evolves from the inflator to inflate a bag and protect a vehicle occupant from the impact of a collision.

The apparatus for controlling squib ignition in an air bag typically measures the impact on the vehicle as a deceleration by an acceleration sensor, calculates a function of the measured deceleration, compares the calculated value of the function with a preset threshold value, and controls the squib ignition based on the result of comparison. The acceleration sensor is disposed at a predetermined position in the vehicle, generally on a floor tunnel in the vehicle. In the description hereinafter, the acceleration sensor mounted on the floor tunnel is referred to as the floor sensor.

The threshold value is set to be greater than the maximum among the values of the function calculated from the decelerations measured by the floor sensor when impacts applied to the vehicle have such a degree that does not require activation of the air bag.

In the conventional activation control apparatus for a passive vehicle occupant restraint, the impact applied to the vehicle is detected only by means of the floor sensor, and activation of the passive vehicle occupant restraint is controlled based on the result of detection. The following problems arise in this conventional structure.

Collisions of the vehicle are classified into several types by the condition and the direction of the collision and the type of the object against which the vehicle collides; that is, a head-on collision, an oblique collision, a pole collision, an offset collision, and an under-ride collision as shown in FIG. 27. In the case of a head-on collision, the vehicle receives an impact of the collision by left and right side members thereof, so that an extremely large deceleration arises on the floor tunnel with the floor sensor mounted thereon within a predetermined time period after the collision. In the case of collisions other than the head-on collision, however, the vehicle does not receive the impact of the collision in such a manner, so that no such a large deceleration arises on the floor tunnel within the predetermined time period after the collision.

Namely the floor sensor has higher sensitivity of detection of the impact within a predetermined time period after the collision in the case of a head-on collision, than in the case of the other collisions.

The threshold value is thus set mainly based on the deceleration measured in the case of a head-on collision. More concretely the threshold value is set based on the function calculated from the deceleration measured by the floor sensor when a head-on collision applies an impact of such a degree that does not require activation of the air bag to the vehicle.

This method for setting the threshold value based on the deceleration measured in the case of a head-on collision gives a relatively large threshold value. In the case of collisions other than the head-on collision, the floor sensor has relatively low sensitivity of detection of the impact within a predetermined time period after the collision as mentioned above. A DSP (digital signal processor) is accordingly used for Fourier transform of the deceleration signal obtained in the event of the collision to characteristics of a specific frequency component. In the case of the other collisions (including an offset collision), the impact is detected based on the characteristics of the specific frequency component. This technique requires the DSP and the other related devices as well as a high-performance computer, which undesirably increases the cost.

SUMMARY OF THE INVENTION

The object of the present invention is thus to provide an activation control apparatus of simple structure that enables a passive vehicle occupant restraint to be activated with high accuracy, irrespective of the type of a collision.

At least part of the above and the other related objects of the present invention is realized by a first activation control apparatus for controlling activation of a passive vehicle occupant restraint mounted on a vehicle. The first activation control apparatus includes: impact measurement means disposed at a predetermined position in the vehicle for measuring an impact applied to the vehicle; activation control means for comparing a value calculated from the measurement of the impact by the impact measuring means with a threshold value that varies according to a specified threshold variation pattern, and controlling activation of the passive vehicle occupant restraint based on the result of comparison; impact detection means disposed at a position ahead of the impact measurement means in the vehicle for determining whether or not the impact applied to the vehicle is not less than a specified reference value; and threshold variation pattern changing means for, when the impact detection means determines that the impact applied to the vehicle is not less than the specified reference value, changing the specified threshold variation pattern to another threshold variation pattern.

The present invention is also directed to a first method of controlling activation of a passive vehicle occupant restraint mounted on a vehicle. The first method includes the steps of:

(a) measuring a value of impact at a first position in the vehicle when an impact is applied to the vehicle;

(b) comparing a value calculated from the measurement of the impact in the step (a) with a threshold value that varies according to a specified threshold variation, pattern, and controlling activation of the passive vehicle occupant restraint based on the result of comparison;

(c) determining whether or not a value of impact detected at a second position, which is ahead of the first position in the vehicle, is not less than a specified reference value when the impact is applied to the vehicle; and (d) when the value of impact detected at the second position is determined to be not less than the specified reference value in the step (c), changing the threshold variation pattern to another threshold variation pattern.

In the present invention, the passive vehicle occupant restraint includes air bags, seat belt pre-tensioners, inflatable curtains as well as devices for stopping a fuel supply to an engine in the event of a collision and devices for releasing door locks in the event of a collision. The measurement of the impact and the value calculated from the measurement include an acceleration or a deceleration, a velocity, a moving distance (obtained by integrating the deceleration twice with respect to time), a moving average (obtained by integrating the deceleration over a fixed time period), the intensity of the deceleration at a specific frequency, and a vector component representing the deceleration in the direction of the length or the width of the vehicle. These definitions are applicable to the other apparatuses and methods discussed below.

The first activation control apparatus and the first method of the present invention change the predetermined threshold variation pattern to another threshold variation pattern in case that the value of impact detected at the second position in the vehicle is not less than the predetermined reference value, even when the type of the collision causes the value of impact to be not readily detected at the first position. By way of example, it is assumed that the predetermined threshold variation pattern is changed to another threshold variation pattern that gives a lower threshold value. In this case, when the collision applies an impact of such a degree that requires activation of the passive vehicle occupant restraint to the vehicle, the value calculated from the measurement of the impact may exceed the threshold value within a predetermined time period after the collision. Such a simple structure accordingly enables the passive vehicle occupant restraint to be activated with high accuracy, even when the type of the collision causes the value of the impact to be not readily detected at the first position.

At least part of the objects of the present invention is also realized by a second activation control apparatus for controlling activation of a passive vehicle occupant restraint mounted on a vehicle. The second activation control apparatus includes: impact measurement means disposed at a predetermined position in the vehicle for measuring an impact applied to the vehicle; activation control means for comparing a value calculated from the measurement of the impact by the impact measuring means with a specified threshold value, and controlling activation of the passive vehicle occupant restraint based on the result of comparison; impact detection means disposed at a position ahead of the impact measurement means in the vehicle for determining whether or not the impact applied to the vehicle is not less than a specified reference value; and threshold value changing means for, when the impact detection means determines that the impact applied to the vehicle is not less than the specified reference value, changing the specified threshold value to another threshold value.

The present invention is further directed to a second method of controlling activation of a passive vehicle occupant restraint mounted on a vehicle. The second method includes the steps of:

(a) measuring a value of impact at a first position in the vehicle when an impact is applied to the vehicle;

(b) comparing a value calculated from the measurement of the impact in the step (a) with a specified threshold value, and controlling activation of the passive vehicle occupant restraint based on the result of comparison;

(c) determining whether or not a value of impact detected at a second position, which is ahead of the first position in the vehicle, is not less than a specified reference value when the impact is applied to the vehicle; and (d) when the value of impact detected at the second position is determined to be not less than the specified reference value in the step (c), changing the threshold value to another threshold value.

The second activation control apparatus and the second method of the present invention change the predetermined threshold value to another threshold value, for example, to a lower threshold value, in case that the value of impact detected at the second position in the vehicle is not less than the predetermined reference value, even when the type of the collision causes the value of impact to be not readily detected at the first position. When the collision applies an impact of such a degree that requires activation of the passive vehicle occupant restraint to the vehicle, the value calculated from the measurement of the impact may exceed the threshold value within a predetermined time period after the collision. Such a simple structure accordingly enables the passive vehicle occupant restraint to be activated with high accuracy, even when the type of the collision causes the value of the impact to be not readily detected at the first position.

At least part of the objects of the present invention is realized by a third activation control apparatus for controlling activation of a passive vehicle occupant restraint mounted on a vehicle. The third activation control apparatus includes: impact measurement means disposed at a predetermined position in the vehicle for measuring an impact applied to the vehicle; activation control means for comparing a value calculated from the measurement of the impact by the impact measuring means with a threshold value that varies according to a specified threshold variation pattern, and controlling activation of the passive vehicle occupant restraint based on the result of comparison; impact direction detection means for specifying a direction of the impact applied to the vehicle; and threshold variation pattern changing means for, when the direction of the impact specified by the impact direction detection means coincides with-a preset direction, changing the specified threshold variation pattern to another threshold variation pattern.

The present invention is further directed to a third method of controlling activation of a passive vehicle occupant restraint mounted on a vehicle. The third method includes the steps of:

(a) measuring a value of impact at a predetermined position in the vehicle when an impact is applied to the vehicle;

(b) comparing a value calculated from the measurement of the impact in the step (a) with a threshold value that varies according to a specified threshold variation pattern, and controlling activation of the passive vehicle occupant restraint based on the result of comparison;

(c) specifying a direction of the impact applied to the vehicle; and (d) when the direction of the impact specified in the step (c) coincides with a preset direction, changing the specified threshold variation pattern to another threshold variation pattern.

The preset direction here includes a direction having an angle of not less than a specified value with respect to the center line of the vehicle (that is, the center line along the length of the vehicle).

The third activation control apparatus and the third method of the present invention change the predetermined threshold variation pattern to another threshold variation pattern in case that the detected direction of the impact coincides with the preset direction, even when the type of the collision causes the value of impact to be not readily detected at the predetermined position. By way of example, it is assumed that the predetermined threshold variation pattern is changed to another threshold variation pattern that gives a lower threshold value. In this case, when the collision applies an impact of such a degree that requires activation of the passive vehicle occupant restraint to the vehicle, the value calculated from the measurement of the impact may exceed the threshold value within a predetermined time period after the collision. Such a simple structure accordingly enables the passive vehicle occupant restraint to be activated with high accuracy, even when the type of the collision causes the value of the impact to be not readily detected at the predetermined position.

At least part of the objects of the present invention is also realized by a fourth activation control apparatus for controlling activation of a passive vehicle occupant restraint mounted on a vehicle. The fourth activation control apparatus includes: impact measurement means disposed at a predetermined position in the vehicle for measuring an impact applied to the vehicle; activation control means for comparing a value calculated from the measurement of the impact by the impact measuring means with a specified threshold value, and controlling activation of the passive vehicle occupant restraint based on the result of comparison; impact direction detection means for specifying a direction of the impact applied to the vehicle; and threshold value changing means for, when the direction of the impact specified by the impact direction detection means coincides with a preset direction, changing the specified threshold value to another threshold value.

The present invention is further directed to a fourth method of controlling activation of a passive vehicle occupant restraint mounted on a vehicle. The fourth method includes the steps of:

(a) measuring a value of impact at a predetermined position in the vehicle when an impact is applied to the vehicle;

(b) comparing a value calculated from the measurement of the impact in the step (a) with a specified threshold value, and controlling activation of the passive vehicle occupant restraint based on the result of comparison;

(c) specifying a direction of the impact applied to the vehicle; and (d) when the direction of the impact specified in the step (c) coincides with a preset direction, changing the specified threshold value to another threshold value.

The fourth activation control apparatus and the fourth method of the present invention change the predetermined threshold value to another threshold value, for example, to a lower threshold value, in case that the detected direction of the impact coincides with the preset direction, even when the type of the collision causes the value of impact to be not readily detected at the predetermined position. When the collision applies an impact of such a degree that requires activation of the passive vehicle occupant restraint to the vehicle, the value calculated from the measurement of the impact may exceed the threshold value within a predetermined time period after the collision. Such a simple structure accordingly enables the passive vehicle occupant restraint to be activated with high accuracy, even when the type of the collision causes the value of the impact to be not readily detected at the predetermined position.

At least part of the objects of the present invention is realized by a fifth activation control apparatus for controlling activation of a passive vehicle occupant restraint mounted on a vehicle. The fifth activation control apparatus includes: impact measurement means disposed at a predetermined position in the vehicle for measuring an impact applied to the vehicle; activation control means for comparing a value calculated from the measurement of the impact by the impact measuring means with a threshold value that varies according to a specified threshold variation pattern, and controlling activation of the passive vehicle occupant restraint based on the result of comparison; collision type specifying means for specifying a type of a collision in which the vehicle crashes; seating state detection means for detecting a seating state of a vehicle occupant in the vehicle; and threshold variation pattern changing means for, when the type of the collision specified by the collision type specifying means coincides with a specified type of a collision and when the seating state detected by the seating state detection means coincides with a specified seating state, changing the specified threshold variation pattern to another threshold variation pattern.

The present invention is further directed to a fifth method of controlling activation of a passive vehicle occupant restraint mounted on a vehicle. The fifth method includes the steps of:

(a) measuring a value of impact at a predetermined position in the vehicle when an impact is applied to the vehicle;

(b) comparing a value calculated from the measurement of the impact in the step (a) with a threshold value that varies according to a specified threshold variation pattern, and controlling activation of the passive vehicle occupant restraint based on the result of comparison;

(c) specifying a type of a collision in which the vehicle crashes;

(d) detecting a seating state of a vehicle occupant in the vehicle; and (e) when the type of the collision specified in the step (c) coincides with a specified type of a collision and when the seating state detected in the step (d) coincides with a specified seating state, changing the specified threshold variation pattern to another threshold variation pattern.

In the fifth activation control apparatus and the fifth method of the present invention, the type of the collision may be specified by any method, for example, a method of measuring the direction of the collision and the intensity of the impact or a method based on data obtained by Fourier transform of the waveform of the deceleration upon impact. The seating state of the vehicle occupant includes the wearing state of the seat belt, the position of the seat along the length of the vehicle, and the angle of the seat.

The fifth activation control apparatus and the fifth method of the present invention change the predetermined threshold variation pattern to another threshold variation pattern in case that the collision of such a type is expected and that the vehicle occupant is in the predetermined seating state, even when the type of the collision causes the value of impact to be not readily detected at the predetermined position. By way of example, it is assumed that the predetermined threshold variation pattern is changed to another threshold case, when the collision applies an impact of such a degree that requires activation of the passive vehicle occupant restraint to the vehicle, the value calculated from the measurement of the impact may exceed the threshold value within a predetermined time period after the collision. Such a simple structure accordingly enables the passive vehicle occupant restraint to be activated with high accuracy, even when the type of the collision causes the value of the impact to be not readily detected at the predetermined position.

At least part of the objects of the present invention is also realized by a sixth activation control apparatus for controlling activation of a passive vehicle occupant restraint mounted on a vehicle. The sixth activation control apparatus includes: impact measurement means disposed at a predetermined position in the vehicle for measuring an impact applied to the vehicle; activation control means for comparing a value calculated from the measurement of the impact by the impact measuring means with a specified threshold value, and controlling activation of the passive vehicle occupant restraint based on the result of comparison; collision type specifying means for specifying a type of a collision in which the vehicle crashes; seating state detection means for detecting a seating state of a vehicle occupant in the vehicle; and threshold value changing means for, when the type of the collision specified by the collision type specifying means coincides with a specified type of a collision and when the seating state detected by the seating state detection means coincides with a specified seating state, changing the specified threshold value to another threshold value.

The present invention is further directed to a sixth method of controlling activation of a passive vehicle occupant restraint mounted on a vehicle. The sixth method includes the steps of:

(a) measuring a value of impact at a predetermined position in the vehicle when an impact is applied to the vehicle;

(b) comparing a value calculated from the measurement of the impact in the step (a) with a specified threshold value, and controlling activation of the passive vehicle occupant restraint based on the result of comparison;

(c) specifying a type of a collision in which the vehicle crashes;

(d) detecting a seating state of a vehicle occupant in the vehicle; and (e) when the type of the collision specified in the step (c) coincides with a specified type of a collision and when the seating state detected in the step (d) coincides with a specified seating state, changing the specified threshold value to another threshold value.

The sixth activation control apparatus and the sixth method of the present invention change the predetermined threshold value to another threshold value, for example, to a lower threshold value, in case that the collision of such a type is expected and that the vehicle occupant is in the predetermined seating state, even when the type of the collision causes the value of impact to be not readily detected at the predetermined position. When the collision applies an impact of such a degree that requires activation of the passive vehicle occupant restraint to the vehicle, the value calculated from the measurement of the impact may exceed the threshold value within a predetermined time period after the collision. Such a simple structure accordingly enables the pass vehicle occupant restraint to be activated with high accuracy, even when the type of the collision causes the value of the impact to be not readily detected at the predetermined position.

These and other objects, features, aspects, and advantages of the present invention will become more apparent from the following detailed description of the preferred embodiments with the accompanying drawings.

DESCRIPTION OF THE PREFERRED EMBODIMENTS

A. Activation Control Apparatus using Satellite Sensors a. First embodiment

Figure 1:
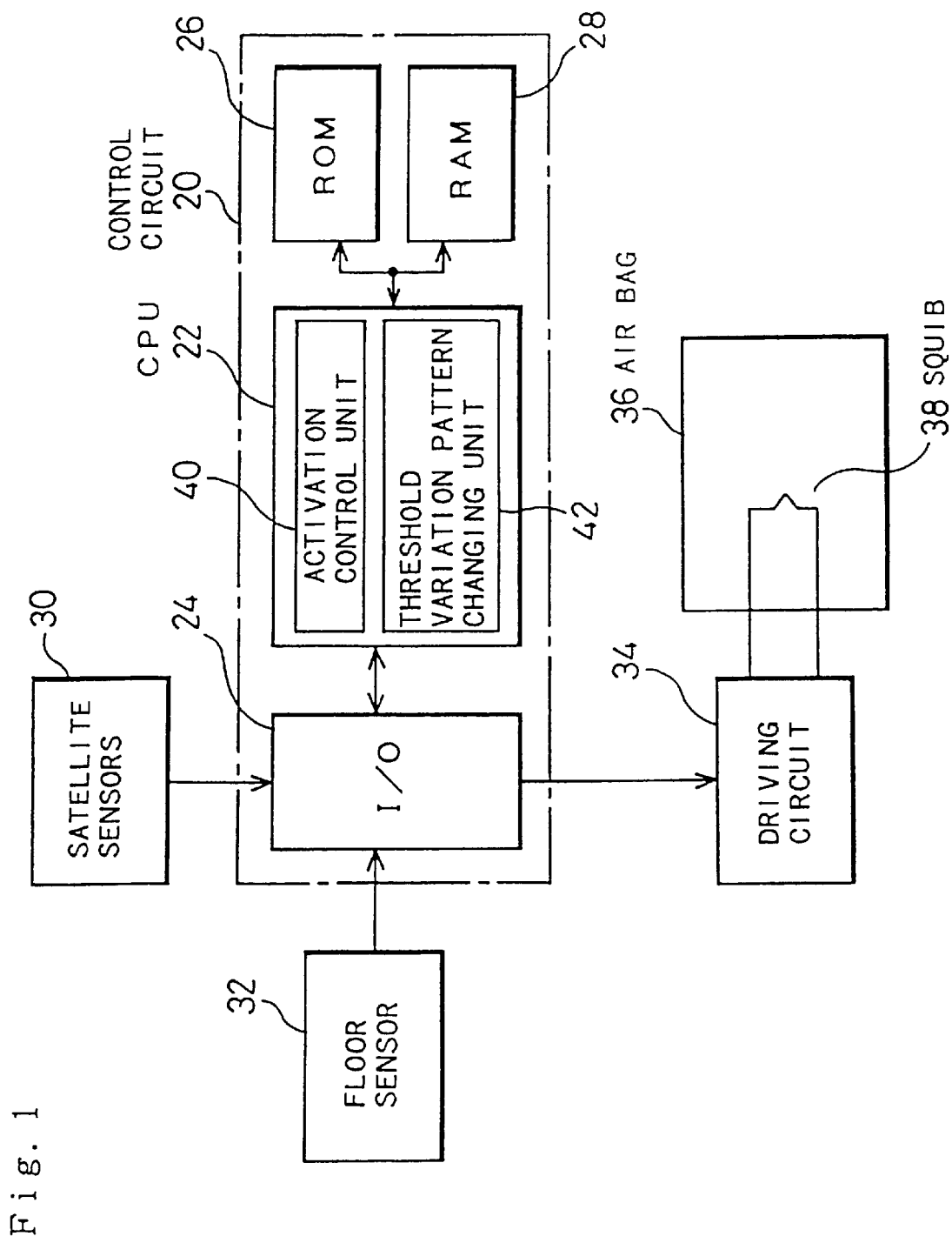
FIG. 1 is a block diagram illustrating an activation control apparatus using satellite sensors as a first embodiment according to the present invention.
Figure 2:
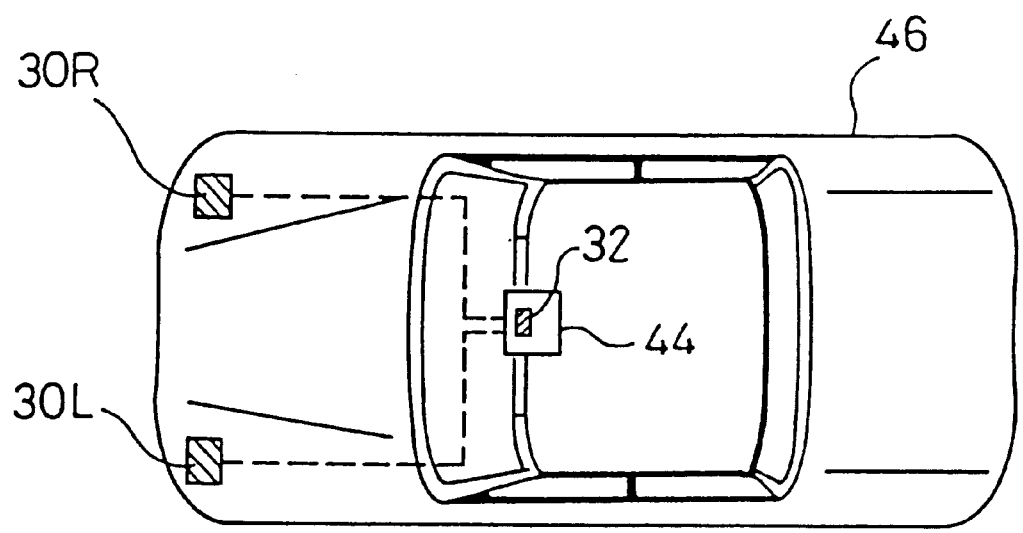
FIG. 2 shows positions in a vehicle 46 at which the satellite sensors 30 and the floor sensor 32 of FIG. 1 are disposed.

Some modes of carrying out the present invention are discussed below as preferred embodiments. FIG. 1 is a block diagram illustrating an activation control apparatus using satellite sensors as a first embodiment according to the present invention. FIG. 2 shows positions in a vehicle 46 at which the satellite sensors 30 and the floor sensor 32 of FIG. 1 are disposed.

The activation control apparatus of this embodiment controls activation of an air bag 36, which is an automotive vehicle passenger safety device (that is, a passive vehicle occupant restraint), and includes a control circuit 20, satellite sensors 30, a floor sensor 32, and a driving circuit 34 as primary constituents as shown in FIG. 1.

The satellite sensor 30 determines whether or not an impact on the vehicle 46 exceeds a predetermined reference value. In case that a deceleration of not less than a predetermined reference value is applied to the vehicle 46, an internal switch of the satellite sensor 30 is turned on and the satellite sensor outputs an ON signal. The floor sensor 32 is an acceleration sensor for measuring the impact on the vehicle 46. In accordance with a concrete procedure, the floor sensor 32 always measures the deceleration applied to the direction of the length of the vehicle 46 and outputs the measurement value as a signal.

The control circuit 20 includes a central processing unit (CPU) 22, a read only memory (ROM) 26, a random access memory (RAM) 28, and an input/output circuit (I/O circuit) 24, which are connected to one another via buses. The CPU 22 carries out various processing operations for activation control according to the programs stored in the ROM 26. Data output as signals from the sensors 30 and 32 and results of operations carried out by the CPU 22 are stored in the RAM 28. The I/O circuit 24 receives the signals output from the sensors 30 and 32 and inputs activation signals to the driving circuit 34.

The CPU 22 has the functions of an activation control unit 40 and a threshold variation pattern changing unit 42. The activation control unit 40 compares the value of a function calculated from the measurement of the floor sensor 32 with a predetermined threshold value and controls activation of the air bag 36 based on the result of comparison. The threshold variation pattern changing unit 42 changes one variation pattern of the threshold value to another variation pattern when the satellite sensor 30 detects an impact of not less than a predetermined reference value.

The driving circuit 34 drives a squib 38 for ignition in the air bag 36 in response to an activation signal output from the control circuit 20.

The air bag 36 includes, other than the squib 38 functioning as the igniter, a gas-generating agent (not shown) ignited by the squib 38 and a bag (not shown) inflated with the gas.

Among these constituents, the control circuit 20, the floor sensor 32, and the driving circuit 34 are incorporated in an ECU (electronic control unit) 44 shown in FIG. 2 and is mounted on a floor tunnel formed on the approximate center in the vehicle 46. The satellite sensors 30 are disposed in the front portion of the vehicle 46 and more specifically, are arranged off to the right front and the left front of the floor sensor 32 in the ECU 44. The floor sensor 32 and the satellite sensor 30 of this embodiment respectively correspond to impact measurement means and impact detection means.

The following describes the operations of the satellite sensor 30, the floor sensor 32, and the CPU 22 in the event of a collision of the vehicle.

Figure 3:
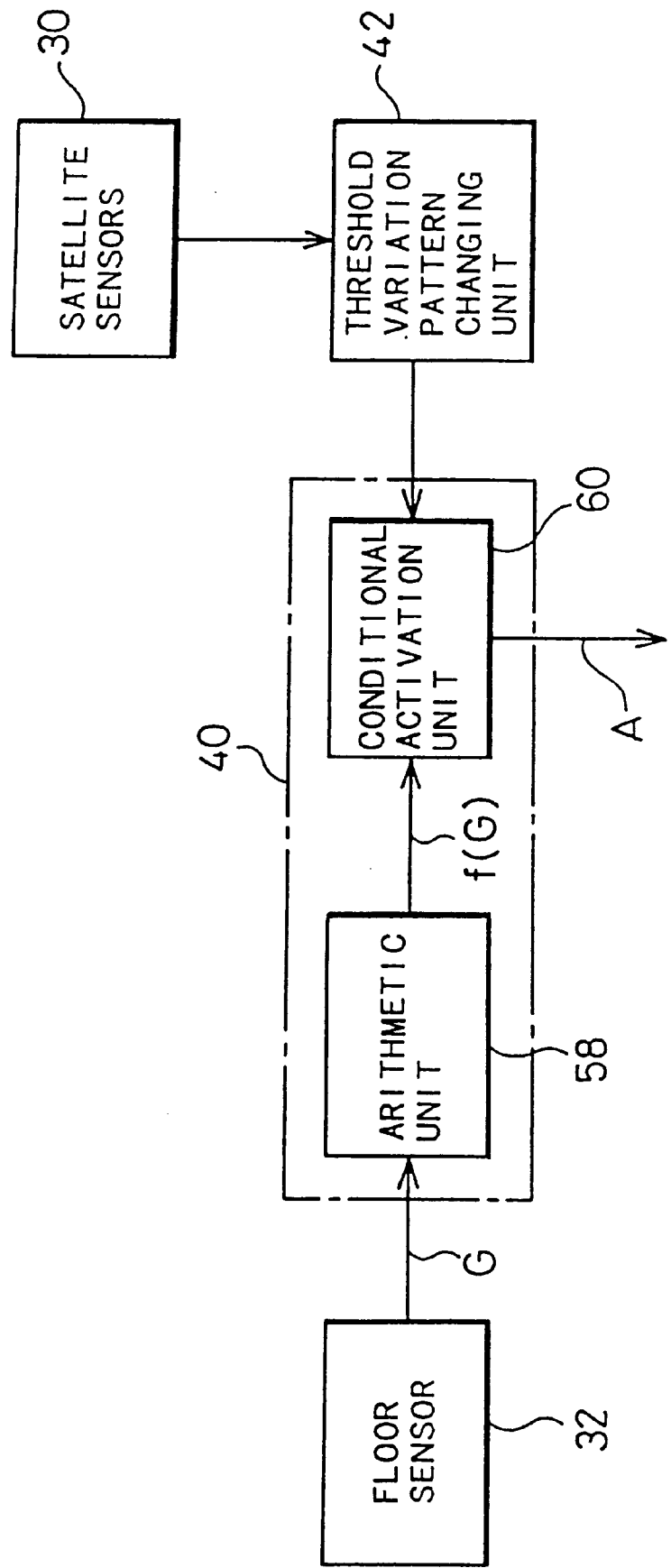
FIG. 3 shows the operations of the satellite sensors 30, the floor sensor 32, and the CPU 22 shown in FIG. 1.

FIG. 3 shows the operations of the satellite sensors 30, the floor sensor 32, and the CPU 22 shown in FIG. 1. The activation control unit 40 in the CPU 22 includes an arithmetic unit 58 and a conditional activation unit 60.

Figure 28:
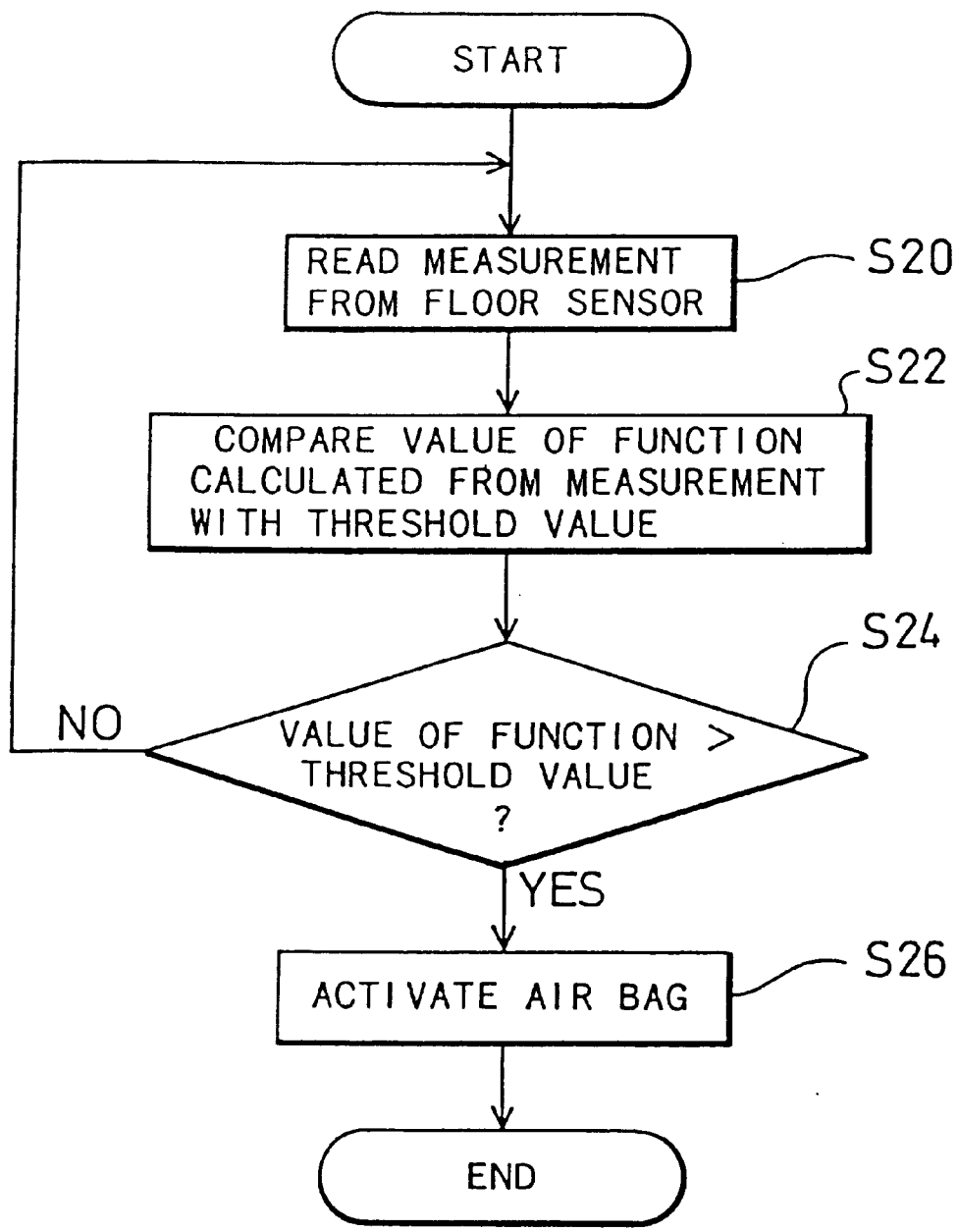
FIG. 28 is a flowchart showing the operations carried out by the floor sensor 32 and the CPU 22 shown in FIG. 1.
Figure 29:
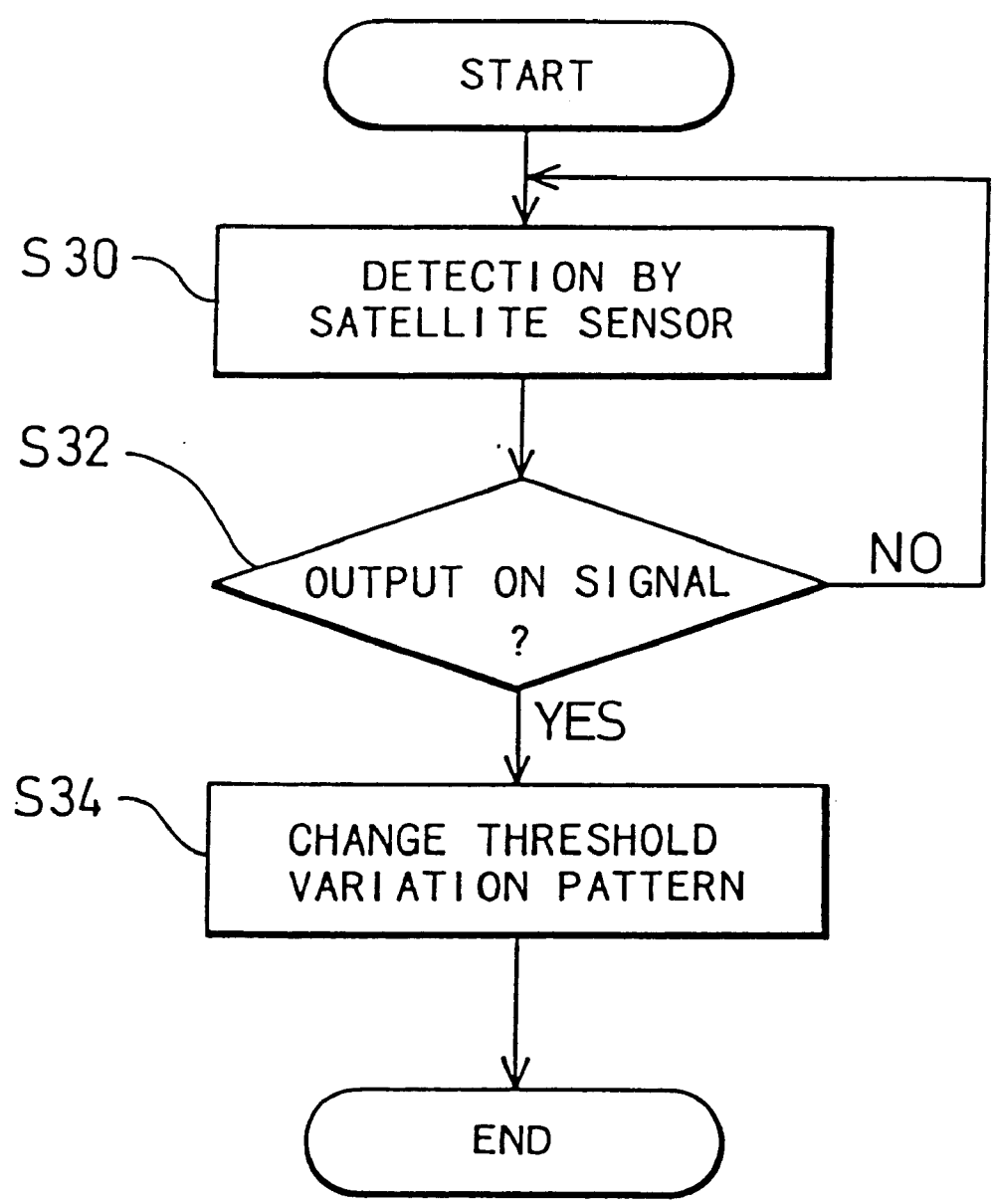
FIG. 29 is a flowchart showing the operations carried out by the satellite sensor 30 and the CPU 22 shown in FIG. 1.

FIGS. 28 and 29 are flowcharts showing the operations carried out by the satellite sensor 30, the floor sensor 32, and the CPU 22 shown in FIG. 1. The processing routine of FIG. 28 and the processing routine of FIG. 29 are executed substantially in parallel.

At step S20 in the flowchart of FIG. 28, the floor sensor 32 measures a deceleration G applied to the direction of the length of the vehicle 46 at any time and outputs the measurement G as a signal as shown in FIG. 3. The arithmetic unit 58 of the activation control unit 40 carries out a predetermined arithmetic operation on the measurement G output from the floor sensor 32, so as to determine a function f(G). The function F(G) may be the velocity (obtained by integrating the deceleration G once with respect to time), the moving distance (obtained by integrating the deceleration G twice with respect to time), the moving average (obtained by integrating the deceleration G over a fixed time period), the intensity of the deceleration G at a specific frequency, or a vector component representing the deceleration G in the direction of the length or the width of the vehicle. The function f(G) may otherwise be equal to the deceleration G itself (that is, the intact measurement G). In this case, it can be thought that the arithmetic operation multiplies the measurement G by the coefficient '1'.

The conditional activation unit 60 of the activation control unit 40 compares the value of the function f(G) calculated by the arithmetic unit 58 with a predetermined threshold value T at step S22. The threshold value T is not fixed but varied with a variation in velocity v of an object specified as non-stationary (for example, a vehicle passenger) in the vehicle 46.

The velocity of the object specified as non-stationary (hereinafter referred to as the non-stationary object) in the vehicle 46 is obtained by integrating the deceleration G once with respect to time t. When the deceleration G is applied to the vehicle moving forward, the non-stationary object in the vehicle is pulled forward by the inertial force and accelerates forward relative to the vehicle. The velocity v of the non-stationary object relative to the vehicle at this moment is determined by integrating the deceleration G once. The arithmetic unit 58 calculates the velocity v simultaneously with the calculation of the value of the function f(G) from the observed deceleration G.

Figure 4A:
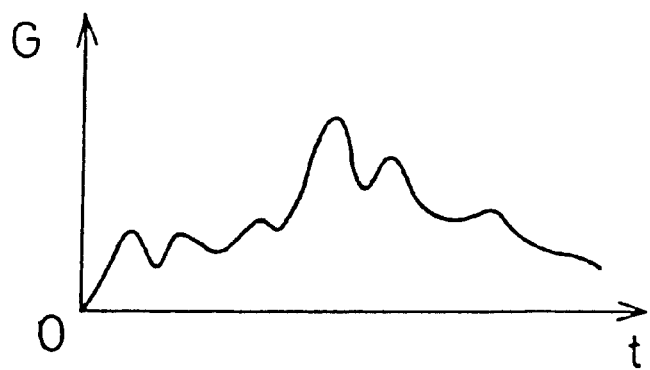
FIGS. 4(a) through 4(c) are characteristic charts respectively showing a variation in deceleration G plotted against the time t1, a variation in velocity v of a non-stationary object plotted against the time t, and a variation in function f(G) plotted against the velocity v.
Figure 4B:
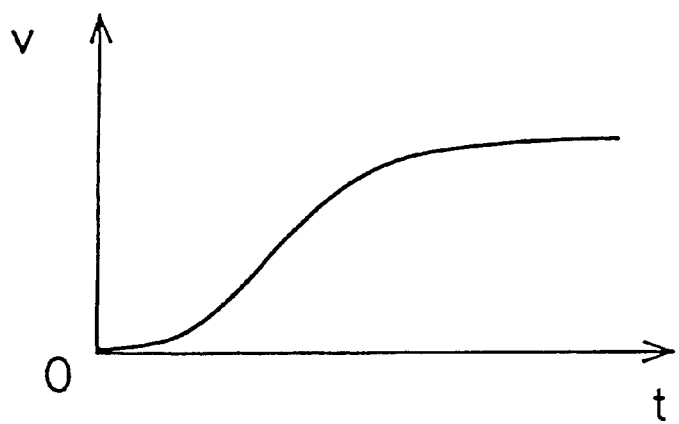
Figure 4C:
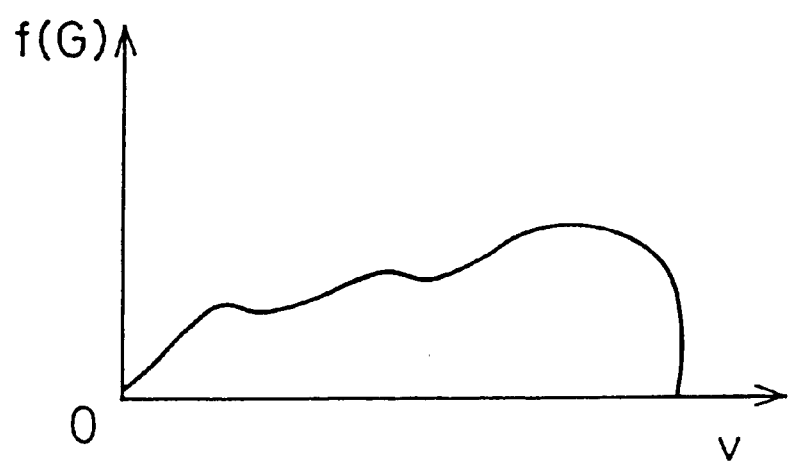

FIGS. 4(a) through 4(c) are characteristic charts respectively showing a variation in deceleration G plotted against the time t, a variation in velocity v of the nonstationary object plotted against the time t, and a variation in function f(G) plotted against the velocity v. In the graphs of FIG. 4(a), the deceleration G is plotted as ordinate and the time t as abscissa. In the graphs of FIG. 4(b), the velocity v is plotted as ordinate and the time t as abscissa. In the graphs of FIG. 4(c), the function f(G) is plotted as ordinate and the velocity v as abscissa.

In the example of FIG. 4, whereas the deceleration G fluctuates significantly with time, the velocity v obtained by integrating the deceleration G once monotonously increases with time. The function f(G) of the deceleration G obtained as a result of the predetermined arithmetic operation varies as shown in FIG. 4(c) with a variation in velocity v shown in FIG. 4(b).

Figure 5A:
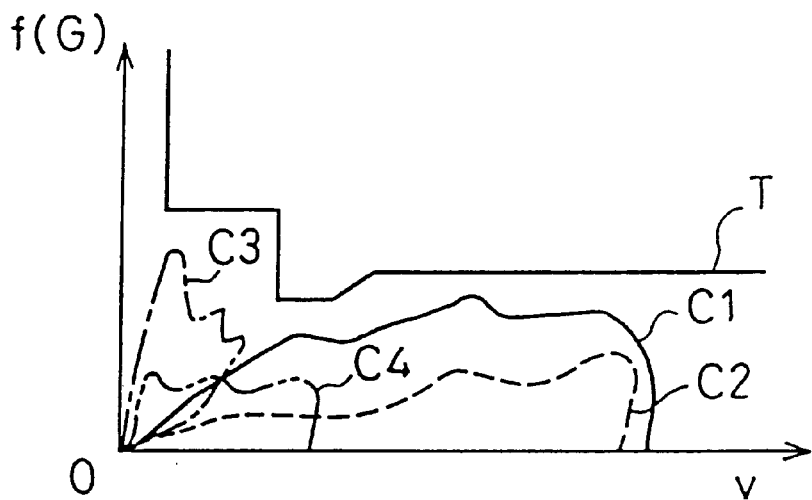
FIGS. 5(a) and 5(b) are characteristic charts showing variation patterns of the threshold value T used in the first embodiment against the velocity v of the non-stationary object.
Figure 5B:
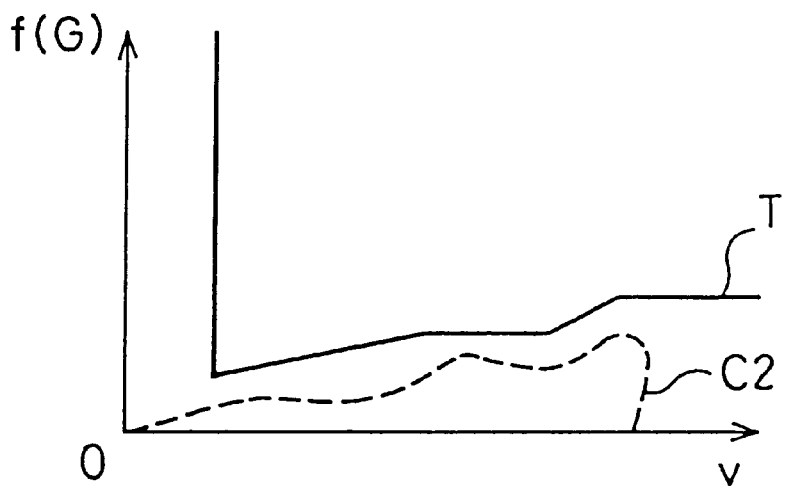

FIGS. 5(a) and 5(b) are characteristic charts showing variation patterns of the threshold value T used in the first embodiment against the velocity v of the non-stationary object. In the graphs of FIG. 5, the function f(G) determined by the arithmetic unit 58 is plotted as ordinate and the velocity v of the non-stationary object in the vehicle as abscissa. As shown in FIG. 5, the threshold value T varies with a variation in velocity v of the non-stationary object in the vehicle. The difference between the characteristic charts of FIGS. 5(a) and 5(b) will be discussed later.

The conditional activation unit 60 refers to a variation pattern of the threshold value T against the velocity v as shown in FIG. 5, which is stored in advance, reads a threshold value T corresponding to the velocity v calculated by the arithmetic unit 58 from the variation pattern, and compares the threshold value T with the value of the function f(G) calculated by the arithmetic unit 58 at step S22 in the flowchart of FIG. 28. In case that the value of the function f(G) is greater than the threshold value T at step S24, the conditional activation unit 60 inputs an activation signal A to the driving circuit 34 shown in FIG. 1. In response to the activation signal A, the driving circuit 34 drives the squib 38 to ignite the gas-generating agent (not shown), in order to activate the air bag 36 at step S26.

Referring to the flowchart of FIG. 29, as discussed previously, when a deceleration of not less than a predetermined reference value is applied to the vehicle 46 at step S30, the internal switch of the satellite sensor 30 is turned on and the satellite sensor 30 outputs an ON signal at step S32. The reference value is set to be greater than the value of the impact detected at the position where the satellite sensor 30 is installed when a head-on collision applies an impact of such a degree that does not require activation of the air bag to the vehicle 46 or when the vehicle 46 runs on a rough road. Namely the internal switch of the satellite sensor 30 is not turned on when the impact of a head-on collision applied to the vehicle 46 has the degree that does not require activation of the air bag or when the vehicle 46 runs on a rough road. In other cases (for example, in the event of a collision other than the head-on collision), even when the impact has the degree that does not require activation of the air bag, the switch in the satellite sensor 30 may be turned on to output an ON signal.

The ON signal output from the satellite sensor 30 is input to the threshold variation pattern changing unit 42 as shown in FIG. 3. Referring back to the flowchart of FIG. 29, the threshold variation pattern changing unit 42 changes one variation pattern of the threshold value T against the velocity v to another variation pattern in response to the ON signal from the satellite sensor 30 at step S34. In accordance with a concrete procedure, when receiving the ON signal from the satellite sensor 30, the threshold variation pattern changing unit 42 changes the variation pattern of the threshold value T stored in the conditional activation unit 60 from the variation pattern shown in FIG. 5(a) to the variation pattern shown in FIG. 5(b).

In the graphs of FIGS. 5(a) and 5(b), C1 through C4 are characteristic curves representing variations in function f (G) against the velocity v of the non-stationary object. The characteristic curve C1 shows a variation in function f(G) when a head-on collision applies an impact of such a degree that does not require activation of the air bag to the vehicle 46. The characteristic curve C2 shows a variation in function f(G) when a collision other than the head-on collision applies an impact of the degree that does not require activation of the air bag to the vehicle 46. The characteristic curves C3 and C4 respectively show variations in function f(G) when the vehicle 46 runs on a rough road. When the vehicle runs on a rough road, it is naturally not required to activate the air bag. Namely all of the characteristic curves C1 through C4 show variations in function f(G) against the velocity v in case that activation of the air bag is not required.

The threshold value T used for the conditional activation of the air bag, that is, for the comparison with the value of the function f(G), should be greater than any of these characteristic curves C1 through C4. In order to determine the necessity for activation of the air bag as quickly as possible, however, the threshold value T should be as small as possible while being greater than these characteristic curves C1 through C4. The variation pattern of the threshold value T shown in FIG. 5(a) is accordingly obtained by drawing a plurality of characteristic curves representing variations in function f(G) in case that activation of the air bag is not required and then specifying a pattern that exceeds these characteristic curves but is as close as possible to these characteristic curves. In accordance with a concrete procedure, an envelope of these characteristic curves is specified as the variation pattern of the threshold value T.

As mentioned above, the satellite sensor 30 does not output an on signal when a head-on collision applies an impact of such a degree that does not require activation of the air bag to the vehicle 46 or when the vehicle 46 runs on a rough road. The fact that the satellite sensor 30 outputs an ON signal suggests one of the other cases. In other words, these two cases can be left out of consideration when the satellite sensor 30 outputs an ON signal. The variation pattern of the threshold value T shown in FIG. 5(b) is thus determined after exclusion of all the cases, such as the characteristic curve C1, in which the impact of a head-on collision applied to the vehicle 46 has the degree that does not require activation of the air bag and the cases, such as the characteristic curves C3 and C4, in which the vehicle 46 runs on a rough road. Namely the variation pattern of the threshold value T shown in FIG. 5(b) is obtained by drawing a plurality of characteristic curves, such as the characteristic curve C2, representing variations in function f(G) in case that collisions other than the head-on collision apply impacts of such a degree that does not require activation of the air bag to the vehicle 46 and then specifying a pattern that exceeds these characteristic curves but is as close as possible to these characteristic curves in the same manner as FIG. 5(a). In accordance with a concrete procedure, an envelope of these characteristic curves is specified as the variation pattern of the threshold value T.

The floor sensor 32 generally detects the impact or the deceleration G more sensitively in the event of a head-on collision than in the event of other collisions within a predetermined time period after the collision (that is, at the initial stag of a collision). Detection of the impact also holds a relatively high sensitivity during a drive on a rough road. The value of the function calculated from the measurement of the floor sensor 32 in the event of a collision other than the head-on collision (that is, the curve C2) is thus generally smaller than the value of the function in the event of a head-on collision or during a drive on a rough road (that is, the curves C1, C3, and C4). The variation pattern of the threshold value T shown in FIG. 5(b) is accordingly smaller, as a whole, than the variation pattern shown in FIG. 5(a).

As mentioned above, the threshold variation pattern changing unit 42 changes the variation pattern of the threshold value T from the pattern shown in FIG. 5(a) to the pattern shown in FIG. 5(b) in response to an ON signal from the satellite sensor 30 as a trigger.

Until the satellite sensor 30 outputs an ON signal, the conditional activation unit 60 of the activation control unit 40 compares the value of the function f(G) with the threshold value T read from the variation pattern of the threshold value T shown in FIG. 5(a). After the satellite sensor 30 outputs an ON signal, on the other hand, the conditional activation unit 60 compares the value of the function f(G) with the threshold value T read from the variation pattern of the threshold value T shown in FIG. 5(b).

Figure 6A:
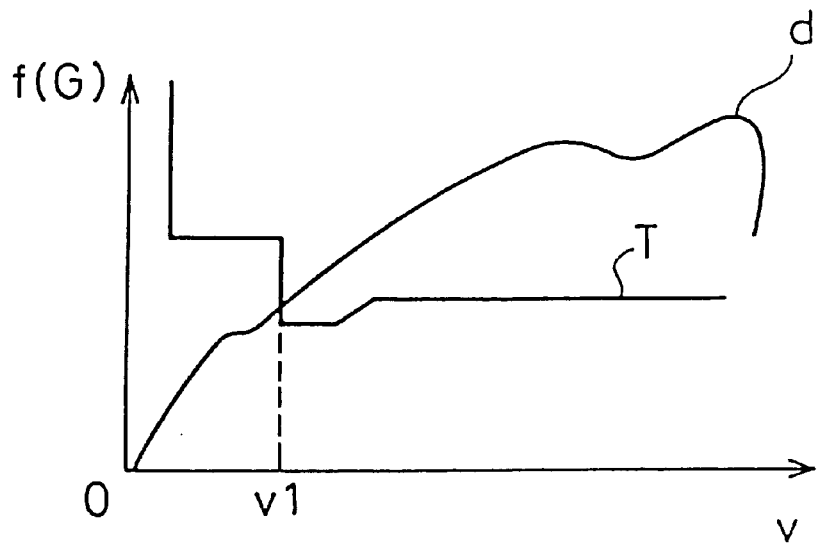
FIGS. 6(a) and 6(b) are characteristic charts showing a variation in function f(G) against the velocity v in case that a collision applies an impact of the degree that requires activation of the air bag to the vehicle, respectively with the variation patterns of the threshold value T shown in FIGS. 5(a) and 5(b)
Figure 6B:
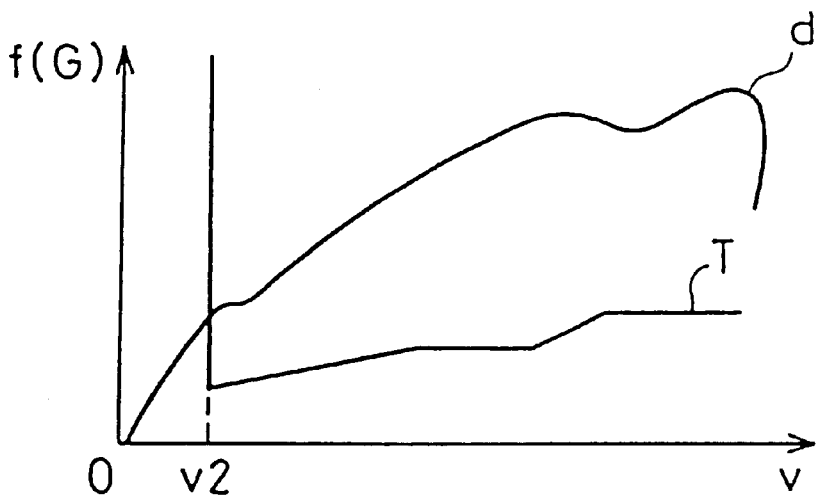

FIGS. 6(a) and 6(b) are characteristic charts showing a variation in function f(G) against the velocity v in case that a collision applies an impact of the degree that requires activation of the air bag to the vehicle, respectively with the variation patterns of the threshold value T shown in FIGS. 5(a) and 5(b). In the graphs of FIG. 6, the function f(G) determined by the arithmetic unit 58 is plotted as ordinate and the velocity v of the non-stationary object in the vehicle as abscissa. FIGS. 6(a) and 6(b) show the same characteristic curve d representing a variation in function f(G) upon a given impact, respectively with the variation patterns of the threshold value T shown in FIGS. 5(a) and 5(b).

In case that the variation pattern of the threshold value T shown in FIG. 5(a) is adopted, when the velocity v of the non-stationary object is equal to v1, the value of the function f(G) in the curve d exceeds the threshold value T to activate the air bag as shown in FIG. 6(a). In case that the variation pattern shown in FIG. 5(b), which is smaller, as a whole, than the variation pattern of FIG. 5(a), is adopted, on the other hand, when the velocity v of the non-stationary object is equal to v2 that is smaller than v1, the value of the function f(G) in the curve d exceeds the threshold value T to activate the air bag as shown in FIG. 6(b).

Since the velocity v of the non-stationary object monotonously increases with time as shown in FIG. 4(b), the smaller velocity v represents the earlier time under the condition of the given impact. The velocity v2 shown in FIG. 6(b) is smaller than the velocity v1 shown in FIG. 6(a), so that the air bag is activated at the earlier timing in the case of FIG. 6(b) than in the case of FIG. 6(a). In other words, the variation pattern of the threshold value T shown in FIG. 5(b) activates the air bag at the earlier timing than the variation pattern shown in FIG. 5(a).

In case that the satellite sensor 30 outputs an ON signal before the velocity v of the non-stationary object reaches the value v1, the structure of the embodiment that changes the variation pattern of the threshold value T from the pattern of FIG. 5(a) to the pattern of FIG. 5(b) in response to the ON signal from the satellite sensor 30 enables the air bag to be activated at the earlier timing, compared with the structure that uses only the variation pattern of FIG. 5(a).

As discussed above in the structure of the first embodiment, the threshold variation pattern changing unit 42 changes the variation pattern of the threshold value T adopted for the conditional activation of the air bag 36 in response to an ON signal output from the satellite sensor 30 from the variation pattern shown in FIG. 5(a) to the variation pattern shown in FIG. 5(b). This exerts the following effects. When a head-on collision applies an impact of such a degree that does not require activation of the air bag to the vehicle or when the vehicle runs on a rough road, the satellite sensor 30 does not output an ON signal and the variation pattern of the threshold value T shown in FIG. 5(a) is used for the conditional activation of the air bag. In this case, the value of the function f(G) does not exceed the threshold value T and the air bag is not activated. When a collision other than the head-on collision applies an impact of the degree that requires activation of the air bag to the vehicle, on the other hand, the satellite sensor 30 outputs an ON signal and the variation pattern of the threshold value T shown in FIG. 5(b), which is smaller than the pattern of FIG. 5(a) as a whole, is used for the conditional activation of the air bag. In this case, the value of the function f(G) exceeds the threshold value T at the earlier stage, so that the air bag is activated at the earlier timing.

In the first embodiment, the threshold value T varies with a variation in velocity v of the non-stationary object. Compared with the threshold value T varying with time t, the threshold value T of this embodiment is hardly affected by the type of the object, against which the vehicle collides, and ensures the effective control of activation of the air bag. It is here assumed that the vehicle collides against a plurality of different objects in an identical state of collision. Under such conditions, the variation in function f(G) against the velocity v is compared with the variation in function f(G) against the time t. In the case of the variation in function f (G) against the time t, the variation curves may be lengthened or shortened along the time axis depending upon the type of the object in collision and have no reproducibility in waveform. In the case of the variation in function f(G) against the velocity v, on the other hand, the variation curves (for example, the characteristic curves C shown in FIG. 5) are substantially unchanged irrespective of the type of the object in collision and have reproducibility in waveform. Among the variation patterns of the threshold value T obtained as the envelope of such variation curves, the variation pattern against the velocity v is accordingly less affected by the type of the object in collision than the variation pattern against the time t.

b. Second Embodiment

Figure 7:
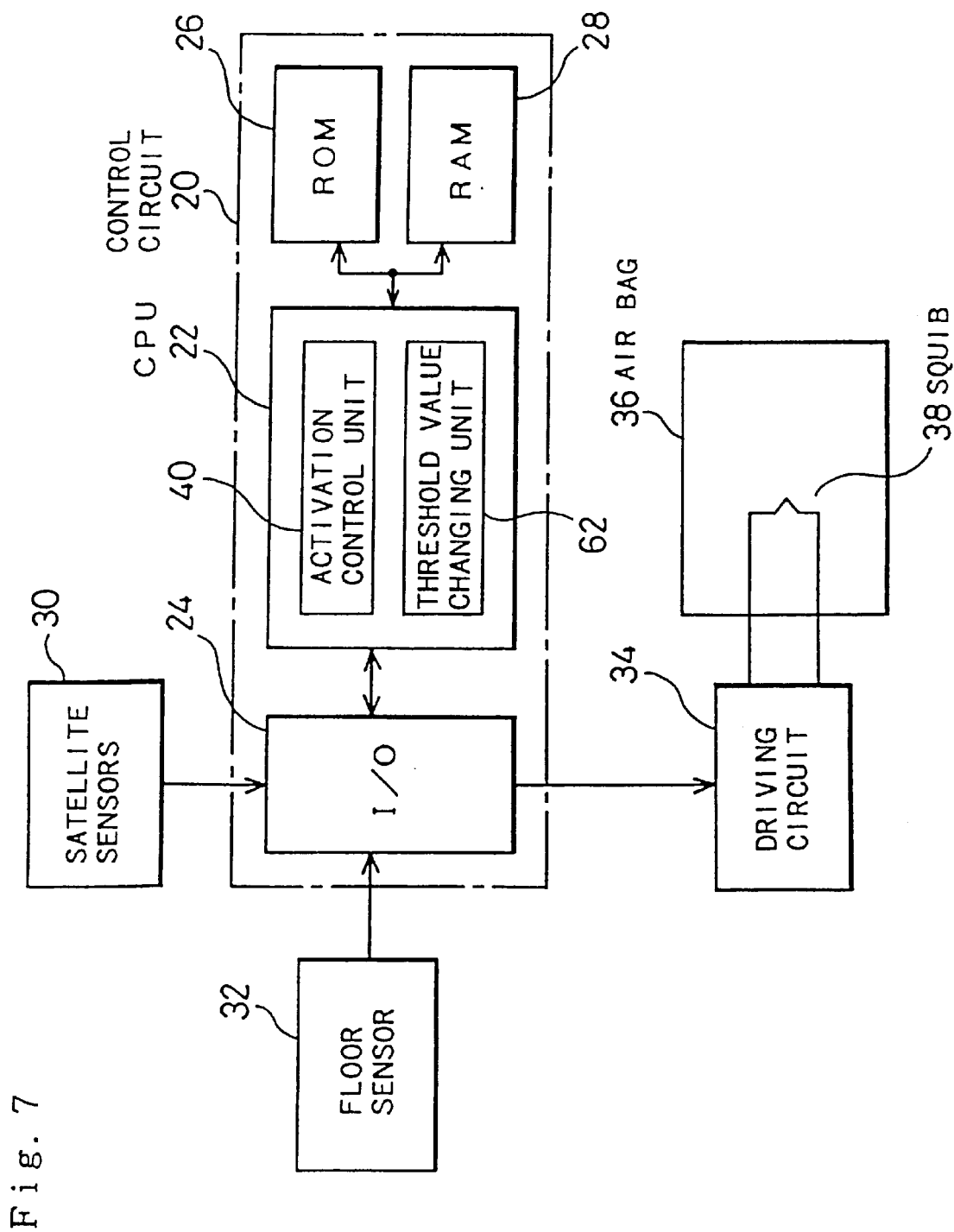
FIG. 7 is a block diagram illustrating another activation control apparatus using satellite sensors as a second embodiment according to the present invention.
Figure 8:
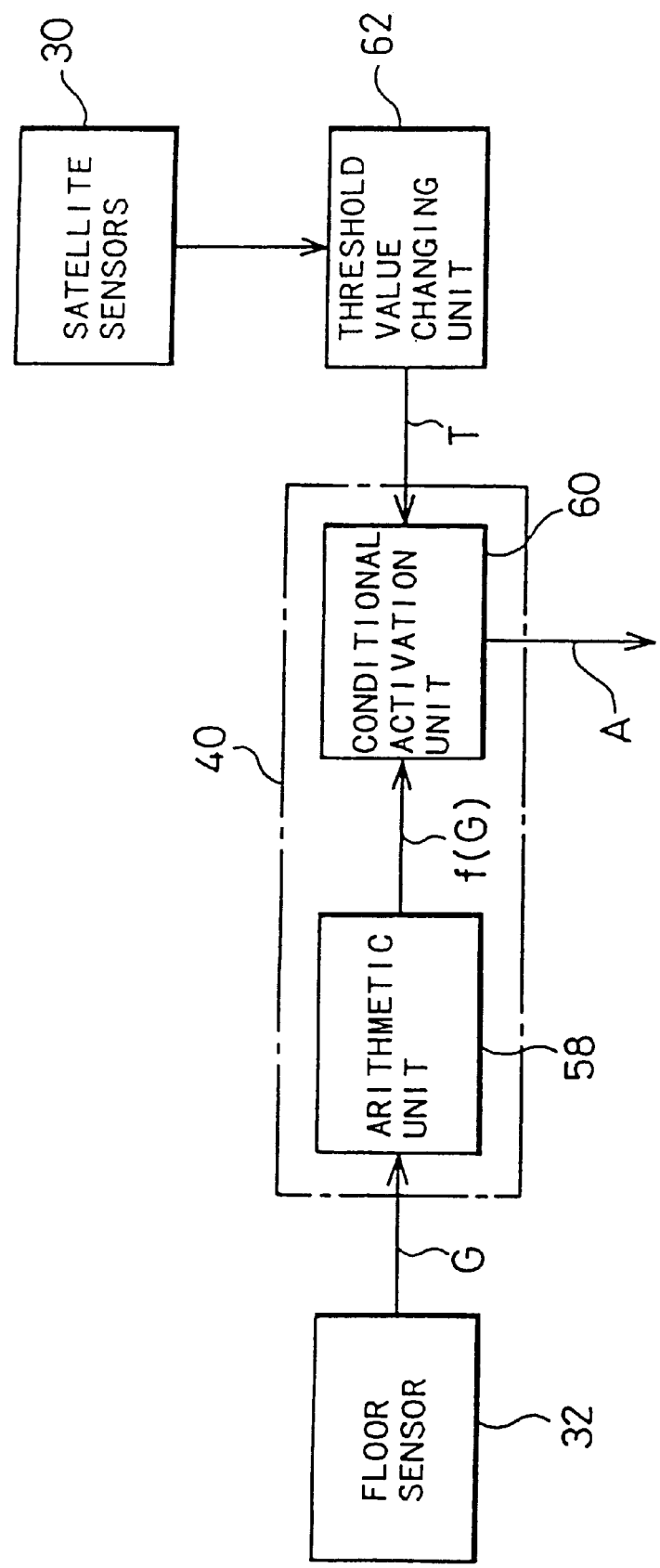
FIG. 8 shows the operations of the satellite sensors 30, the floor sensor 32, and the CPU 22 shown in FIG. 7.

FIG. 7 is a block diagram illustrating another activation control apparatus using satellite sensors as a second embodiment according to the present invention. FIG. 8 shows the operations of the satellite sensors 30, the floor sensor 32, and the CPU 22 shown in FIG. 7.

The structural difference between the second embodiment and the first embodiment is that the CPU 22 of the second embodiment shown in FIG. 7 includes a threshold value changing unit 62, in place of the threshold variation pattern changing unit 42 of the first embodiment shown in FIG. 1. The operational differences include the operations of the threshold value changing unit 62 that are different from those of the threshold variation pattern changing unit 42 and the operations of the activation control unit 40 in the second embodiment that are a little different from those in the first embodiment. The other constituents and the operations in the second embodiment are identical with those in the first embodiment and are thus not specifically described here.

Figure 30:
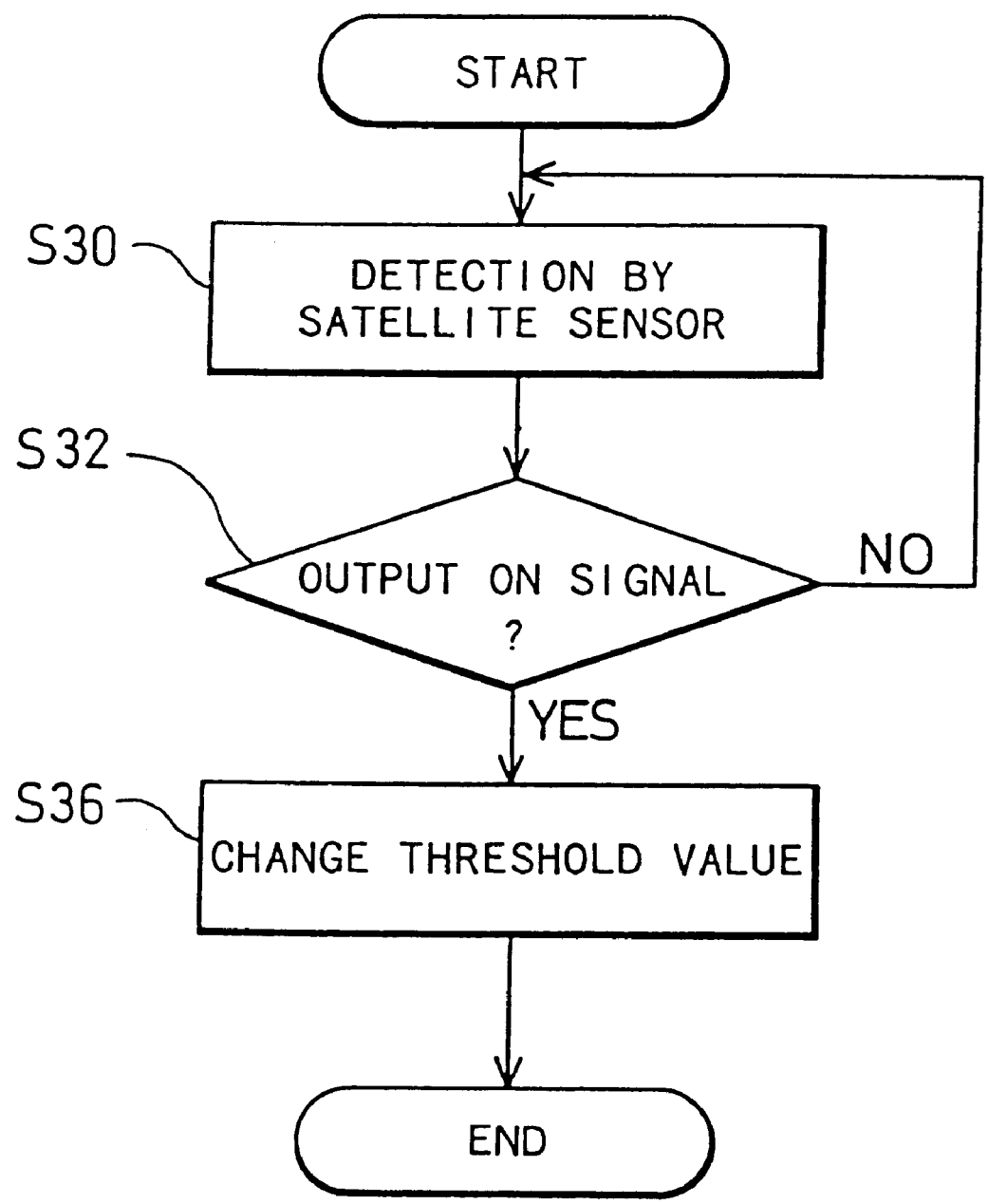
FIG. 30 is a flowchart showing the operations carried out by the satellite sensor 30 and the CPU 22 shown in FIG. 7.

FIG. 30 is a flowchart showing the operations carried out by the satellite sensor 30 and the CPU 22 shown in FIG. 7. The processing routine of FIG. 30 is executed substantially in parallel to the processing routine of FIG. 28.

In the second embodiment, the CPU 22 has the functions of the activation control unit 40 and the threshold value changing unit 62 as shown in FIG. 7. The activation control unit 40 includes the arithmetic unit 58 and the conditional activation unit 60 as shown in FIG. 8.

The arithmetic unit 58 carries out a predetermined arithmetic operation on the measurement G output from the floor sensor 32, so as to determine a function f(G). The conditional activation unit 60 compares the value of the function f(G) calculated by the arithmetic unit 58 with the threshold value T at step S22 in the flowchart of FIG. 28. Unlike the first embodiment, the threshold value T in the second embodiment does not vary with a variation in velocity v of the non-stationary object, but is fixed to a certain value or varies with time t. The threshold value T used in the conditional activation unit 60 is output from the threshold value changing unit 62.

Figure 9:
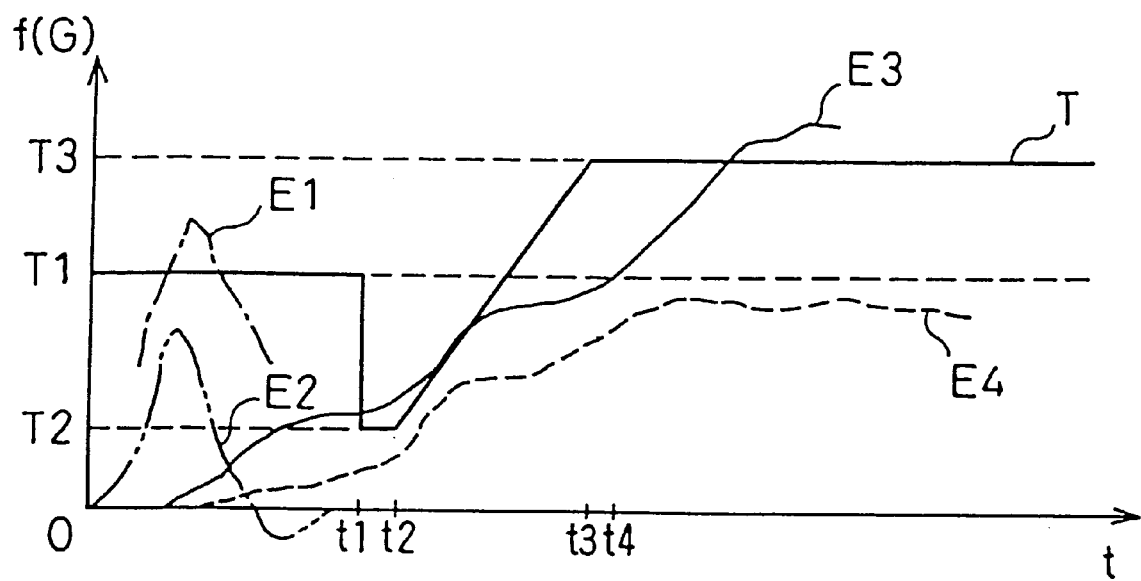
FIG. 9 is a characteristic chart showing a variation in threshold value T with time used in the second embodiment and variations in function f(G) with time in the event of a collision or during a drive on a rough road.

FIG. 9 is a characteristic chart showing a variation in threshold value T with time used in the second embodiment and variations in function f(G) with time in the event of a collision or during a drive on a rough road. In the graph of FIG. 9, the function f(G) determined by the arithmetic unit 58 is plotted as ordinate and the time t as abscissa. The characteristic curve E1 shows a variation in function f(G) with time when a head-on collision applies an impact of such a degree that requires activation of the air bag to the vehicle. The characteristic curve E2 shows a variation in function f(G) with time during a drive on a rough road. The characteristic curve E3 shows a variation in function f(G) with time when a collision other than the head-on collision applies an impact of the degree that requires activation of the air bag to the vehicle. The characteristic curve E2 shows a variation in function f(G) with time when a collision other than the head-on collision applies an impact of such a degree that does not require activation of the air bag to the vehicle.

The threshold value changing unit 62 gives the values shown in FIG. 9 as the threshold value T to the conditional activation unit 60. In the example of FIG. 9, the satellite sensor 30 inputs an ON signal to the threshold value changing unit 62 at a time point t1. Until the time point t1, at which the satellite sensor 30 outputs the ON signal, a fixed value T1 is given as the threshold value T to the conditional activation unit 60. At the time point t1 when the ON signal is input, the threshold value T is changed from the value T1 to a smaller value T2. During the time period between time points t2 and t3, the threshold value T is gradually increased. After the time point t3, another fixed value T3 is given as the threshold value T to the conditional activation unit 60. This is a concrete procedure carried out at step S36 in the flowchart of FIG. 30.

The fixed value T1 given as the threshold value T until the input of an ON signal is specified in the following manner. Before the satellite sensor 30 outputs an ON signal, in order to prevent unnecessary activation of the air bag when a head-on collision applies an impact of such a degree that does not require activation of tile air bag to the vehicle or when the vehicle runs on a rough road, it is necessary to set the threshold value T by taking these two cases as well as the other cases into consideration. The values of the function f(G) are respectively determined when collisions (including a head-on collision and other collisions) apply impacts of such a degree that does not require activation of the air bag to the vehicle and when the vehicle runs on a rough road. The threshold value T is then set equal to the fixed value T1 that is a little greater than the maximum among the values of the function f(G) thus obtained.

The value given as the threshold value T after the input of an ON signal is specified in the following manner. The input of an ON signal suggests no cases in which a head-on collision applies an impact of the degree that does not require activation of the air bag to the vehicle or the vehicle runs on a rough road. After the satellite sensor 30 outputs an ON signal, these two cases can thus be left out of consideration. A concrete procedure first draws a plurality of characteristic curves, such as the characteristic curve E4, representing variations in function f(G) with time when collisions other than the head-on collision apply impacts of such a degree that does not require activation of the air bag to the vehicle, and measures the time points on the respective characteristic curves, at which the satellite sensor 30 outputs an ON signal. The procedure then adjusts the time axes of the respective characteristic curves to make all the time points on the respective characteristic curves, at which the ON signal is output, coincident with a specific time point on the time axis, and superposes all the characteristic curves one upon another. The procedure subsequently determines an envelope of the respective characteristic curves after the time points of the output of the ON signal, that is, a pattern that exceeds these characteristic curves but is as close as possible to these characteristic curves. A broken line T2–T3 that is approximate to the envelope is finally set as the threshold value T.

The floor sensor 32 generally detects the impact or the deceleration G more sensitively in the event of a head-on collision than in the event of other collisions within a predetermined time period after the collision (that is, at the initial stage of a collision). Detection of the impact also holds a relatively high sensitivity during a drive on a rough road. At the initial stage of a collision, the value of the function f(G) calculated from the measurement of the floor sensor 32 in the event of a collision other than the head-on collision is thus smaller than the value of the function f(G) in the event of a head-on collision or during a drive on a rough road. The threshold value T2 after the output of the ON signal is accordingly smaller than the threshold value T1 before the output of the ON signal.

The threshold value changing unit 62 gives the threshold value T specified as above to the conditional activation unit 60 in response to an ON signal output from the satellite sensor 30. Until the satellite sensor 30 outputs an ON signal, the conditional activation unit 60 compares the value of the function f(G) with the threshold value T fixed to the value T1. When a head-on collision applies an impact of the degree that does not require activation of the air bag to the vehicle or when the vehicle runs on a rough road, as shown by the characteristic curve E2 (in case of a drive on a rough road), the value of the function f(G) does not exceed the threshold value T and the air bag is not activated. When the head-on collision applies an impact of such a degree that requires activation of the air bag to the vehicle, on the other hand, as shown by the characteristic curve E1, the value of the function f(G) exceeds the threshold value T and the air bag is activated.

After the satellite sensor 30 outputs an ON signal, the conditional activation unit 60 compares the value of the function f(G) with the threshold value changing from T2 to T3 with time. For example, when a collision other than the head-on collision applies an impact of the degree that requires activation of the air bag to the vehicle, as shown by the characteristic curve E3, the value of the function f(G) exceeds the threshold value T at the time point t1 and the air bag is activated.

It is here assumed that the threshold value T is not changed in response to the ON signal. In this case, the threshold value T is fixed to the value T1, and the value of the function f(G) exceeds the threshold value T at a time point t4. The structure of the second embodiment that changes the threshold value T from the value T1 to the smaller value T2 in response to an ON signal output from the satellite sensor 30 enables the air bag to be activated at the earlier timing.

As discussed above, in the structure of the second embodiment, the threshold value changing unit 62 changes the threshold value T used for the conditional activation of the air bag 36 according to the broken line shown in FIG. 9 in response to an ON signal output from the satellite sensor 30. This exerts the following effects. When a head-on collision applies an impact of such a degree that does not require activation of the air bag to the vehicle or when the vehicle runs on a rough road, the satellite sensor 30 does not output an ON signal and the threshold value T is fixed to the value T1. In this case, the value of the function f(G) does not exceed the threshold value T and the air bag is not activated. When a collision other than the head-on collision applies an impact of the degree that requires activation of the air bag to the vehicle, on the other hand the satellite sensor 30 outputs an ON signal and the threshold value T gradually increases with time from the value T2 that is smaller than T1. In this case, the value of the function f(G) exceeds the threshold value T at the earlier stage, so that the air bag is activated at the earlier timing.

In the first embodiment discussed previously, the variation pattern of the threshold value T after the output of an ON signal from the satellite sensor 30 is obtained as an envelope of a plurality of characteristic curves that represent variations in function f(G) when collisions other than the head-on collision apply impacts of such a degree that does not require activation of the air bag to the vehicle. The variation pattern of the threshold value T may, however, be obtained in the same manner as the second embodiment. This modified procedure first draws a plurality of characteristic curves representing variations in function f(G) with time when collisions other than the head-on collision apply impacts of such a degree that does not require activation of the air bag to the vehicle, and measures the time points on the respective characteristic curves, at which the satellite sensor 30 outputs an ON signal. The procedure then adjusts the time axes of the respective characteristic curves to make all the time points on the respective characteristic curves, at which the ON signal is output, coincident with a specific time point on the time axis, and superposes all the characteristic curves one upon another. The procedure subsequently specifies an envelope of the respective characteristic curves after the time points of the output of the ON signal as the variation pattern of the threshold value T.

In the first embodiment, the threshold value T varies with a variation in velocity v1 of the non-stationary object in the vehicle 46, and the variation pattern of the threshold value T against the velocity v is changed in response to an ON signal output from the satellite sensor 30. Like the second embodiment, however, the threshold value T may vary with time t and the variation pattern of the threshold value T against the time t may be changed in response to an ON signal output from the satellite sensor 30.

As discussed below in a third embodiment of the present invention, in case that the plurality of satellite sensors installed have different reference values of deceleration to turn on the internal switch, the variation pattern of the threshold value T in the first embodiment and the threshold value T in the second embodiment may be changed every time when each satellite sensor outputs an ON signal.

c. Satellite Sensor

As mentioned previously, the satellite sensors 30 used in the first and the second embodiment are disposed in the front portion of the vehicle 46 and more specifically, are arranged off to the right front and the left front of the floor sensor 32 in the ECU 44 as shown in FIG. 2. The arrangement of the satellite sensors 30 at the two different positions off to the right front and the left front enables an impact unsymmetrical with respect to the center line of the vehicle (the center line along the length), such as an oblique collision or an offset collision, to be detected with high accuracy.

An oblique collision or an offset collision does a damage to a part of the vehicle. In case that signal lines extending from the satellite sensor (that is, a wire harness) exist in the damaged part, the wire harness may be down on the impact of the collision. This cuts off the transmission path of the ON signal from the satellite sensor to the ECU 44.

In the above embodiments, the wire harness extending from each satellite sensor is accordingly divided into two directions, that is, the right side and the left side in the vehicle.

Figure 10A:
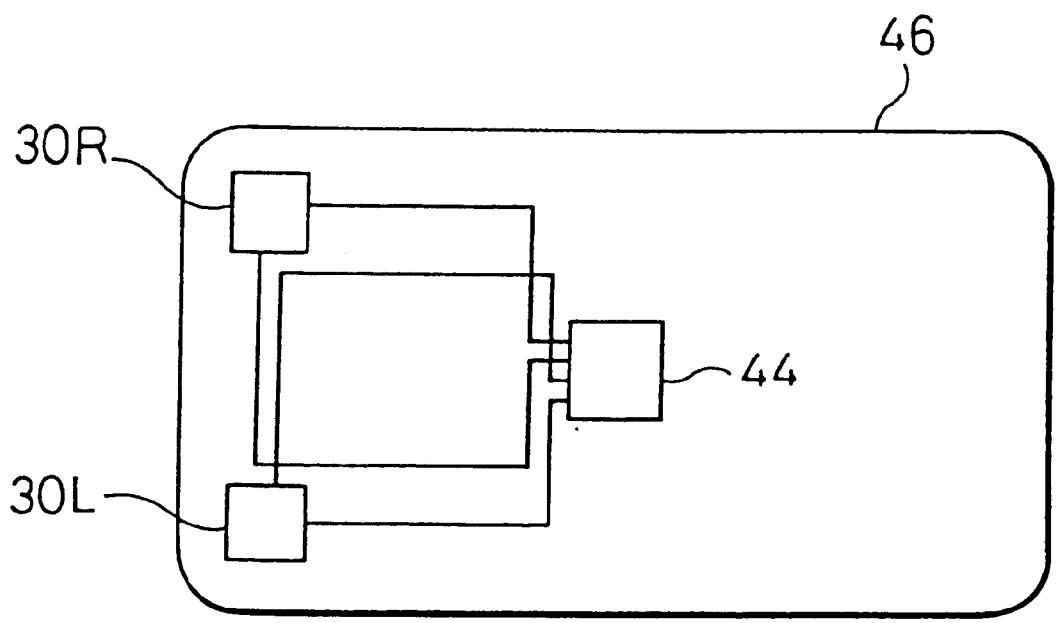
FIGS. 10(a) and 10(b) show exemplified arrangements of the wire harness extending from the satellite sensors 30 used in the present invention.
Figure 10B:
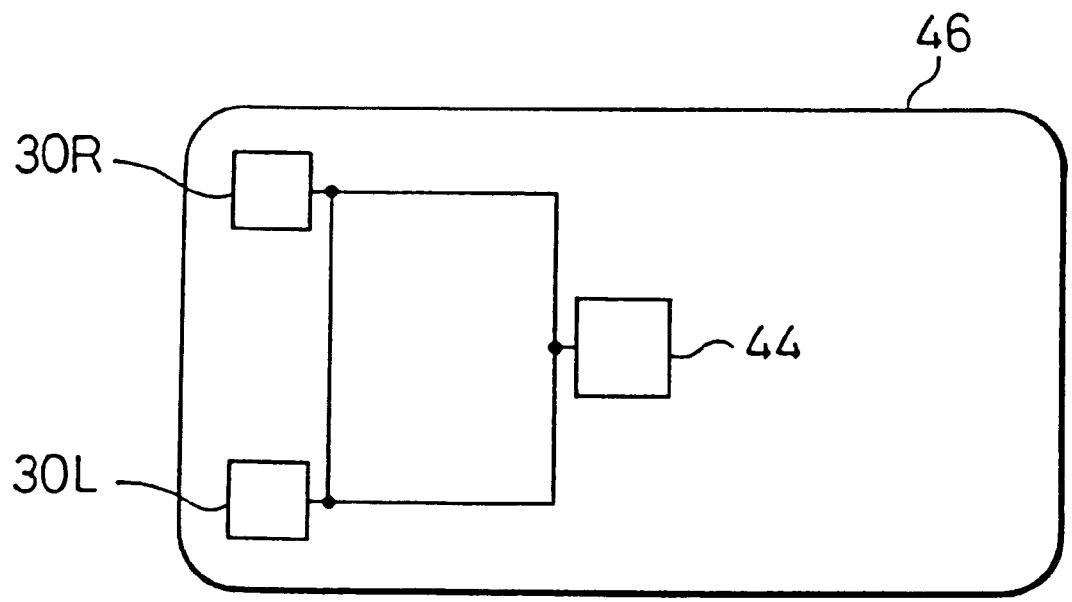

FIGS. 10(a) and 10(b) show exemplified arrangements of the wire harness extending from the satellite sensors 30 used in the present invention. In the example of FIG. 10(a), each of the wire harnesses extending from the satellite sensors 30R and 30L disposed in the right front and the left front portions of the vehicle 46 is divided into two lines. The two lines of each wire harness respectively run through the right side and the left side in the vehicle 46 and are connected to the ECU 44.

In the example of FIG. 10(b), a wire harness extending from the satellite sensors 30R and 30L is divided into two branches, which respectively run through the right side and the left side in the vehicle 46. These left and right branches of the wire harness are connected to each other via another wire harness.

In the arrangement of dividing the wire harness extending from each satellite sensor into two directions, that is, the right side and the left side in the vehicle, even when an oblique collision or an offset collision damages either the right side or the left side of the vehicle, it is very rare that the two branches of the wire harness running through the right side and the left side in the vehicle are down at the same time. This arrangement accordingly ensures the transmission path of the ON signal from the satellite sensor to the ECU 44 and thereby improves the reliability of activation control of the air bag.

In the example of FIG. 10(b), the ON signals output from the satellite sensors 30R and 30L pass through the same wire harness. In order to prevent interference of the ON signals, these ON signals should be subjected to known signal processing, prior to the transmission.

Figure 11A:
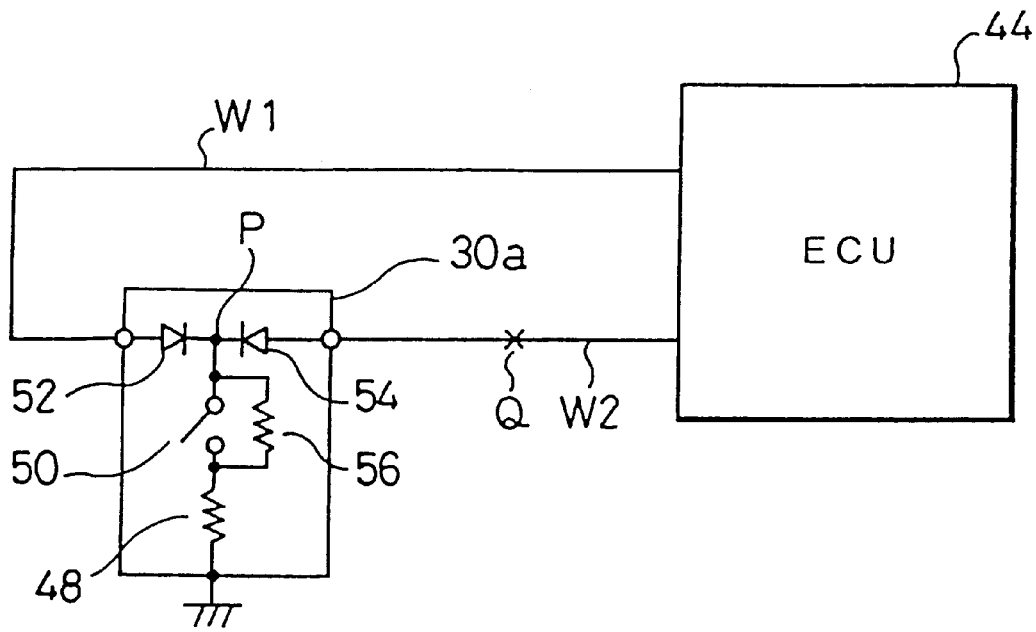
FIGS. 11(a) and 11(b) are circuit diagrams illustrating concrete structures of the satellite sensor 30 used in the present invention.
Figure 11B:
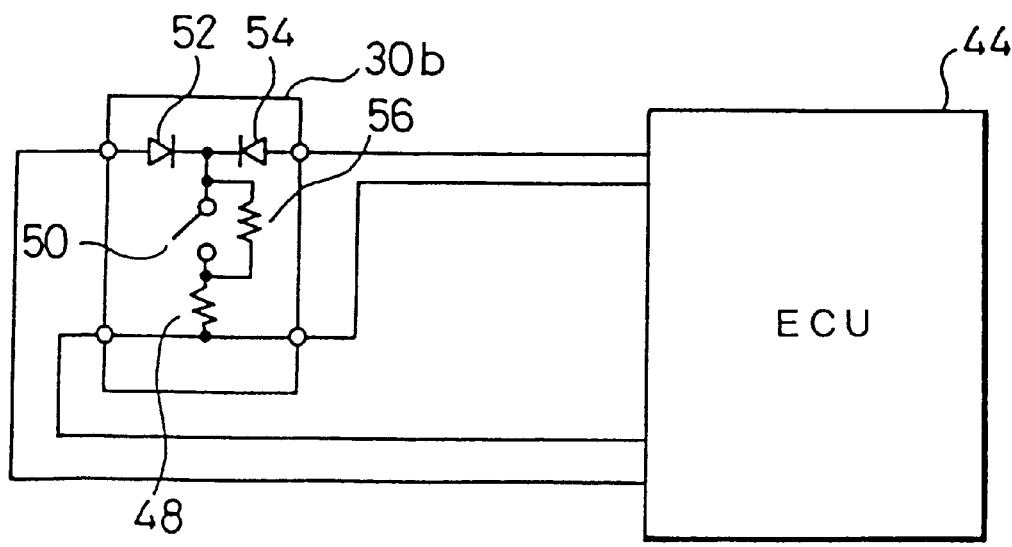

The following describes concrete structures of the satellite sensor 30. FIGS. 11(a) and 11(b) are circuit diagrams illustrating concrete structures of the satellite sensor 30 used in the present invention. In the example of FIG. 11(a) that corresponds to the arrangement of FIG. 10(a), the wire harness extending from one satellite sensor 30a is divided into two lines W1 and W2. Two diodes 52 and 54 arranged to have the symmetrical polarities connect the two lines of wire harnesses W1 and W2 with each other. A parallel circuit, which includes an internal switch 50 and a resistor 56, and a resistor 48 are connected in series between a joint P of the diodes 52 and 54 and a ground.

When an impact of not less than a predetermined reference value is applied to the vehicle, for example, in the event of a collision, the internal switch 50 of the satellite sensor 30a is turned on to change the voltage between the joint P and the ground. The change of the voltage is transmitted as the ON signal to the ECU 44.

In this circuit structure with the two lines of wire harness W1 and W2, for example, even when a point Q in one line of wire harness W2 is down in the event of a collision, the ON signal can be transmitted via the other line of wire harness W1 to the ECU 44.

The resistor 48 interposed between the internal switch 50 and the ground prevents the voltage at the joint P and thereby the voltage input to the EU 44 from decreasing to 0 V in the on state of the internal switch 50. In case that a collision causes a short circuit, for example, at the point Q in the wire harness W2, on the other hand, the voltage input to the ECU 44 decreases to 0 V. This enables the ECU 44 to distinguish the on state of the internal switch 50 from a short circuit in the wire harness based on the value of the input voltage, thereby realizing accurate detection of a short circuit in the wire harness.

The two diodes 52 and 54 interposed between the two lines of wire harness W1 and W2 prevent the voltage at the joint P from decreasing to 0 V even when a collision causes a short circuit, for example, at the point Q in the wire harness W2. This ensures accurate detection of the on state of the internal switch 50.

In the example of FIG. 11(b), not only the signal line of the ON signal but the earth line is divided into two lines and connected to the ECU 44. This structure enables the earth potential of a satellite sensor 30b to coincide with the earth potential in the ECU 44.

d. Third Embodiment

Figure 12:
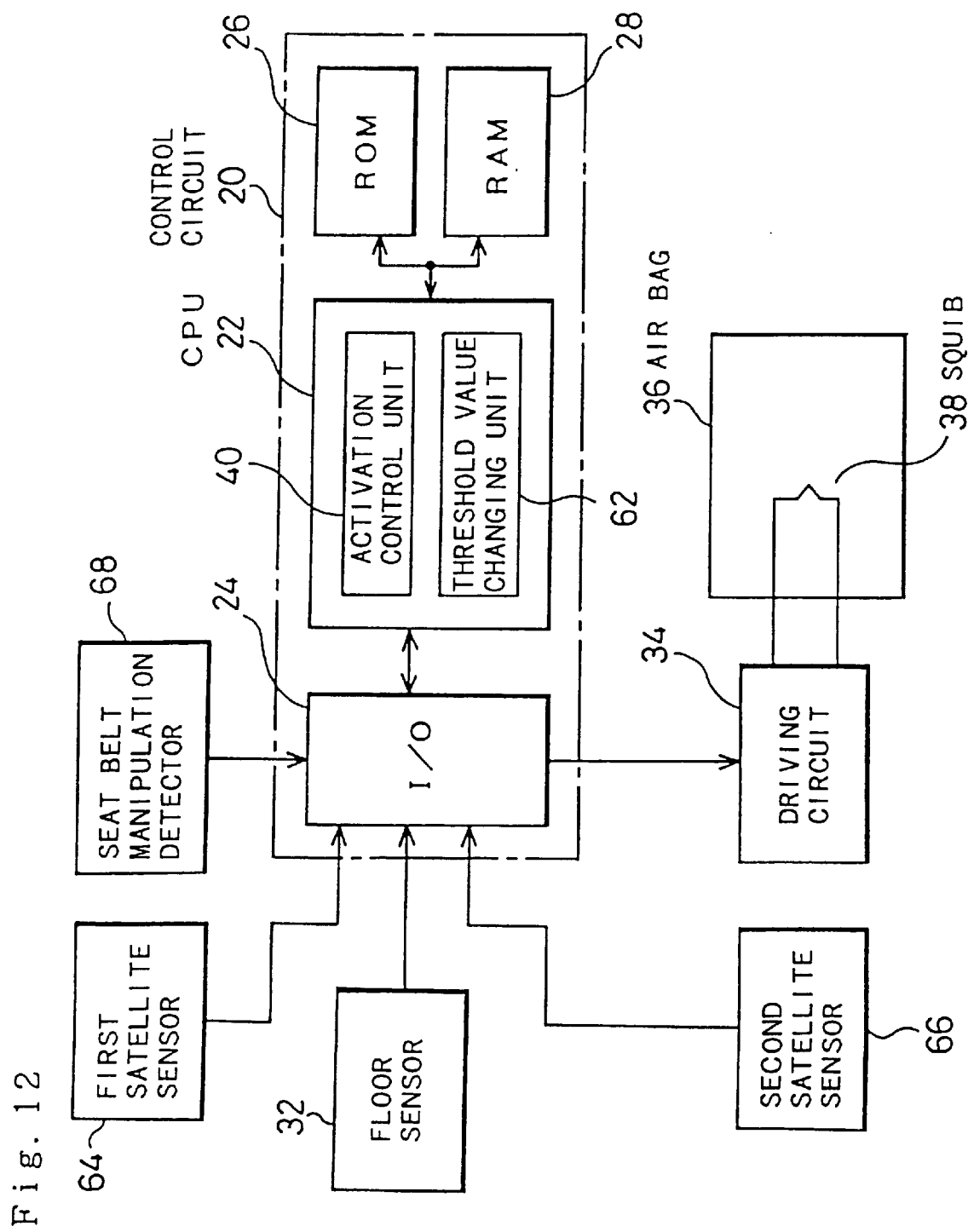
FIG. 12 is a block diagram illustrating still another activation control apparatus using satellite sensors as a third embodiment according to the present invention.
Figure 13:
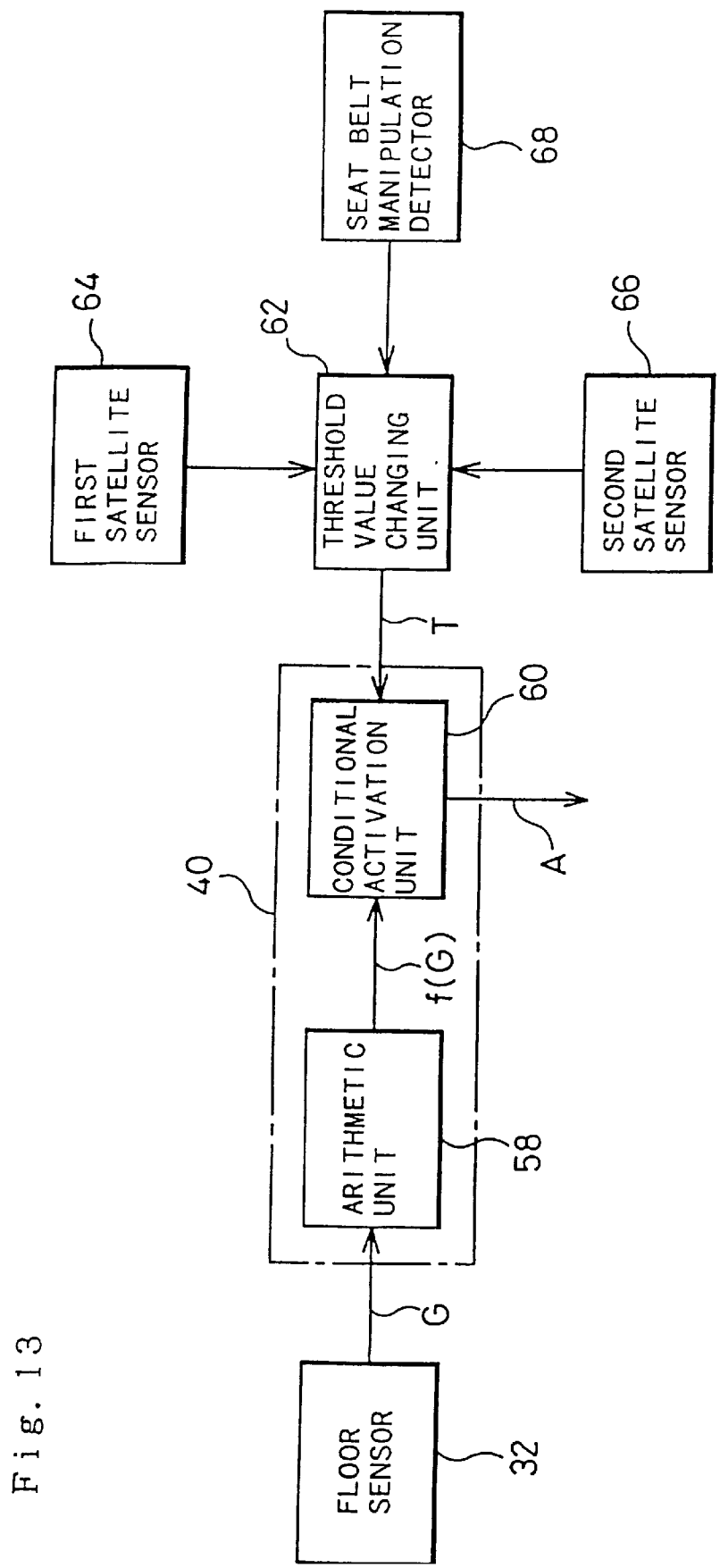
FIG. 13 shows the operations of the first and second satellite sensors 64 and 66, the seat belt manipulation detector 68, the floor sensor 32, and the CPU 22 shown in FIG. 12.

FIG. 12 is a block diagram illustrating still another activation control apparatus using satellite sensors as a third embodiment according to the present invention. FIG. 13 shows the operations of first and second satellite sensors 64 and 66, a seat belt manipulation detector 68, the floor sensor 32, and the CPU 22 shown in FIG. 12.

The structural differences between the third embodiment and the second embodiment are that each satellite sensor 30 is replaced by the first and the second satellite sensors 64 and 66 and that the seat belt manipulation detector 68 is newly added. The difference in operations of the threshold value changing unit 62 between the third embodiment and the second embodiment is ascribed to the structural difference with the first and the second satellite sensors 64 and 66 and the seat belt manipulation detector 68. The other constituents and the operations in the third embodiment are identical with those in the second embodiment and are thus not specifically described here.

Figure 31:
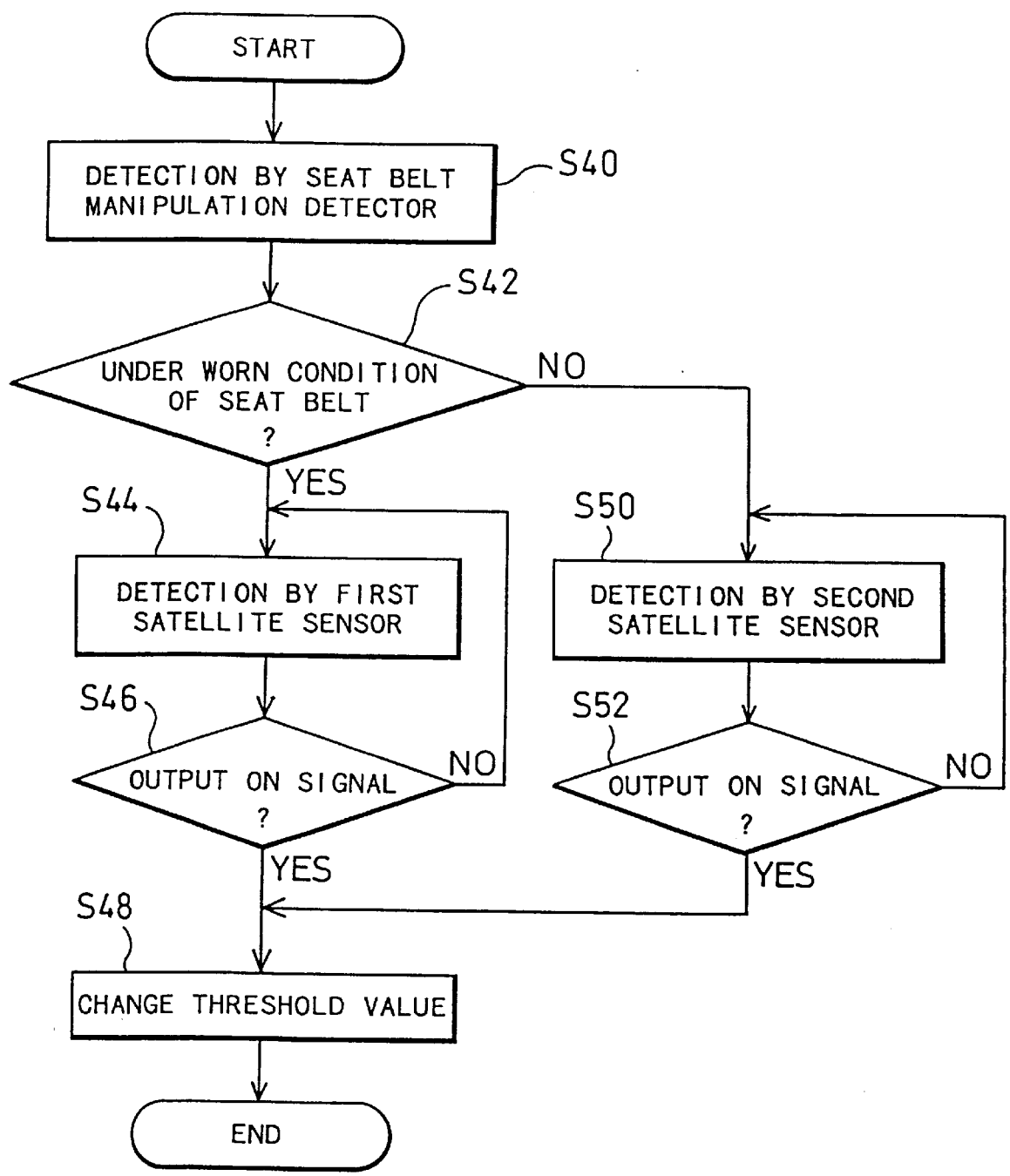
FIG. 31 is a flowchart showing the operations carried out by the first and the second satellite sensors 64 and 66, the seat belt manipulation detector 68, and the CPU 22 shown in FIG. 12.

FIG. 31 is a flowchart showing the operations carried out by the first and the second satellite sensors 64 and 66, the seat belt manipulation detector 68, and the CPU 22 shown in FIG. 12. The processing routine of FIG. 31 is executed substantially in parallel to the processing routine of FIG. 28.

In the third embodiment, the first satellite sensor 64 and the second satellite sensor 66 have different reference values of deceleration to turn on the internal switches thereof. The internal switch of the first satellite sensor 64 is turned on to output an ON signal when a deceleration of not less than a reference value K1 is applied to the vehicle. The internal switch of the second satellite sensor 66 is turned on to output an ON signal when a deceleration of not less than a reference value K2, which is smaller than the reference value K1 (K2<K1), is applied to the vehicle. Like the satellite sensors 30, the first and the second satellite sensors 64 and 66 are disposed in the front portion of the vehicle 46 and more specifically, are arranged off to both the right front and the left front of the floor sensor 32 in the ECU 44.

Referring to the flowchart of FIG. 31, the seat belt manipulation detector 68 detects whether or not the vehicle occupant (for example, the driver) fastens a seat belt on the seat and outputs the result of detection as a detection signal at step S40.

As shown in FIG. 13, the threshold value changing unit 62 receives the detection signal output from the seat belt manipulation detector 68 and gives different threshold values according to the wearing state of the seat belt to the conditional activation unit 60.

Figure 14:
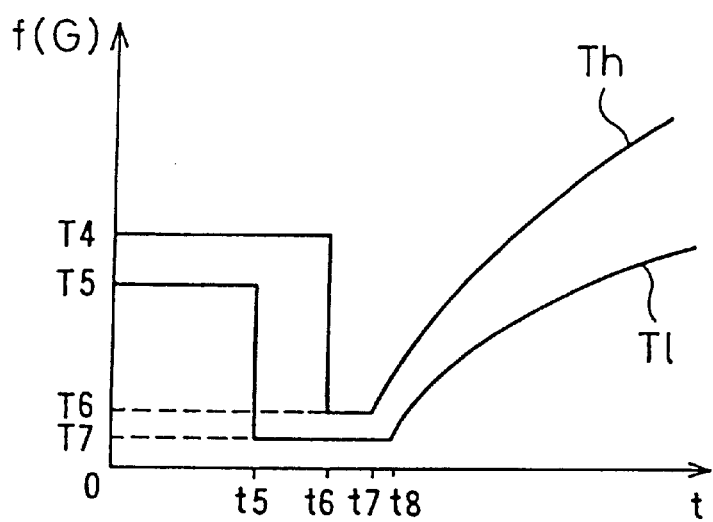
FIG. 14 is a characteristic chart showing variations in threshold value with time under the worn condition of the seat belt and under the nonworn condition of the seat belt in the third embodiment.

FIG. 14 is a characteristic chart showing variations in threshold value with time under the worn condition of the seat belt and under the non-worn condition of the seat belt in the third embodiment. In the graph of FIG. 14, the value of the function f(G) is plotted as ordinate and the time t as abscissa. In case that the detection signal output from the seat belt manipulation detector 68 represents the worn state of the seat belt, the threshold value changing unit 62 gives a threshold value Th shown in FIG. 14 to the conditional activation unit 60. In case that the detection signal represents the non-worn state of the seat belt, on the contrary, the threshold value changing unit 62 gives a threshold value T1 shown in FIG. 14 to the conditional activation unit 60.

The threshold value changing unit 62 receives an ON signal output from either the first satellite sensor 64 or the second satellite sensor 66, under the worn condition of the seat belt, the threshold value changing unit 62 neglects the ON signal output from the second satellite sensor 66 but changes the threshold value from the current value to another value in response to the ON signal output from the first satellite sensor 64 (steps S42, S44, S46, and S48). Under the non-worn condition of the seat belt, on the other hand, the threshold value changing unit 62 neglects the ON signal output from the first satellite sensor 64 but changes the threshold value from the current value to another value in response to the ON signal output from the second satellite sensor 66 (steps S42, S50, S52, and S48).

In the example of FIG. 14, the first satellite sensor 64 outputs an ON signal at a time point t6, whereas the second satellite sensor 66 outputs an ON signal at a time point t5. Under the worn condition of the seat belt, the threshold value Th is given to the conditional activation unit 60 in response to the ON signal from the first satellite sensor 64, as described above. Until the time point t6, at which the first satellite sensor 64 outputs an ON signal, a fixed value T4 is given as the threshold value T to the conditional activation unit 60. At the time point t6 when the ON signal is input, the threshold value Th is changed from the fixed value T4 to a smaller value T6. The threshold value Th is gradually increased after a time point t7.

Under the non-worn condition of the seat belt, on the other hand, the threshold value T1 is given to the conditional activation unit 60 in response to the ON signal from the second satellite sensor 66, as described above. Until the time point t5, at which the second satellite sensor 66 outputs an ON signal, a fixed value T5 is given as the threshold value T1 to the conditional activation unit 60. At the time point t5 when the ON signal is input, the threshold value T1 is changed from the fixed value T5 to a smaller value T7. The threshold value T1 is gradually increased after a time point t8.

In this embodiment, the threshold value T1 under the non-worn condition of the seat belt is set to be smaller than the threshold value Th under the worn condition of the seat belt as shown in FIG. 14. More concretely, the value T5 is smaller than the value T4 set as the threshold value before the input of the ON signal, and the value T7 is smaller than the value T6 set as the threshold value immediately after the input of the ON signal. The threshold value T1 is thereafter also set to be smaller than the threshold value Th.

The smaller threshold value T1 under the non-worn condition of the seat belt than the threshold value Th under the worn condition of the seat belt is based on the following reason. In case that the vehicle occupant fastens the seat belt, the seat belt restraints the occupant upon an impact of a certain degree and the necessity for activation of the air bag is relatively low. In case that the vehicle occupant does not wear the seat belt, however, the body of the occupant free from the restraint of the seat belt is moved by the inertial force even upon a relatively small impact and may be struck against an object in the vehicle. The necessity for activation of the air bag is thus relatively high.

The reference value K2 in the second satellite sensor 66 is set to be smaller than the reference value K1 in the first satellite sensor 64, because of the following reason. The ON signal output from the second satellite sensor 66 is active under the non-worn condition of the seat belt, whereas the ON signal output from the first satellite sensor 64 is active under the worn condition of the seat belt. As mentioned above, the threshold value under the non-worn condition of the seat belt is smaller than the threshold value under the worn condition of the seat belt until the output of the ON signal from the satellite sensor. A smaller value is accordingly set to the reference value K2 in the second satellite sensor 66 corresponding to the smaller threshold value, in order to quicken the timing of the output of the ON signal, that is, the timing of changing the threshold value. A larger value is, on the other hand, set to the reference value K1 in the first satellite sensor 64 corresponding to the greater threshold value, in order to slow the timing of changing the threshold value.

As discussed above, the structure of the third embodiment changes the threshold value adopted for the conditional activation of the air bag between the worn state of the seat belt and the non-worn state of the seat belt. This enables the highly accurate activation control of the air bag based on the wearing state of the seat belt. The structure of the embodiment uses the different satellite sensors having different reference values under the worn condition of the seat belt and under the condition of the seat belt. This varies the timing of the output of the ON signal, that is, the timing of changing the threshold value, under the worn condition of the seat belt and under the non-worn condition of the seat belt. This structure enables activation control of the air bag with higher accuracy.

Although the first satellite sensor 64 and the second satellite sensor 66 are separate sensors in this embodiment, these two sensors may be integrated into one sensor.

Figure 15:
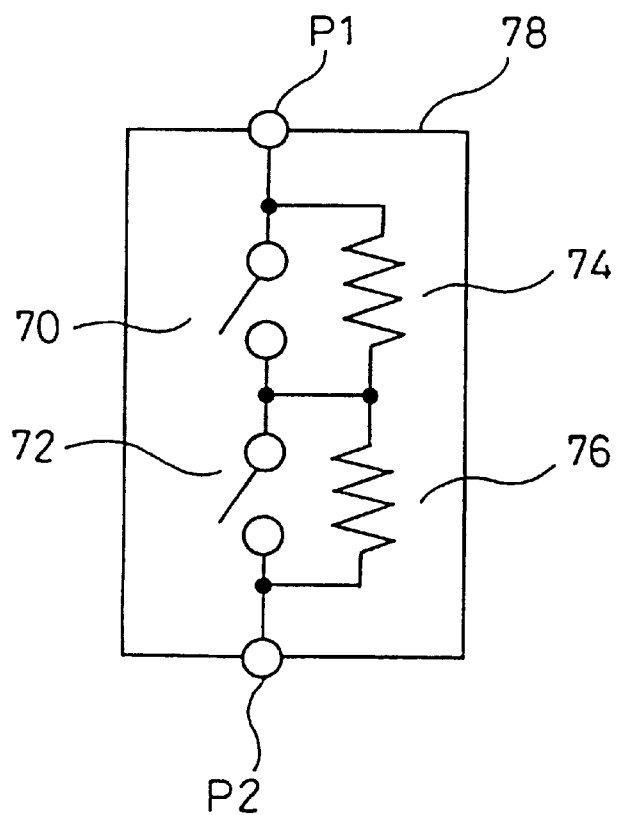
FIG. 15 is a circuit diagram showing an example wherein the first satellite sensor 64 and the second satellite sensor 66 shown in FIG. 12 are constructed as one integrated satellite sensor.

FIG. 15 is a circuit diagram showing an example wherein the first satellite sensor 64 and the second satellite sensor 66 shown in FIG. 12 are constructed as one integrated satellite sensor 78. The satellite sensor 78 has two internal switches 70 and 72, which are respectively connected with resistors 74 and 76 in parallel and are arranged in series between terminals P1 and P2. The internal switch 70 is turned on in case that an impact of not less than the reference value K1 is applied to the vehicle, and the internal switch 72 is turned on in case that an impact of not less than the reference value K2 is applied to the vehicle. When the impact on the vehicle is less than the reference value K2, neither the internal switch 70 nor the internal switch 72 is turned on. When the impact on the vehicle is not less than the reference value K2 but is less than the reference value K1, only the internal switch 72 is turned on. When the impact on the vehicle is not less than the reference value K1, the internal switch 70 is additionally turned on. The voltage between the terminals P1 and P2 is changed in response to the ON actions of the internal switches 70 and 72. The change in voltage is transmitted as the ON signal corresponding to each reference value K1 or K2 to the ECU 44.

The integrated satellite sensor 78 can reduce the total number of parts.

In the third embodiment, the two satellite sensors 64 and 66 having different reference values may be replaced by three or more satellite sensors.

e. Fourth Embodiment

Figure 16:
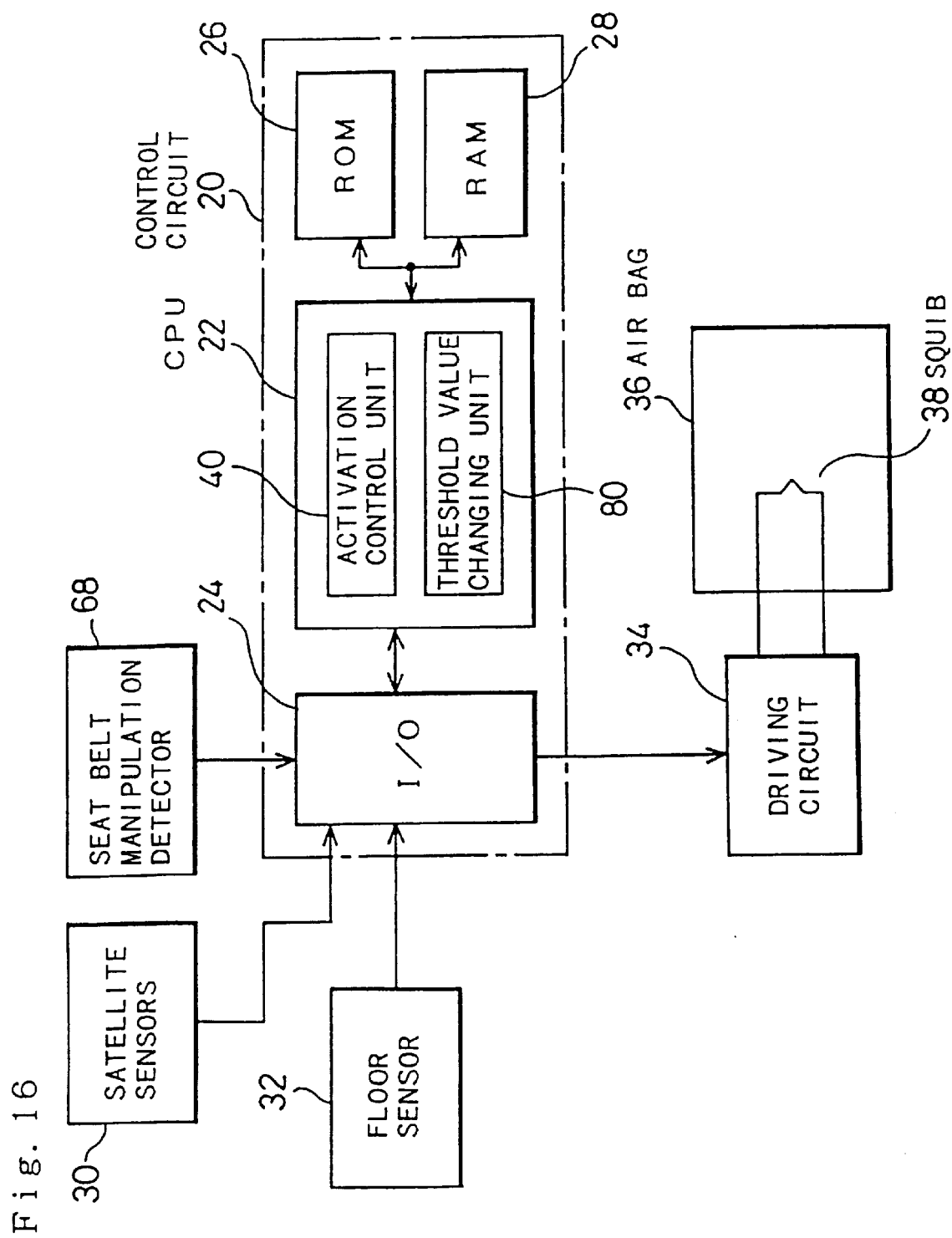
FIG. 16 is a block diagram illustrating another activation control apparatus using satellite sensors as a fourth embodiment according to the present invention.
Figure 17:
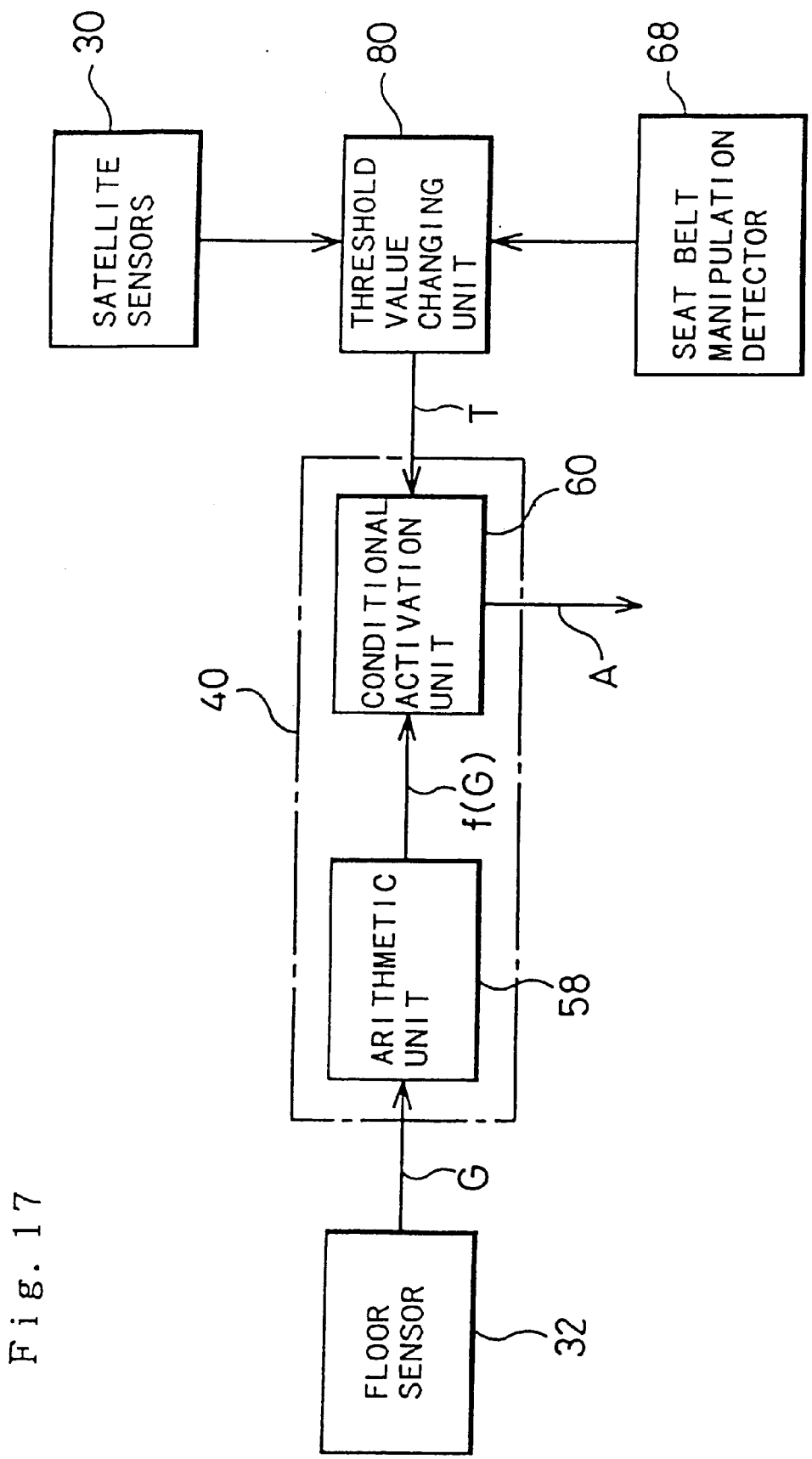
FIG. 17 shows the operations of the satellite sensors 30, the seat belt manipulation detector 68, the floor sensor 32, and the CPU 22 shown in FIG. 16.

FIG. 16 is a block diagram illustrating another activation control apparatus using satellite sensors as a fourth embodiment according to the present invention. FIG. 17 shows the operations of the satellite sensors 30, the seat belt manipulation detector 68, the floor sensor 32, and the CPU 22 shown in FIG. 16.

The structural difference between the fourth embodiment and the third embodiment is that the first and the second satellite sensors 64 and 66 are replaced by the satellite sensor 30 used in the first and the second embodiments as shown in FIG. 16. The structural difference with the satellite sensor 30 leads the difference between the operations of a threshold value changing unit 80 and the operations of the threshold value changing unit 62 of the third embodiment. The other constituents and the operations in the fourth embodiment are identical with those in the third embodiment and are thus not specifically described here.

In the fourth embodiment, as shown in FIG. 17, the threshold value changing unit 80 receives the detection signal output from the seat belt manipulation detector 68 and gives different threshold values according to the wearing state of the seat belt to the conditional activation unit 60.

Figure 18:
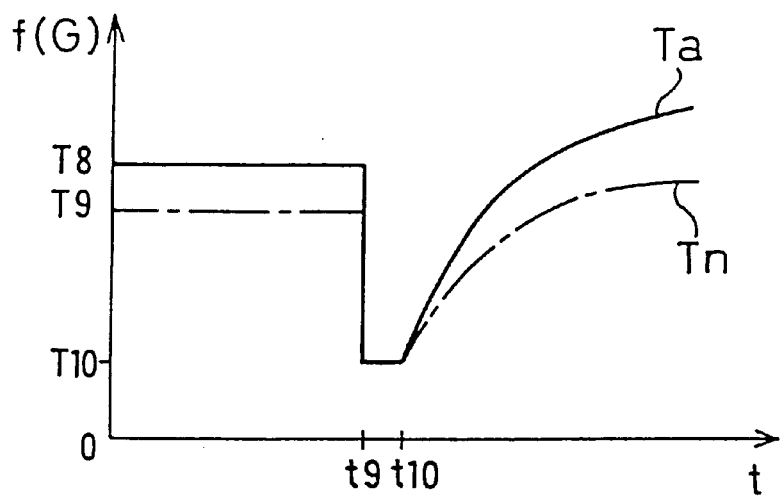
FIG. 18 is a characteristic chart showing variations in threshold value with time under the worn condition of the seat belt and under the non-worn condition of the seat belt in the fourth embodiment.

FIG. 18 is a characteristic chart showing variations in threshold value with time under the worn condition of the seat belt and under the non-worn condition of the seat belt in the fourth embodiment. In the graph of FIG. 18, the value of the function f(G) is plotted as ordinate and the time t as abscissa. In case that the detection signal output from the seat belt manipulation detector 68 represents the worn state of the seat belt, the threshold value changing unit 80 gives a threshold value Ta shown in FIG. 18 to the conditional activation unit 60. In case that the detection signal represents the non-worn state of the seat belt, on the contrary, the threshold value changing unit 80 gives a threshold value Tn shown in FIG. 18 to the conditional activation unit 60.

The threshold value changing unit 80 changes the threshold value from the current value to another value in response to the output of the ON signal from the satellite sensor 30.

In the example of FIG. 18, the satellite sensor 30 outputs an ON signal at a time point t9. Under the worn condition of the seat belt, the threshold value Ta is given to the conditional activation unit 60 as described above. Until the time point t9, at which the satellite sensor 30 outputs an ON signal, a fixed value T8 is given as the threshold value Ta to the conditional activation unit 60. At the time point t9 when the ON signal is input, the threshold value Ta is changed from the fixed value T8 to a smaller value T10. The threshold value Ta is gradually increased after a time point t10.

Under the non-worn condition of the seat belt, on the other hand, the threshold value Tn is given to the conditional activation unit 60 as described above. Until the time point t9, at which the satellite sensor 30 outputs an ON signal, a fixed value T9 is given as the threshold value Tn to the conditional activation unit 60. At the time point t9 when the ON signal is input, the threshold value Tn is changed from the fixed value T9 to the smaller value T10. The threshold value Tn is gradually increased after the time point t10.

In the fourth embodiment, the threshold value Tn under the non-worn condition of the seat belt is generally smaller than the threshold value Ta under the worn condition of the seat belt as shown in FIG. 18. More concretely, the value T9 is input of the ON signal. The threshold value Tn again becomes smaller than the threshold value Ta after a predetermined time period has elapsed since the input of the ON signal, although the threshold values Tn and Ta are equal to each other immediately after the input of the ON signal.

The smaller threshold value Tn under the non-worn condition of the seat belt than the threshold value Ta under the worn condition of the seat belt is based on the same reason as discussed in the third embodiment.

As discussed above, the structure of the fourth embodiment changes the threshold value adopted for the conditional activation of the air bag between the worn state of the seat belt and the non-worn state of the seat belt. This enables the highly accurate activation control of the air bag based on the wearing state of the seat belt. Although the fourth embodiment can not change the timing of the output of the ON signal between the worn state of the seat belt and the nonworn state of the seat belt unlike the third embodiment, the fourth embodiment with the satellite sensor 30 requires the less number of parts, compared with the third embodiment with the first and the second satellite sensors 64 and 66.

In the fourth embodiment, the threshold value changing unit 80 changes the threshold value from the current value to another value in response to the output of the ON signal from the satellite sensor 30 both under the worn condition of the seat belt and under the non-worn condition of the seat belt. In accordance with one modified structure, the threshold value changing unit 80 changes the threshold value in response to the ON signal from the satellite sensor 30 only under the worn condition of the seat belt, and keeps the threshold value unchanged irrespective of the ON signal from the satellite sensor 30 under the non-worn condition of the seat belt.

Figure 19A:
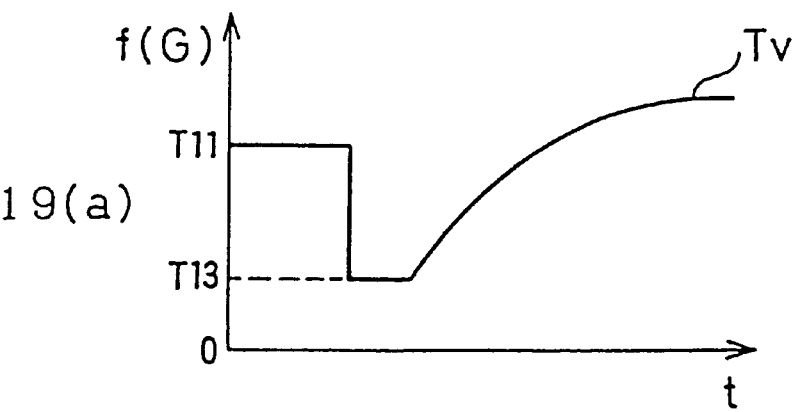
FIG. 19 shows a modified example, in which the threshold value is changed only under the worn condition of the seat belt and kept unchanged under the non-worn condition of the seat belt.
Figure 19B:
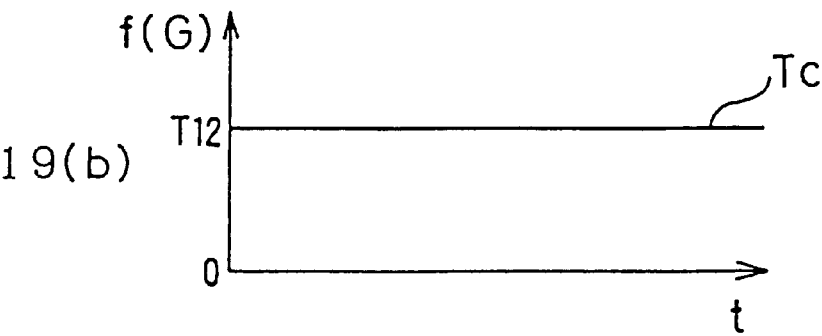

FIG. 19 shows such a modified example, in which the threshold value is changed only under the worn condition of the seat belt and kept unchanged under the non-worn condition of the seat belt. In the graphs of FIG. 19, the value of the function f(G) is plotted as ordinate and the time t as abscissa.

In case that the detection signal from the seat belt manipulation detector 68 represents the worn state of the seat belt, the threshold value changing unit 80 gives a threshold value Tv shown in FIG. 19(*a*) to the conditional activation unit 60. In case that the detection signal represents the non-worn state of the seat belt, on the contrary, the threshold value changing unit 80 gives a threshold value Tc shown in FIG. 19(*b*) to the conditional activation unit 60. Under the worn condition of the seat belt, a fixed value T11 is given as the threshold value Tv to the conditional activation unit 60 until the output of the ON signal from the satellite sensor 30. In response to the input of the ON signal, the threshold value Tv is changed from the value T11 to another value T13. Under the non-worn condition of the seat belt, on the other hand, a fixed value T12 is always given as the threshold value Tc to the conditional activation unit 60, regardless of the output of the ON signal from the satellite sensor 30.

In this manner, the logic for the conditional activation of the air bag under the worn condition of the seat belt may be different from that under the non-worn condition of the seat belt.

In the third and the fourth embodiments discussed above, the threshold value is changed according to the wearing state of the seat belt. In accordance with another modification, the threshold value may be changed according to the position of the seat along the length of the vehicle or the angle of the seat.

In these embodiments, different threshold values are used for the activation control of the air bag under the worn condition of the seat belt and under the non-worn condition of the seat belt; the threshold values Th and T1 in the third embodiment, the threshold values Ta and Tn in the fourth embodiment, and the threshold values Tv and Tc in the modified example. The vehicle may have seat belt pretensioners as well as the air bags as the passive vehicle occupant restraints. In this case, the threshold value used under the worn condition of the seat belt (that is, the threshold value Th in the third embodiment, the threshold value Ta in the fourth embodiment, and the threshold value Tv in the modified example) may be adopted for the conditional activation of the air bag, irrespective of the wearing state of the seat belt. The threshold value used under the non-worn condition of the seat belt (that is, the threshold value T1 in the third embodiment, the threshold value Tn in the fourth embodiment, and the threshold value Tc in the modified example) may be adopted for the conditional activation of the seat belt pre-tensioner.

Figure 20:
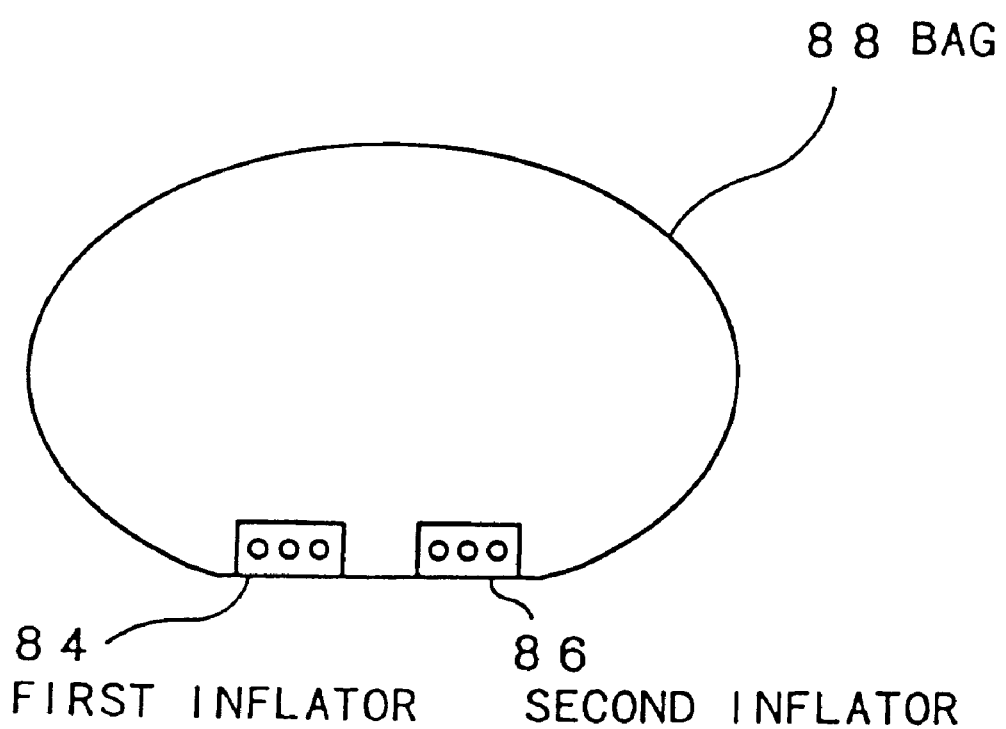
FIG. 20 illustrates a concrete example of the air bag with two inflators.

FIG. 20 illustrates a concrete example of the air bag with two inflators. A bag 88 of the air bag 36 includes a first inflator 84 and a second inflator 86, which are actuated on impact to evolve a gas in the bag 88 and inflate the bag 88. The degree of inflation of the bag 88 and its pressure are regulated by selecting an appropriate inflator to be actuated and controlling the timing of the actuation of the selected inflator.

In the air bag 36 having the two inflators 84 and 86 in the bag 88 as shown in FIG. 20, the threshold value used under the worn condition of the seat belt (that is, the threshold value Th in the third embodiment, the threshold value Ta in the fourth embodiment, and the threshold value Tv in the modified example) may be adopted for the actuation of the first inflator 84, irrespective of the wearing state of the seat belt. The threshold value used under the non-worn condition of the seat belt (that is, the threshold value T1 in the third embodiment, the threshold value Tn in the fourth embodiment, and the threshold value Tc in the modified example) may be adopted for the actuation of the second inflator 86, irrespective of the wearing state of the seat belt.

In the third and the fourth embodiments discussed above, the threshold value changing unit changes the threshold value in response to an ON signal from the satellite sensor. The principles of these embodiments may, however, be applicable to the structure, in which the threshold variation pattern changing unit changes the variation pattern of the threshold value in response to an ON signal from the satellite sensor.

B. Activation Control Apparatus Using Biaxial Sensor a. Fifth Embodiment

Figure 21:
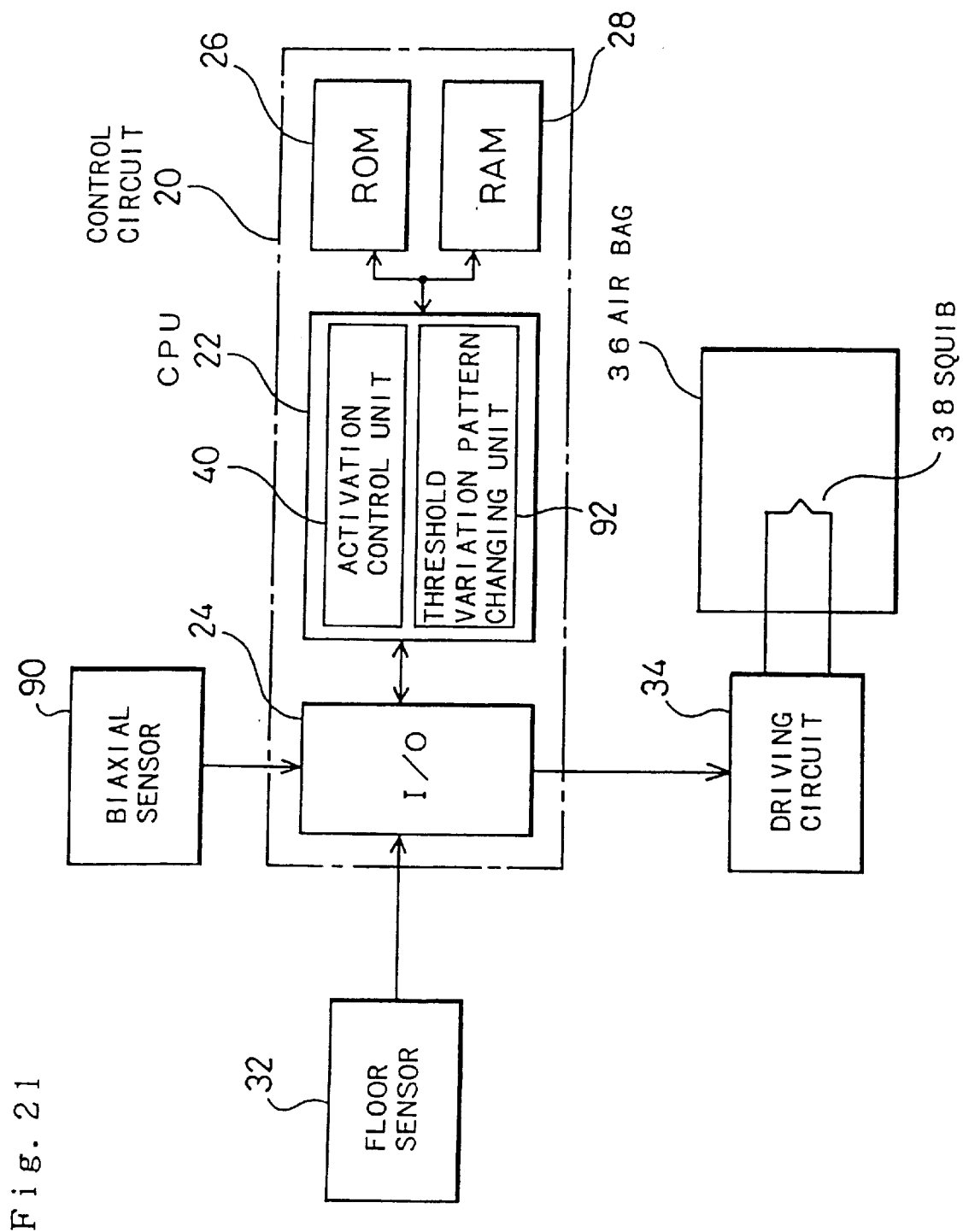
FIG. 21 is a block diagram illustrating an activation control apparatus using a biaxial sensor as a fifth embodiment according to the present invention.
Figure 22:
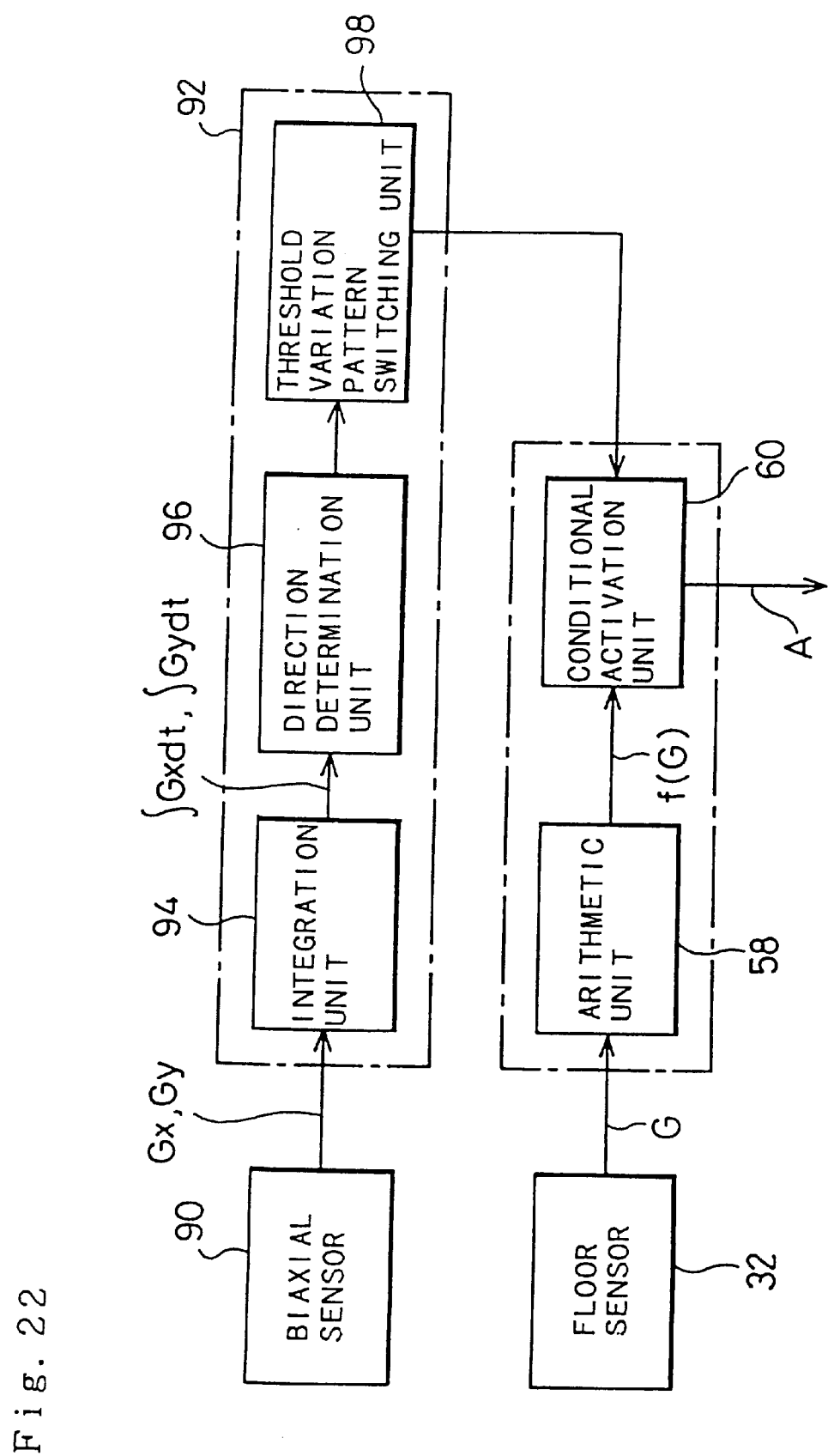
FIG. 22 shows the operations of the biaxial sensor 90, the floor sensor 32, and the CPU 22 shown in FIG. 21.

FIG. 21 is a block diagram illustrating an activation control apparatus using a biaxial sensor as a fifth embodiment according to the present invention. FIG. 22 shows the operations of a biaxial sensor 90, the floor sensor 32, and the CPU 22 shown in FIG. 21.

The structural difference between the fifth embodiment and the first embodiment is that the satellite sensors 30 are replaced by a biaxial sensor 90 as shown in FIG. 21. The operational differences include the operations of the biaxial sensor 90 that are different from those of the satellite sensor 30 and the operations of a threshold variation pattern changing unit 92 that are different from those of the threshold variation pattern changing unit 42 of the first embodiment. The other constituents and the operations in the fifth embodiment are identical with those in the first embodiment and are thus not specifically described here. The biaxial sensor 90 of this embodiment corresponds to impact measurement means.

Figure 32:
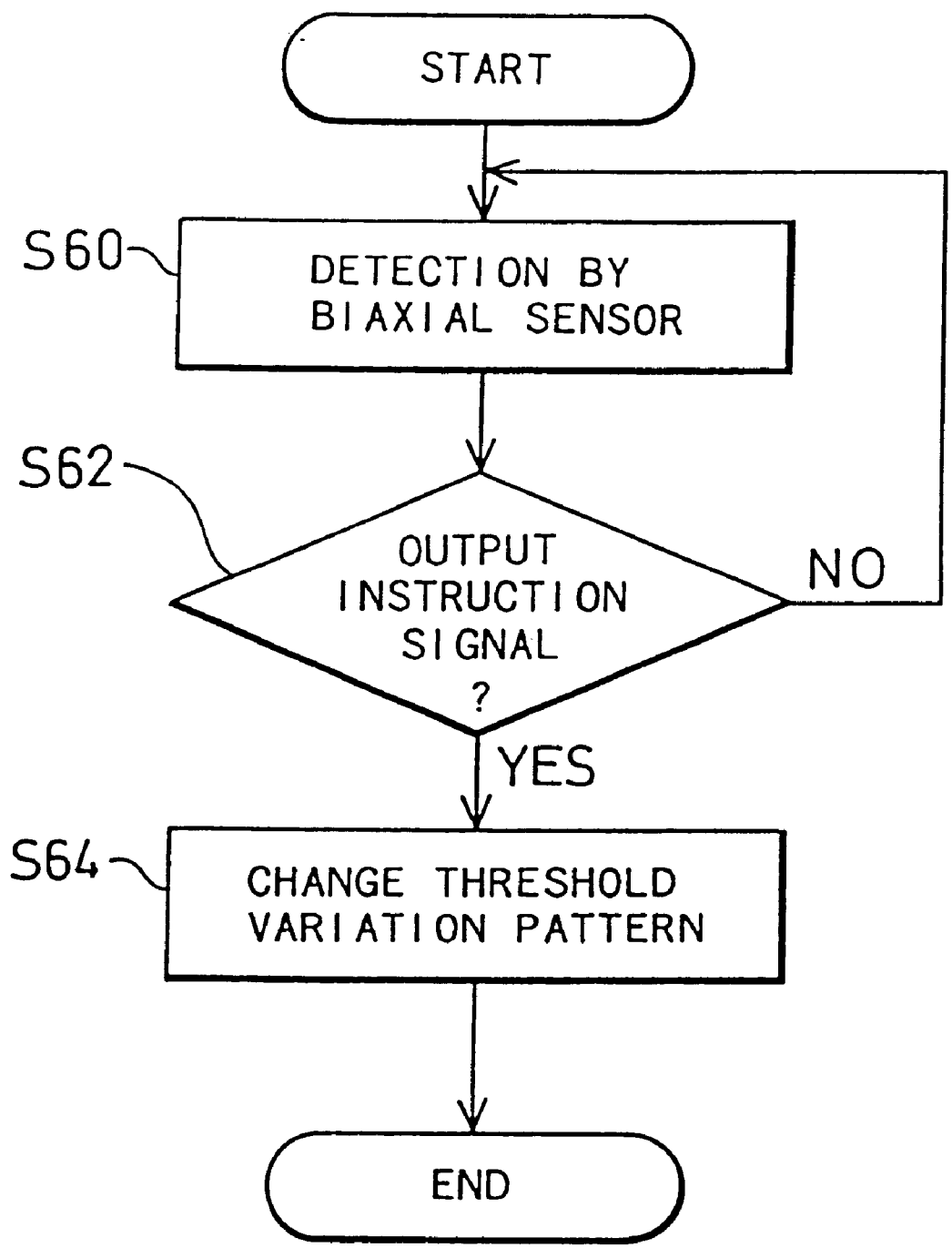
FIG. 32 is a flowchart showing the operations carried out by the biaxial sensor 90 and the CPU 22 shown in FIG. 21.

FIG. 32 is a flowchart showing the operations carried out by the biaxial sensor 90 and the CPU 22 shown in FIG. 21.

In the fifth embodiment, the threshold variation pattern changing unit 92 includes an integration unit 94, a direction determination unit 96, and a threshold variation pattern switching unit 98 as shown in FIG. 22.

Figure 23:
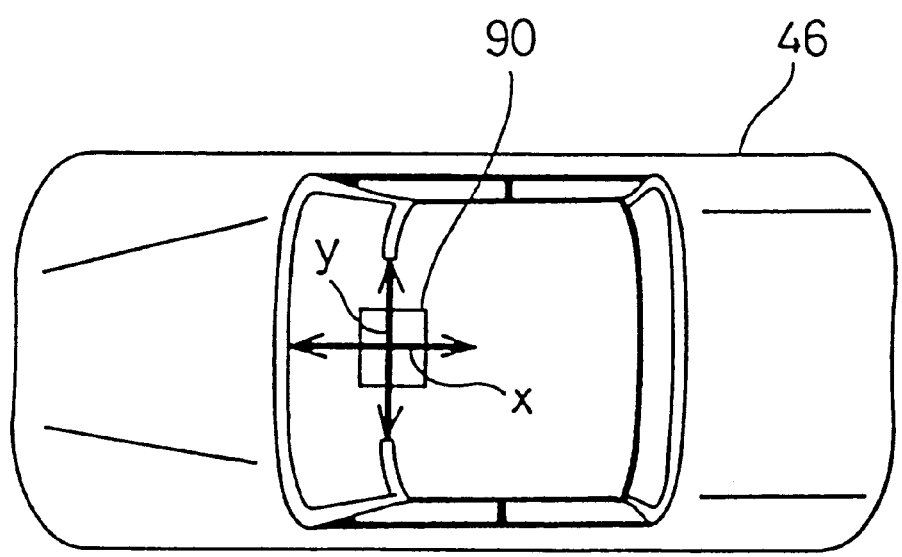
FIG. 23 shows a position in the vehicle 46 at which the biaxial sensor 90 is disposed.

FIG. 23 shows a position in the vehicle 46 at which the biaxial sensor 90 is disposed. In this embodiment, the biaxial sensor 90 is placed in a central portion of the vehicle 46 as shown in FIG. 23.

The biaxial sensor 90 detects the direction of an impact applied to the vehicle. More concretely the biaxial sensor 90 always measures a deceleration Gx applied in the direction of the length of the vehicle 46 (hereinafter referred to as the direction x) and a deceleration Gy applied in the direction of the width of the vehicle 46 (hereinafter referred to as the direction y) as shown in FIG. 23. This procedure corresponds to step S60 in the flowchart of FIG. 32. The biaxial sensor 90 then outputs the results of measurement as signals. When the direction of the impact detected by the biaxial sensor 90 coincides with a preset direction, the threshold variation pattern changing unit 92 changes the variation pattern of the threshold value used in the conditional activation unit 60 to another variation pattern at step S64.

The following describes the operations of the threshold variation pattern changing unit 92 in detail. As shown in FIG. 22, the integration unit 94 in the threshold variation pattern changing unit 92 integrates the measurements Gx and Gy output from the biaxial sensor 90 (that is, the decelerations in the directions x and y) once with respect to the time t, so as to yield an integral ∫Gxdt in the direction x and an integral ∫Gydt in the direction y. The value obtained by integrating the deceleration once with respect to the time t represents the velocity v of a non-stationary object in the vehicle as mentioned above, and the integrals ∫Gxdt and ∫Gydt thus respectively denote the velocities of the non-stationary object in the direction x and in the direction y.

The direction determination unit 96 specifies the direction of the impact applied to the vehicle 46 based on the integrals ∫Gxdt and ∫Gydt calculated by the integration unit 94, and determines whether or not the direction of the impact coincides with a preset direction. This specifies which group the type of the collision belongs to, that is, either a first group including an oblique collision and an offset collision or a second group including a head-on collision, a pole collision, and an under-ride collision. In the case of an oblique collision or an offset collision, the direction determination unit 96 inputs an instruction signal to the threshold variation pattern switching unit 98. This procedure corresponds to step S62 in the flowchart of FIG. 32.

Figure 24A:
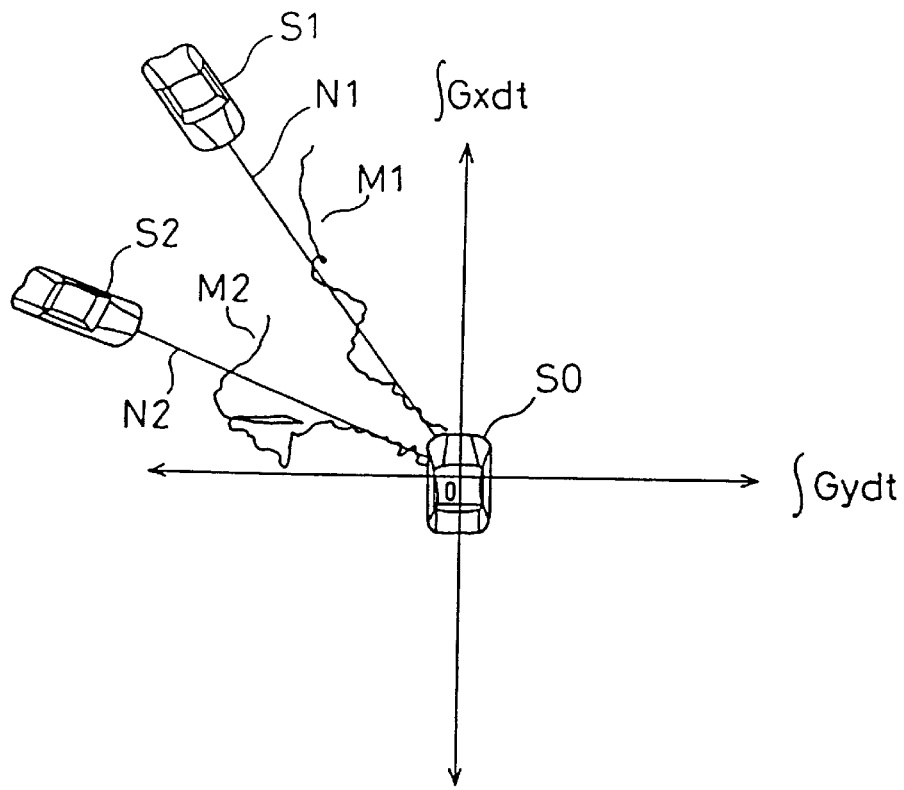
FIGS. 24(a) and 24(b) are characteristic charts showing the integrals ∫Gxdt and ∫Gydt in the directions x and y obtained by the integration unit 94 of FIG. 22 in a rectangular coordinate system.
Figure 24B:
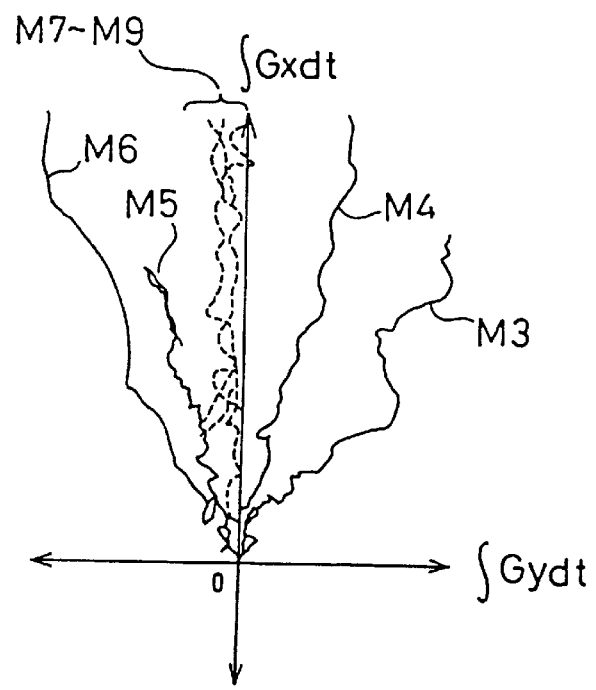

FIGS. 24(*a*) and 24(*b*) are characteristic charts showing the integrals ∫Gxdt and ∫Gydt in the directions x and y obtained by the integration unit 94 of FIG. 22 in a rectangular coordinate system. The integral ∫Gxdt in the direction x is plotted as ordinate and the integral ∫Gydt in the direction y as abscissa.

FIG. 24(*a*) shows integral curves in the case of an oblique collision of a vehicle S1 against a vehicle S0 and in the case of an oblique side collision of a vehicle S2 against the vehicle S0. M1 denotes an integral curve in the case of an oblique collision of the vehicle S1, and M2 denotes an integral curve in the case of an oblique side collision of the vehicle S2. N1 represents the direction of an impact applied to the vehicle S0 when the vehicle S1 collides against the vehicle S0, and N2 represents the direction of an impact applied to the vehicle S0 when the vehicle S2 collides against the vehicle S0.

The integral of the deceleration G, that is, the velocity of the non-stationary object in the vehicle, gradually increases from zero with time after the collision as shown in FIG. 4(*b*). Both the integral curves M1 and M2 accordingly extend from zero or the origin of the coordinate system with time after the collision as clearly seen in FIG. 24(*a*). In the vicinity of the origin 0, that is, at the initial stage immediately after the collision, the directions of the curves M1 and M2 clearly coincide with the directions N1 and N2 of the impacts applied to the vehicle S0. This means that the curve obtained by plotting the integrals ∫Gxdt and ∫Gydt in the directions x and y in the rectangular coordinate system as shown in FIG. 24(*a*) specifies the direction of the impact applied to the vehicle.

In this manner, the direction determination unit 96 of FIG. 22 specifies the direction of the impact applied to the vehicle 46 based on the integrals ∫Gxdt and ∫Gydt obtained by the integration unit 94.

FIG. 24(*b*) shows integral curves in various types of collisions. M3 and M6 denote curves in case that the vehicle crashes in an oblique collision at a high speed (high-speed oblique collision), M4 a curve in case that the vehicle crashes in an oblique collision at a medium speed (medium-speed oblique collision), and M5 a curve in case that the vehicle crashes in an offset collision at medium speed (medium-speed offset collision). M7 through M9 (shown by broken lines) represent curves in case of a head-on collision, a pole collision, and an under-ride collision, respectively.

As shown in FIG. 24(*b*), in case of an unsymmetrical collision with respect to the center line of the vehicle (the center line along the direction x), such as an oblique collision or an offset collision, the direction of the impact applied to the vehicle has an angle of not less than a predetermined value with respect to the center line. In case of a substantially symmetrical collision with respect to the center line of the vehicle, such as a head-on collision, a pole collision, and an under-ride collision, on the other hand, the direction of the impact applied to the vehicle is virtually along the direction x (that is, along the length of the vehicle). Based on these facts, it is determined whether or not the direction of the impact has an angle of not less than the predetermined value with respect to the center line of the vehicle. When the direction of the impact has the angle of not less than the predetermined value, the collision is regarded as either one of an oblique collision and an offset collision. When the direction of the impact has the angle of less than the predetermined value, on the contrary, the collision is regarded as any one of a head-on collision, a pole collision, and an under-ride collision.

The direction determination unit 96 accordingly determines whether or not the direction of the collision coincides with a preset direction (that is, the direction having an angle of not less than a predetermined value with respect to the center line of the vehicle) in the above manner, and specifies the type of the collision, that is, either a first group including an oblique collision and an offset collision or a second group including a head-on collision, a pole collision, and an underride collision. In the case of an oblique collision or an offset collision, the direction determination unit 96 inputs an instruction signal to the threshold variation pattern switching unit 98.

The instruction signal output from the direction determination unit 96 corresponds to the ON signal output from the satellite sensor in the embodiments discussed previously. The threshold variation pattern switching unit 98 changes the threshold value T between two variation patterns that correspond to those shown in FIGS. 5(*a*) and 5(*b*) in response to the instruction signal.

Until the direction determination unit 96 outputs an instruction signal, the conditional activation unit 60 of the activation control unit 40 compares the value of the function f(G) with the threshold value T read from a variation pattern of the threshold value T corresponding to that shown in FIG. 5(*a*). After the direction determination unit 96 outputs an instruction signal, on the other hand, the conditional activation unit 60 compares the value of the function f(G) with the threshold value T read from a variation pattern of the threshold value T corresponding to that shown in FIG. 5(*b*).

The variation pattern of the threshold value T corresponding to that shown in FIG. 5(*a*) is obtained by drawing a plurality of characteristic curves representing variations in function f(G) in the case of various types of collisions including a head-on collision and so on that do not require activation of the air bag and then specifying a pattern that exceeds these characteristic curves but is as close as possible to these characteristic curves.

As discussed previously, the direction determination unit 96 inputs an instruction signal to the threshold variation pattern switching unit 98 only in the case of either an oblique collision or an offset collision. The fact that the direction determination unit 96 outputs an instruction signal means that the type of the collision does not belong to the second group including a head-on collision, a pole collision, and an under-ride collision. After the input of the instruction signal, all the collisions included in the second group can thus be left out of consideration, and consideration should be given tie only an oblique collision and an offset collision. The variation pattern of the threshold value T corresponding to that shown in FIG. 5(*b*) is accordingly obtained by drawing a plurality of characteristic curves representing variations in function f(G) in the case of either an oblique collision or an offset collision that does not require activation of the air bag and then specifying a pattern that exceeds these characteristic curves but is as close as possible to these characteristic curves.

The variation pattern of the threshold value T corresponding to that shown in FIG. 5(*b*) is generally smaller than the variation pattern of the threshold value T corresponding to that shown in FIG. 5(*a*). The air bag can accordingly be activated at the earlier timing in the case of the variation pattern of the threshold value corresponding to that shown in FIG. 5(*b*).

As discussed above, in the fifth embodiment, when it is determined that the direction of the impact applied to the vehicle coincides with a preset direction (that is, the direction having an angle of not less than a predetermined value with respect to the center line of the vehicle), the threshold variation pattern changing unit 92 changes the variation pattern of the threshold value T adopted for the conditional activation of the air bag 36 from the variation pattern corresponding to that shown in FIG. 5(*a*) to the variation pattern corresponding to that shown in FIG. 5(*b*). This exerts the following effects. In the case of any one of a head-on collision, a pole collision, and an under-ride collision, the direction determination unit 96 does not input an instruction signal to the threshold variation pattern switching unit 98, and the variation pattern of the threshold value T corresponding to that shown in FIG. 5(*c*) is adopted for the conditional activation of the air bag. In case that any one of a head-on collision, a pole collision, and an under-ride collision does not apply an impact of such a degree that requires activation of the air bag to the vehicle, the value of the function f(G) does not exceed the threshold value T and the air bag is not activated. In the case of an oblique collision or an offset collision, however, the direction determination unit 96 inputs an instruction signal to the threshold variation pattern switching unit 98, and the variation pattern of the threshold value T that corresponds to that shown in FIG. 5(*b*) and is generally smaller than the above variation pattern is adopted for the conditional activation of the air bag. When either an oblique collision or an offset collision applies an impact of the degree that requires activation of the air bag to the vehicle, the value of the function f(G) exceeds the threshold value T on the earlier stage, and the air bag is accordingly activated at the earlier timing.

b. Sixth Embodiment

The technique of detecting the direction of the impact applied to the vehicle by means of a biaxial sensor and changing the variation pattern of the threshold value based on the result of detection is naturally applicable to the structure of the second embodiment that changes the threshold value.

Figure 25:
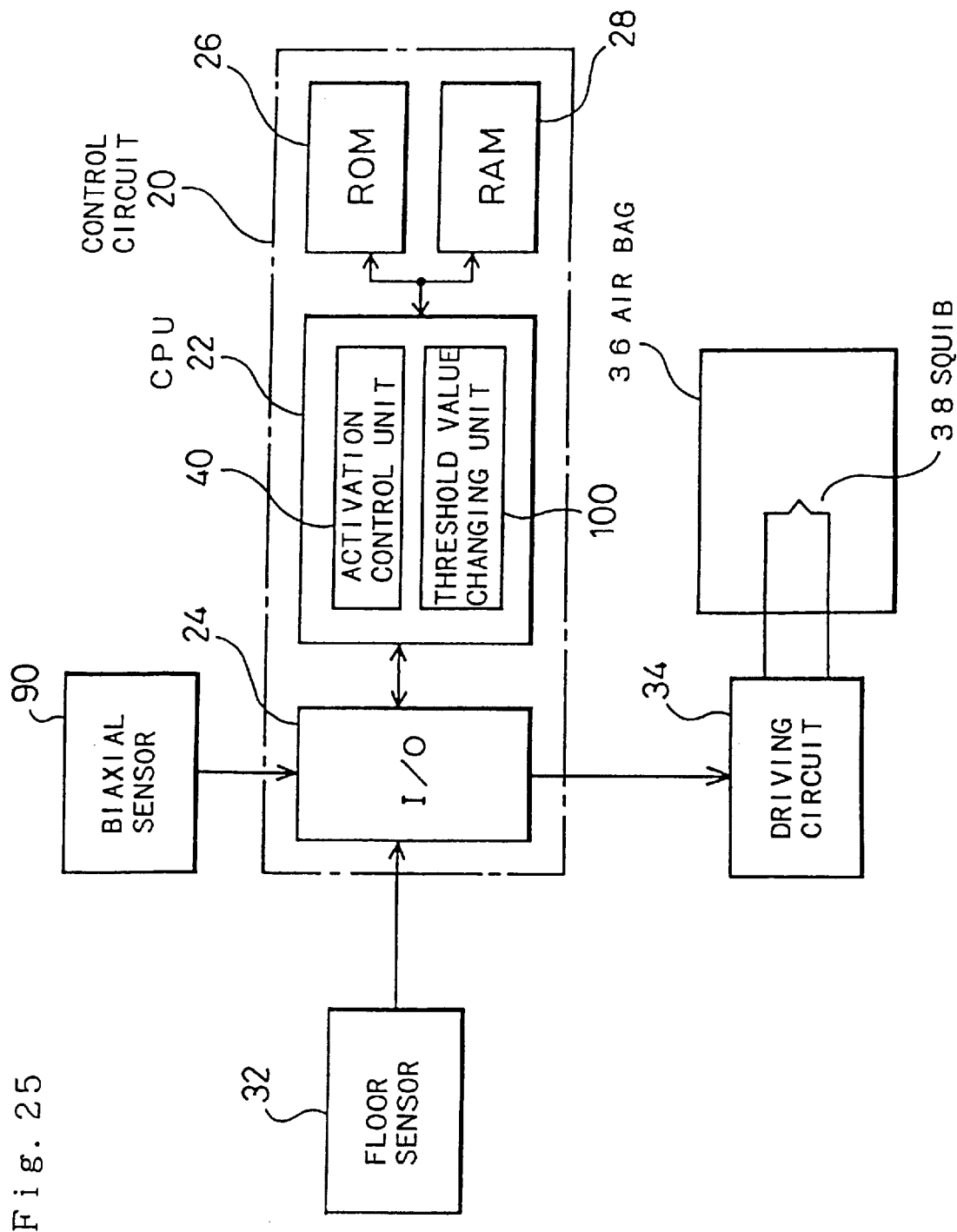
FIG. 25 is a block diagram illustrating another activation control apparatus using a biaxial sensor as a sixth embodiment according to the present invention.
Figure 26:
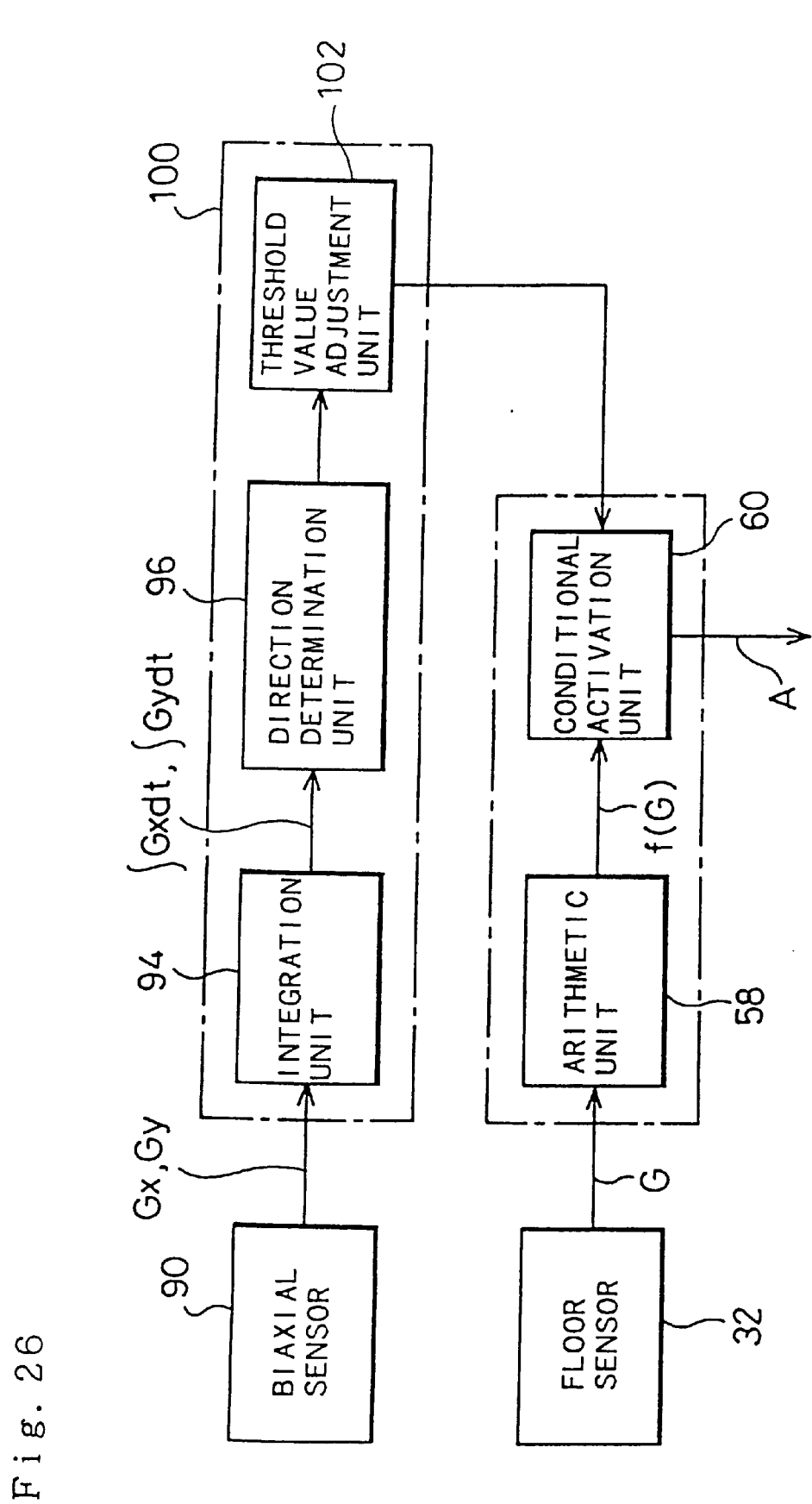
FIG. 26 shows the operations of the biaxial sensor 90, the floor sensor 32, and the CPU 22 shown in FIG. 25.
Figure 27:
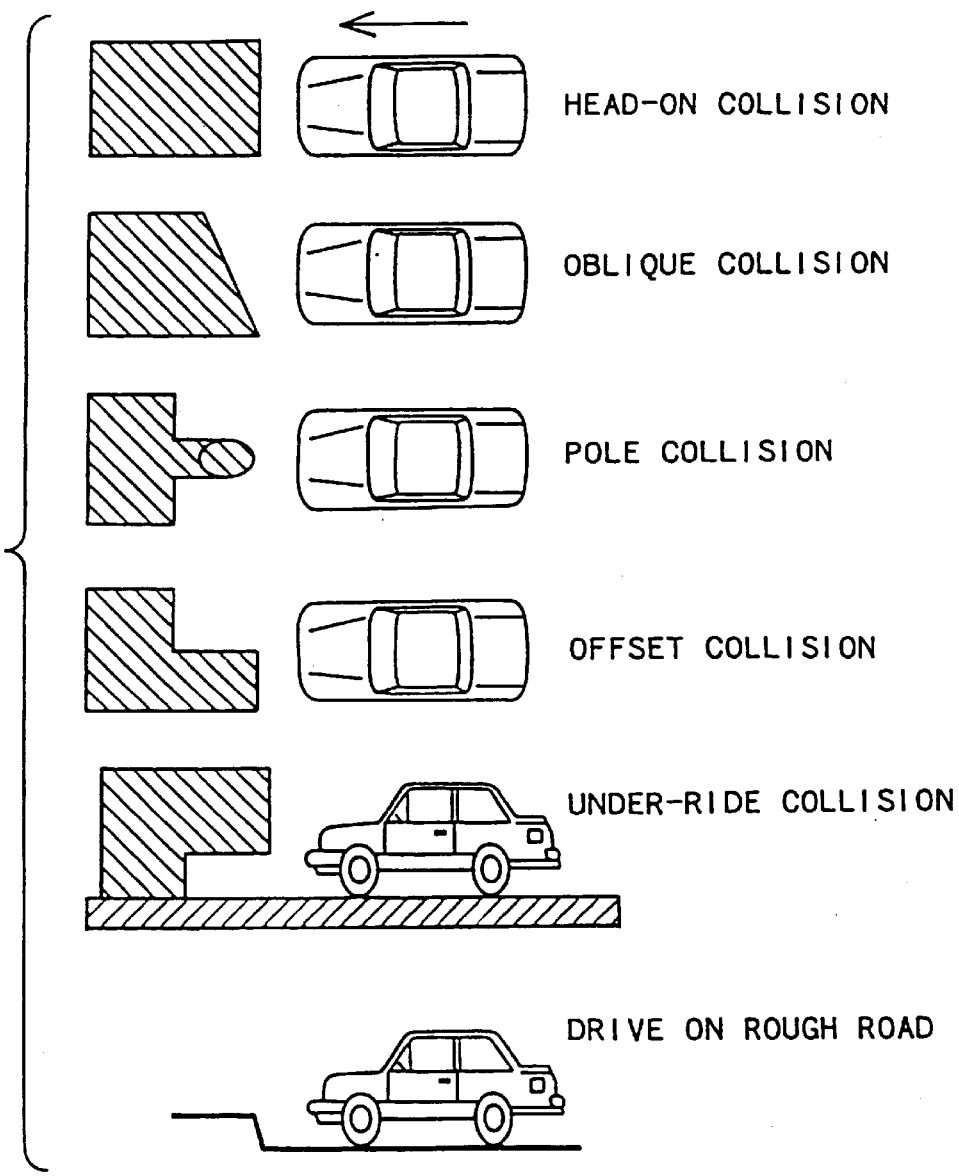
FIG. 27 shows various types of collisions.

FIG. 25 is a block diagram illustrating another activation control apparatus using a biaxial sensor as a sixth embodiment according to the present invention. FIG. 26 shows the operations of the biaxial sensor 90, the floor sensor 32, and the CPU 22 shown in FIG. 25.

The structural difference between the sixth embodiment and the fifth embodiment is that the CPU 22 includes a threshold value changing unit 100 in place of the threshold variation pattern changing unit 92 as shown in FIG. 25. The operational difference includes the operations of the threshold value changing unit 100 that are different from those of the threshold variation pattern changing unit 92. The other constituents and the operations in the sixth embodiment are identical with those in the fifth embodiment and are thus not specifically described here.

In the sixth embodiment, the threshold value changing unit 100 includes the integration unit 94, the direction determination unit 96, and a threshold value adjustment unit 102 as shown in FIG. 26.

The operations of the integration unit 94 and the direction determination unit 96 have been discussed in the fifth embodiment, and only the operations of the threshold value adjustment unit 102 is described here. The threshold value adjustment unit 102 gives a value corresponding to that shown in FIG. 9 as the threshold value T to the conditional activation unit 60. Until the direction determination unit 96 outputs an instruction signal, a fixed value is given as the threshold value T to the conditional activation unit 60. At the time of the input of an instruction signal, the threshold value T is changed from the fixed value to a smaller value. The threshold value T is then gradually increased. After a certain time point, another fixed value is given as the threshold value T to the conditional activation unit 60.

The fixed value given as the threshold value T to the conditional activation unit 60 until the input of an instruction signal is specified in the following manner. Before the direction determination unit 96 outputs an instruction signal, the type of the collision is not restricted to either an oblique collision or an offset collision. In order to prevent unnecessary activation of the air bag, for example, when a head-on collision applies an impact of such a degree that does not require activation of the air bag to the vehicle, it is necessary to set the threshold value T by taking not only an oblique collision and an offset collision but a head-on collision, a pole collision, and an under-ride collision into consideration. The values of the function f(G) are respectively determined when collisions (including a head-on collision and other collisions) apply impacts of such a degree that does not require activation of the air bag to the vehicle. The threshold value T is then set equal to a fixed value that is a little greater than the maximum among the values of the function f(G) thus obtained.

The value given as the threshold value T to the conditional activation unit 60 after the input of an instruction signal is specified in the following manner. The fact that the direction determination unit 96 outputs an instruction signal means that a head-on collision, a pole collision, and an under-ride collision can be left out of consideration. A concrete procedure first draws a plurality of characteristic curves representing variations in function f(G) with time when an oblique collision and an offset collision apply impacts of such a degree that does not require activation of the air bag to the vehicle, and measures the time points on the respective characteristic curves, at which the direction determination unit 96 outputs an instruction signal. The procedure then adjusts the time axes of the respective characteristic curves to make all the time points on the respective characteristic curves, at which the instruction signal is output, coincident with a specific time point on the time axis, and superposes all the characteristic curves one upon another. The procedure subsequently determines a pattern that exceeds these characteristic curves after specific time point but is as close as possible to these charactistic curves. A broken line that is approximate to this pattern is finally set as the threshold value T.

As discussed above in the sixth embodiment, the threshold value changing unit 100 changes the threshold value T adopted for the conditional activation of the air bag in the manner discussed above, based on the determination of whether or not the direction of the impact applied to the vehicle coincides with a preset direction (that is, the direction having an angle of not less than a predetermined value with respect to the center line of the vehicle). This exerts the following effects. In the case of any one of a head-on collision, a pole collision, and an under-ride collision, the direction determination unit 96 does not input an instruction signal to the threshold value adjustment unit 12, and the fixed value specified as above is used as the threshold value T for the conditional activation of the air bag. In case that any one of a head-on collision, a pole collision, and an under-ride collision applies an impact of such a degree that does not require activation of the air bag to the vehicle, the value of the function f(G) does not exceed the threshold value T and the air bag is not activated. In the case of an oblique collision or an offset collision, however, the direction determination unit 96 inputs an instruction signal to the threshold value adjustment unit 102, and the threshold value T increases with time from a value smaller than the fixed value. In this case, the value of the function f(G) exceeds the threshold value T on the earlier stage, and the air bag accordingly activated at the earlier timing.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. An activation control apparatus for controlling activation of a passive vehicle occupant restraint mounted on a vehicle, said activation control apparatus comprising:
   an impact measurement unit that is disposed at a predetermined position in said vehicle and measures an impact applied to said vehicle,
   an impact detection unit that is disposed at a position ahead of said impact measurement unit in said vehicle and outputs a signal based on the observed impact applied to said vehicle at least by a collision,
   a threshold variation pattern selection unit that selects a working threshold variation pattern, which is used to control activation of said passive vehicle occupant restraint, among a plurality of available threshold variation patterns, based on the output of said impact detection unit; and
   an activation control unit that compares a specific value calculated from the observed impact by said impact measurement unit with a working threshold value, which varies according to the working threshold variation pattern selected by said threshold variation pattern selection unit, and controls activation of said passive vehicle occupant restraint based on a result of the comparison.

2. An activation control apparatus in accordance with claim 1, wherein said impact detection unit is located at a specific part in said vehicle, which is readily deformed by a collision of said vehicle.

3. An activation control apparatus in accordance with claim 1, herein a plurality of said impact detection units are disposed in said vehicle.

4. An activation control apparatus in accordance with claim 3, wherein said impact detection units are disposed at least at positions that are off to a right front and a left front of said impact measurement unit.

5. An activation control apparatus in accordance with claim 1, wherein said impact detection unit determines whether or not the impact applied to said vehicle is not less than a predetermined reference value.

6. An activation control apparatus in accordance with claim 5, wherein said impact detection unit has a plurality of the predetermined reference values and determines whether or not the impact applied to said vehicle is not less than each of the predetermined reference values.

7. An activation control apparatus in accordance with claim 5, wherein the predetermined reference value is set to be smaller than an estimated value of impact that is expected to be detected at the disposed position of said impact detection unit in the case where an impact applied to said vehicle by a predetermined type of collision other than a head-on collision has such a degree that does not require activation of said passive vehicle occupant restraint.

8. An activation control apparatus in accordance with claim 5, wherein said impact detection unit has n reference values from a first reference value to an n-th reference value in a descending order, where n is an integer of not less than 2, and determines whether or not the impact applied to said vehicle is not less than each of then reference values, and said threshold variation pattern selection unit has (n+1) available threshold variation patterns, said threshold variation pattern selection unit selecting a first threshold variation pattern as the working threshold variation pattern, which is used to control activation of said passive vehicle occupant restraint, when the output of said impact detection unit represents application of an impact of not less than the first reference value, said threshold variation pattern selection unit selecting an i-th threshold variation pattern as the working threshold variation pattern when the output of said impact detection unit represents application of an impact of not less than an i-th reference value but less than an (i−1)-th reference value, where 2<i<n, and selecting an (n+1)-th threshold variation pattern as the working threshold variation pattern when the output of said impact detection unit represents application of an impact of less than n-th reference value.

9. An activation control apparatus in accordance with claim 5, wherein the predetermined reference value is set to be greater than an estimated value of impact that is expected to be detected at the disposed position of said impact detection unit in the case where an impact applied to said vehicle by a predetermined type of collision has such a degree that does not require activation of said passive vehicle occupant restraint.

10. An activation control apparatus in accordance with claim 5, wherein the working threshold value varies against a preset physical quantity according to the working threshold variation pattern, and the working threshold variation pattern, which is used after the determination by said impact detection unit that the impact applied to said vehicle is not less than the predetermined reference value, comprises a specific curve having greater values than those of at least one curve, the at least one curve representing a variation in specific value calculated from the observed impact by said impact measurement unit against the physical quantity in the case where an impact applied to said vehicle by a predetermined type of collision other than a head-on collision has such a degree that does not require activation of said passive vehicle occupant restraint.

11. An activation control apparatus in accordance with claim 10, wherein the specific curve is an envelope of the at least one curve.

12. An activation control apparatus in accordance with claim 5, wherein the working threshold value varies against a preset physical quantity according to the working threshold variation pattern, and the working threshold variation pattern, which is used before the determination by said impact detection unit that the impact applied to said vehicle is not less than the predetermined reference value, comprises a specific curve having greater values than those of at least either one of at least one first curve and at least one second curve, the at least one first curve representing a variation in specific value calculated from the observed impact by said impact measurement unit against the physical quantity in the case where an impact applied to said vehicle by a head-on collision has such a degree that does not require activation of said passive vehicle occupant restraint, the at least one second curve representing a variation in specific value calculated from the observed impact by said impact measurement unit against the physical quantity in the case where said vehicle runs on a rough road.

13. An activation control apparatus in accordance with claim 12, wherein the specific curve is an envelope of at least either one of the at least one first curve and the at least one second curve.

14. An activation control apparatus in accordance with claim 12, wherein the preset physical quantity is a speed of a non-stationary object in said vehicle.

15. An activation control apparatus in accordance with 12, wherein the preset physical quantity is time.

16. An activation control apparatus in accordance with claim 5, wherein the predetermined reference value is set to be greater than an estimated value of impact that is expected to be detected at the disposed position of said impact detection unit in the case where an impact applied to said vehicle by a head-on collision has such a degree that does not require activation of said passive vehicle occupant restraint.

17. An activation control apparatus in accordance with claim 5, wherein the predetermined reference value is set to be greater than an estimated value of impact that is expected to be detected at the disposed position of said impact detection unit in the case where said vehicle runs on a rough road.

18. An activation control apparatus in accordance with claim 1, wherein said vehicle has at least two pathways as part of a transmission path, through which a result of the detection by said impact detection unit is transmitted from said impact detection unit to said threshold variation pattern selection unit.

19. An activation control apparatus in accordance with claim 1, wherein said impact measurement unit measures a deceleration as an index of the impact applied to said vehicle, and said activation control unit uses an integral value of the observed deceleration over time as the specific value calculated from the observed impact by said impact measurement unit.

20. An activation control apparatus in accordance with claim 1, wherein said impact detection unit comprises:

a signal output terminal that outputs a result of the detection;

a diode that has one end connected to said signal output terminal;

a first resistor that has one end connected to the other end of said diode;

an inner switch that has one end connected to the other end of said diode, is arranged in parallel to said first resistor, and is turned on under application of an impact of not less than the predetermined reference value to said vehicle; and a second resistor that has one end connected to the other ends of said first resistor and said inner switch and the other end connected to earth.

21. An activation control apparatus in accordance with claim 20, wherein said impact detection unit comprises at least two signal output terminals and at least two diodes, one end of each of said at least two diodes is connected to each of said at least two signal output terminals, a transmission path, through which a result of the detection by said impact detection unit is transmitted from said impact detection unit to said threshold variation pattern selection unit, has at least two signal lines respectively connected to said at least two signal output terminals.

22. An activation control apparatus in accordance with claim 20, said impact detection unit comprises at least two signal output terminals, at least two diodes, and at least one earth output terminal, one end of each of said at least two diodes is connected to each of said at least two signal output terminals, a transmission path, through which a result of the detection by said impact detection unit is transmitted from said impact detection unit to said threshold variation pattern selection unit, has at least two signal lines respectively connected to said at least two signal output terminals and at least one earth line connected to said at least one earth output terminal.

23. An activation control apparatus for controlling activation of a passive vehicle occupant restraint mounted on a vehicle, said activation control apparatus comprising:

an impact measurement unit that is disposed at a predetermined position in said vehicle and measures an impact applied to said vehicle;

an impact detection unit that is disposed at a position ahead of said impact measurement unit in said vehicle and outputs a signal based on the observed impact applied to said vehicle at least by a collision;

a threshold value selection unit that selects a working threshold value, which is used to control activation of said passive vehicle occupant restraint, among a plurality of available threshold values, based on the output of said impact detection unit; and an activation control unit that compares a specific value calculated from the observed impact by said impact measurement unit with the working threshold value selected by said threshold value selection unit, and controls activation of said passive vehicle occupant restraint based on a result of the comparison.

24. An activation control apparatus in accordance with claim 23, wherein said impact detection unit is located at a specific part in said vehicle, which is readily deformed by a collision of said vehicle.

25. An activation control apparatus in accordance with claim 23, wherein a plurality of said impact detection units are disposed in said vehicle.

26. An activation control apparatus in accordance with claim 25, wherein said impact detection units are disposed at least at positions that are off to a right front and a left front of said impact measurement unit.

27. An activation control apparatus in accordance with claim 23, wherein said impact detection unit determines whether or not the impact applied to said vehicle is not less than a predetermined reference value.

28. An activation control apparatus in accordance with claim 27, wherein said impact detection unit has a plurality of the predetermined reference value and determines whether or not the impact applied to said vehicle is not less than each of the predetermined reference values.

29. An activation control apparatus in accordance with claim 27, wherein the working threshold value, which is used before the determination by said impact detection unit that the impact applied to said vehicle is not less than the predetermined reference value, is greater than at least either one of a first value and a second value, the first value being calculated from the observed impact by said impact measurement unit at a certain time point in the case where an impact applied to said vehicle by a head-on collision has such a degree that does not require activation of said passive vehicle occupant restraint, the second value being calculated from the observed impact by said impact measurement unit at a certain time point in the case where said vehicle runs on a rough road.

30. An activation control apparatus in accordance with claim 29, wherein the working threshold value is greater than at least either one of the first value an the second value by a predetermined quantity.

31. An activation control apparatus in accordance with claim 27, wherein the working threshold value, which is used after the determination by said impact detection unit that the impact applied to said vehicle is not less than the predetermined reference value, is greater than a specific value, the specific value being calculated from the observed impact by said impact measurement unit at a certain time point in the case where an impact applied to said vehicle by a predetermined type of collision other than a head-on collision has such a degree that does not require activation of said passive vehicle occupant restraint.

32. An activation control apparatus in accordance with claim 31, wherein the working threshold value is greater than the specific value by a predetermined quantity.

33. An activation control apparatus in accordance with claim 27, wherein the predetermined reference value is set to be greater than an estimated value of impact that is expected to be detected at the disposed position of said impact detection unit in the case where an impact applied to said vehicle by a predetermined type of collision has such a degree that does not require activation of said passive vehicle occupant restraint.

34. An activation control apparatus for controlling activation of a passive vehicle occupant restraint mounted on a vehicle, said activation control apparatus comprising:

an impact measurement unit that is disposed at a predetermined position in said vehicle and measures an impact applied to said vehicle;

an impact detection unit disposed in a specific part that is positioned ahead of said impact measurement unit in said vehicle and is readily deformed by a collision of said vehicle, said impact detection unit outputting a signal based on the observed impact applied to said vehicle at least by a collision; and an activation control unit that controls activation of said passive vehicle occupant restraint, based on a specific value calculated from the observed impact by said impact measurement unit and the output of said impact detection unit.

35. An activation control apparatus in accordance with claim 34, wherein a plurality of said impact detection units are disposed in said vehicle.

36. An activation control apparatus in accordance with claim 35, wherein said impact detection units are disposed at least at positions that are off to a right front and a left front of said impact measurement unit.

37. An activation control apparatus in accordance with claim 36, wherein each of said impact detection units determines whether or not an impact applied to said vehicle is not less than a predetermined reference value.

38. An activation control apparatus in accordance with claim 37, in the predetermined reference value is set to be greater than an estimated value of impact that is expected to be detected at the disposed position of each of said impact detection units in the case where an impact applied to said vehicle by a head-on collision has such a degree that does not require activation of said passive vehicle occupant restraint.

39. An activation control apparatus in accordance with claim 37, wherein the predetermined reference value is set to be greater than an estimated value of impact that is expected to be detected at the disposed position of each of said impact detection units in the case where said vehicle runs on a rough road.

40. An activation control apparatus in accordance with claim 37, wherein the predetermined reference value is set to be smaller than an estimated value of impact that is expected to be detected at the disposed position of each of said impact detection units in the case where an impact applied to said vehicle by a predetermined type of collision other than a head-on collision has such a degree that does not require activation of said passive vehicle occupant restraint.

41. An activation control apparatus in accordance with claim 37, wherein the predetermined reference value is set to be greater than an estimated value of impact that is expected to be detected at the disposed position of each of said impact detection units in the case where an impact applied to said vehicle by a predetermined type of collision has such a degree that does not require activation of said passive vehicle occupant restraint.

42. An activation control apparatus in accordance with claim 37, wherein each of said impact detection units has a plurality of the predetermined reference values and determines whether or not the impact applied to said vehicle is not less than each of the predetermined reference values.

43. An activation control apparatus in accordance with claim 37, wherein part of a transmission path, through which a result of the detection by each of said impact detection units is transmitted from said each impact detection unit to said activation control unit, has a rightward pathway running through a right side of said vehicle and a leftward pathway running through a left side of said vehicle.

44. An activation control apparatus for controlling activation of a passive vehicle occupant restraint mounted on a vehicle, said activation control apparatus comprising:
an impact measurement unit that is disposed at a predetermined position in said vehicle and measures an impact applied to said vehicle;
a speed detection unit that determines a speed of a non-stationary object in said vehicle relative to said vehicle, based on the observed impact by said impact measurement unit; and
an activation control unit that determines a variation in specific value, which is calculated from the observed impact by said impact measurement unit, against the speed determined by said speed detection unit, and controls activation of said passive vehicle occupant restraint, based on the variation.

45. An activation control apparatus in accordance with claim 44, said activation control apparatus further comprising:
an impact detection unit that is disposed at a position ahead of said impact measurement unit in said vehicle and outputs a signal based on the observed impact applied to said vehicle at least by a collision; and
a threshold variation pattern selection unit that selects a working threshold variation pattern, which is used to control activation of said passive vehicle occupant restraint, among a plurality of available threshold variation patterns, based on the output of said impact detection unit,
wherein each of the threshold variation patterns represents a variation in threshold value against the speed of the non-stationary object in said vehicle, and
said activation control unit compares the specific value, which is calculated from the observed impact by said impact measurement unit and varies against the speed determined by said speed detection unit, with a working threshold value, which varies against the speed determined by said speed detection unit according to the working threshold variation pattern selected by said threshold variation pattern selection unit, and controls activation of said passive vehicle occupant restraint based on a result of the comparison.

46. An activation control apparatus in accordance with claim 45, wherein said impact detection unit is located at a specific part in said vehicle, which is readily deformed by a collision of said vehicle.

47. An activation control apparatus in accordance with claim 45, wherein said vehicle has at least two pathways as part of a transmission path, through which a result of the detection by said impact detection unit is transmitted from said impact detection unit to said threshold variation pattern selection unit.

48. An activation control apparatus in accordance with claim 45, wherein said impact detection unit comprises:
a signal output terminal that outputs a result of the detection;
a diode that has one end connected to said signal output terminal;
a first resistor that has one end connected to the other end of said diode;
an inner switch that has one end connected to the other end of said diode, is arranged in parallel to said first resistor, and is turned on under application of an impact of not less than the predetermined reference value to said vehicle; and
a second resistor that has one end connected to the other ends of said first resistor and said inner switch and the other end connected to earth.

49. An activation control apparatus in accordance with claim 48, wherein said impact detection unit comprises at least two signal output terminals and at least two diodes,
one end of each of said at least two diodes being connected to each of said at least two signal output terminals,
a transmission path, through which a result of the detection by said impact detection unit is transmitted from said impact detection unit to said threshold variation pattern selection unit, has at least two signal lines respectively connected to said at least two signal output terminals.

50. An activation control apparatus in accordance with claim 48, wherein said impact detection unit comprises at least two signal output terminals, at least two diodes, and at least one earth output terminal, one end of each of said at least two diodes being connected to each of said at least two signal output terminals, a transmission path, through which a result of the detection by said impact detection unit is transmitted from said impact detection unit to said threshold variation pattern selection unit, has at least two signal lines respectively connected to said at least two signal output terminals and at least one earth line connected to said at least one earth output terminal.

51. An activation control apparatus in accordance with claim 50, wherein said impact detection units are disposed at least at positions that are off to a right front and a left front of said impact measurement unit, and part of a transmission path, through which a result of the detection by each of said impact detection units is transmitted from said each impact detection unit to said activation control unit, has a rightward pathway running through a right side of said vehicle and a leftward pathway running through a left side of said vehicle.

52. An activation control apparatus in accordance with claim 45, wherein a plurality said impact detection units are disposed in said vehicle.

53. An activation control apparatus in accordance with claim 52, wherein said impact detection units are disposed at least at positions that are off to a right front and a left front of said impact measurement unit.

54. An activation control apparatus in accordance with claim 45, wherein said impact detection unit determines whether or not the impact applied to said vehicle is not less than a predetermined reference value.

55. An activation control apparatus in accordance with claim 54, wherein said impact detection unit has a plurality of the predetermined reference values and determines whether or not the impact applied to said vehicle is not less than each of the predetermined reference values.

56. An activation control apparatus in accordance with claim 55, wherein said impact detection unit has n reference values from a first reference value to an n-th reference value in a descending order, where n is an integer of not less than 2, and determines whether or not the impact applied to said vehicle is not less than each of the n reference values, and said threshold variation pattern selection unit has (n+1) available threshold variation patterns, said threshold variation pattern selection unit selecting a first threshold variation pattern as the working threshold variation pattern, which is used to control activation of said passive vehicle occupant restraint, when the output of said impact detection unit represents application of an impact of not less than the first reference value, said threshold variation pattern selection unit selecting an i-th threshold variation pattern as the working threshold variation pattern when the output of said impact detection unit represents application of an impact of not less than an i-th reference value but less than an (i-1)-th reference value, where 2<i<n, and selecting an (n+1)-th threshold variation pattern as the working threshold variation pattern when the output of said impact detection unit represents application of an impact of less than n-th reference value.

57. An activation control apparatus in accordance with claim 54, wherein the working threshold value varies against a preset physical quantity according to the working threshold variation pattern, and the working threshold variation pattern, which is used after the determination by said impact detection unit that the impact applied to said vehicle is not less than the predetermined reference value, comprises a specific curve having greater values than those of at least one curve, the at least one curve representing a variation in specific value calculated from the observed impact by said impact measurement unit against the physical quantity in the case where an impact applied to said vehicle by a predetermined type of collision other than a head-on collision has such a degree that does not require activation of said passive vehicle occupant restraint.

58. An activation control apparatus in accordance with claim 57, wherein the specific curve is an envelope of the at least one curve.

59. An activation control apparatus in accordance with claim 54, wherein the working threshold value, which is used before the determination by said impact detection unit that the impact applied to said vehicle is not less than the predetermined reference value, is greater than at least either one of a first value and a second value, the first value being calculated from the observed impact by said impact measurement unit at a certain time point in the case where an impact applied to said vehicle by a head-on collision has such a degree that does not require activation of said passive vehicle occupant restraint, the second value being calculated from the observed impact by said impact measurement unit at a certain time point in the case where said vehicle runs on a rough road.

60. An activation control apparatus in accordance with claim 59, wherein the working threshold value is greater than at least either one of the first value and the second value by a predetermined quantity.

61. An activation control apparatus in accordance with claim 54, wherein the working threshold value, which is used after the determination by said impact detection unit that the impact applied to said vehicle is not less than the predetermined reference value, is greater than a specific value, the specific value being calculated from the observed impact by said impact measurement unit at a certain time point in the case where an impact applied to said vehicle by a predetermined type of collision other than a head-on collision has such a degree that does not require activation of said passive vehicle occupant restraint.

62. An activation control apparatus in accordance with claim 61, wherein the working threshold value is greater than the specific value by a predetermined quantity.

63. An activation control apparatus in accordance with claim 54, wherein the predetermined reference value is set to be greater than an estimated value of impact that is expected to be detected at the disposed position of said impact detection unit in the case where an impact applied to said vehicle by a predetermined type of collision has such a degree that does not require activation of said passive vehicle occupant restraint.

64. An activation control apparatus in accordance with claim 54, wherein the predetermined reference value is set to be greater than an estimated value of impact that is expected to be detected at the disposed position of said impact detection unit in the case where an impact applied to said vehicle by a head-on collision has such a degree that does not require activation of said passive vehicle occupant restraint.

65. An activation control apparatus in accordance with claim 54, wherein the predetermined reference value is set to be greater than an estimated value of impact that is expected to be detected at the disposed position of said impact detection unit in the case where said vehicle runs on a rough road.

66. An activation control apparatus in accordance with claim 54, wherein the predetermined reference value is set to be smaller than an estimated value of impact that is expected to be detected at the disposed position of said impact detection unit in the case where an impact applied to said vehicle by a predetermined type of collision other than a head-on collision has such a degree that does not require activation of said passive vehicle occupant restraint.

67. An activation control apparatus in accordance with claim 54, wherein the working threshold value varies against a preset physical quantity according to the working threshold variation pattern, and
   the working threshold variation pattern, which is used before the determination by said impact detection unit that the impact applied to said vehicle is not less than the predetermined reference value, comprises a specific curve having greater values than those of at least either one of at least one first curve and at least one second curve,
   the at least one first curve representing a variation in specific value calculated from the observed impact by said impact measurement unit against the physical quantity in the case where an impact applied to said vehicle by a head-on collision has such a degree that does not require activation of said passive vehicle occupant restraint,
   the at least one second curve representing a variation in specific value calculated from the observed impact by said impact measurement unit against the physical quantity in the case where said vehicle runs on a rough road.

68. An activation control apparatus in accordance with claim 67, wherein the specific curve is an envelope of at least either one of the at least one first curve and the at least one second curve.

69. An activation control apparatus in accordance with claim 67, wherein the preset physical quantity is a speed of a non-stationary object in said vehicle.

70. An activation control apparatus in accordance with claim 67, wherein the preset physical quantity is time.

71. An activation control apparatus in accordance with claim 44, wherein said impact measurement unit measures a deceleration as an index of the impact applied to said vehicle, and
   said activation control unit uses an integral value of the observed deceleration over time as the specific value calculated from the observed impact by said impact measurement unit.

72. An activation control apparatus in accordance with claim 44, said activation control apparatus further comprising:
   a plurality of impact detection units that are disposed ahead of said impact measurement unit in said vehicle and respectively output a signal based on the observed impact applied to said vehicle at least by a collision,
   wherein said activation control unit controls activation of said passive vehicle occupant restraint based on both the variation and the output of each of said impact detection units.

73. An activation control apparatus in accordance with claim 72, wherein said each impact detection unit is located at a specific part in said vehicle, which is readily deformed by a collision of said vehicle.

74. An activation control apparatus in accordance with claim 72, wherein said impact detection units are disposed at least at positions that are off to a right front and a left front of said impact measurement unit.

75. An activation control apparatus in accordance with claim 72, wherein said each impact detection unit determines whether or not the impact applied to said vehicle is not less than a predetermined reference value.

76. An activation control apparatus in accordance with claim 75, wherein said each impact detection unit has a plurality of the predetermined reference values and determines whether or not the impact applied to said vehicle is not less than each of the predetermined reference values.

77. An activation control apparatus in accordance with claim 75, wherein the predetermined reference value is set to be greater than an estimated value of impact that is expected to be detected at the disposed position of each of said impact detection units in the case where an impact applied to said vehicle by a predetermined type of collision has such a degree that does not require activation of said passive vehicle occupant restraint.

78. An activation control apparatus in accordance with claim 75, wherein the predetermined reference value is set to be greater than an estimated value of impact that is expected to be detected at the disposed position of each of said impact detection units in the case where said vehicle runs on a rough road.

79. An activation control apparatus in accordance with claim 75, wherein the predetermined reference value is set to be greater than an estimated value of impact that is expected to be detected at the disposed position of each of said impact detection units in the case where an impact applied to said vehicle by a head-on collision has such a degree that does not require activation of said passive vehicle occupant restraint.

80. An activation control apparatus in accordance with claim 75, wherein the predetermined reference value is set to be smaller than an estimated value of impact that is expected to be detected at the disposed position of each of said impact detection units in the case where an impact applied to said vehicle by a predetermined type of collision other than a head-on collision has such a degree that does not require activation of said passive vehicle occupant restraint.

81. An activation control apparatus in accordance with claim 44, said activation control apparatus further comprising:
   an impact detection unit disposed in a specific part that is positioned ahead of said impact measurement unit in said vehicle and is readily deformed by a collision of said vehicle, said impact detection unit outputting a signal based on the observed impact applied to said vehicle at least by a collision,
   wherein said activation control unit controls activation of said passive vehicle occupant restraint based on both the variation and the output of said impact detection unit.

82. An activation control apparatus in accordance with claim 81, wherein a plurality of said impact detection units are disposed in said vehicle.

83. An activation control apparatus for controlling activation of a passive vehicle occupant restraint mounted on a vehicle, said activation control apparatus comprising:
   an impact measurement unit that is disposed at a predetermined position in said vehicle and measures an impact applied to said vehicle;

a plurality of impact detection units that are disposed ahead of said impact measurement unit in said vehicle and respectively output a signal based on the observed impact applied to said vehicle at least by a collision; and an activation control unit that controls activation of said passive vehicle occupant restraint based on a specific value calculated from the observed impact by said impact measurement unit and the output of said each impact detection unit.

84. An activation control apparatus in accordance with claim 83, wherein said each impact detection unit is located at a specific part in said vehicle, which is readily deformed by a collision of said vehicle.

85. An activation control apparatus in accordance with claim 83, wherein said impact detection units are disposed at least at positions that are off to a right front and a left front of said impact measurement unit.

86. An activation control apparatus in accordance with claim 83, wherein said each impact detection unit determines whether or not the impact applied to said vehicle is not less than a predetermined reference value.

87. An activation control apparatus in accordance with claim 86, wherein said each impact detection unit has a plurality of the predetermined reference values and determines whether or not the impact applied to said vehicle is not less than each of the predetermined reference values.

88. An activation control apparatus in accordance with claim 86, wherein the predetermined reference value is set to be greater than an estimated value of impact that is expected to be detected at the disposed position of each of said impact detection units in the case where an impact applied to said vehicle by a predetermined type of collision has such a degree that does not require activation of said passive vehicle occupant restraint.

89. An activation control apparatus in accordance with claim 83, wherein said impact detection units are disposed at least at positions that are off to a right front and a left front of said impact measurement unit, and part of a transmission path, through which a result of the detection by each of said impact detection units is transmitted from said each impact detection unit to said activation control unit, has a rightward pathway running through a right side of said vehicle and a leftward pathway running through a left side of said vehicle.

90. An activation control apparatus in accordance with claim 86, wherein the predetermined reference value is set to be greater than an estimated value of impact that is expected to be detected at the disposed position of each of said impact detection units in the case where an impact applied to said vehicle by a head-on collision has such a degree that does not require activation of said passive vehicle occupant restraint.

91. An activation control apparatus in accordance with claim 86, wherein the predetermined reference value is set to be greater than an estimated value of impact that is expected to be detected at the disposed position of each of said impact detection units in the case where said vehicle runs on a rough road.

92. An activation control apparatus in accordance with claim 86, wherein the predetermined reference value is set to be smaller than an estimated value impact that is expected to be detected at the disposed position of each of said impact detection units in the case where an impact applied to said vehicle by a predetermined type of collision other than a head-on collision has such a degree that does not require activation of said passive vehicle occupant restraint.

* * * * *

UNITED STATES PATENT AND TRADEMARK OFFICE
CERTIFICATE OF CORRECTION

PATENT NO.     : 6,347,268 B1
DATED          : February 12, 2002
INVENTOR(S)    : Koichi Fujita et al.

It is certified that error appears in the above-identified patent and that said Letters Patent is hereby corrected as shown below:

Column 10,
Line 56, change "F(G)" to -- f(G) --.

Column 16,
Line 12, change "tile airbag" to -- the airbag --.

Column 30,
Line 56, change "herein" to -- wherein --.

Column 35,
Line 13, change "37, in" to -- 37, wherein --.

Signed and Sealed this

Fifth Day of August, 2003

JAMES E. ROGAN
*Director of the United States Patent and Trademark Office*